(12) United States Patent
Kamo

(10) Patent No.: US 6,259,564 B1
(45) Date of Patent: Jul. 10, 2001

(54) FINDER OPTICAL SYSTEM

(75) Inventor: Yuji Kamo, Hino (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/447,820

(22) Filed: Nov. 23, 1999

(30) Foreign Application Priority Data

Nov. 24, 1998 (JP) .................................. 10-332342

(51) Int. Cl.$^7$ .................................................. G02B 27/10
(52) U.S. Cl. .......................... 359/627; 359/630; 359/637; 359/633; 359/730; 359/731
(58) Field of Search .................... 359/627, 630, 359/631, 633, 637, 730, 731, 728, 726, 727

(56) References Cited

U.S. PATENT DOCUMENTS

| | | | |
|---|---|---|---|
| 6,084,715 | * | 7/2000 | Aoki et al. ............................ 359/627 |
| 6,094,315 | * | 7/2000 | Aoki ..................................... 359/731 |
| 6,147,808 | * | 11/2000 | Togino ................................. 359/637 |
| 6,166,858 | * | 12/2000 | Togino et al. ........................ 359/633 |
| 6,178,048 | * | 1/2001 | Togino et al. ........................ 359/637 |
| 6,178,052 | * | 1/2001 | Aoki et al. ............................ 359/730 |

FOREIGN PATENT DOCUMENTS

| | | |
|---|---|---|
| 0722106 | 7/1996 | (EP) . |
| 10-68887 | 3/1998 | (JP) . |
| 10-197705 | 7/1998 | (JP) . |
| 10-197796 | 7/1998 | (JP) . |

* cited by examiner

Primary Examiner—Loha Ben
(74) Attorney, Agent, or Firm—Pillsbury Winthrop LLP

(57) ABSTRACT

The invention provides a real-image type finder optical system which is reduced in size in general and thickness in particular. In order from an object side of the system, the system comprises an objective optical subsystem having a positive refracting power, an image-inversion component for erecting a real image formed by the objective optical subsystem having only one image-formation action to an erect image and an ocular optical subsystem having a positive refracting power, with at least one of reflecting surfaces being defined by a roof surface. The objective optical subsystem comprises at least two reflecting surfaces of reflecting surfaces 12 to 14, each defined by a rotationally asymmetric surface with power imparted thereto. At least one reflecting surface 13 of the reflecting surfaces is defined by a reflecting surface that is not the same surface as a transmitting surface, and satisfies $5° < |\theta| < 25°$ where $\theta$ is the angle of reflection of an axial chief ray with the normal to the reflecting surface 13 that is not the same surface as a transmitting surface.

58 Claims, 19 Drawing Sheets

FINDER OPTICAL SYSTEM

BACKGROUND OF THE INVENTION

The present invention relates generally to a finder optical system comprising an image-inversion optical subsystem, and more particularly to a finder optical system which is used on cameras, video cameras, etc., so that the inverted image of an object formed through an objective optical subsystem can be viewed in the form of an erect image using the image-inversion optical subsystem.

Among finder optical systems used on cameras, etc., there is well known a so-called real-image type finder wherein a primary real image formed through an objective optical subsystem is converted through an image-inversion optical subsystem to an erect image, which is then viewed through an ocular optical subsystem. The real-image type finder has the merit of turning back an optical path simultaneously with the erection of the image through the image-inversion optical subsystem, thereby reducing the size of the whole of the optical system. For this reason, this optical system is used on most of handy, easy-to-carry and slimmed down cameras now in demand. More recently, the finder optical system is ever-more reduced in size by incorporating a roof surface in the image-inversion optical subsystem, thereby enabling an erect image to be formed in an ever-smaller space.

With recent demands for camera or video size reductions, however, further size reductions of the finder optical system are required especially in terms of its size in the entrance direction or its size in the so-called thickness direction of a camera. The real-image type finder may be reduced in size by turning back its optical path. For the image-inversion optical subsystem, however, some constraints are imposed on the location of reflecting surfaces thereof, because unless the image-inversion optical subsystem is located between the objective optical subsystem where light beams converge with decreasing ray height and the ocular optical subsystem, it is then difficult to acquire the required number of reflecting surfaces. In other words, refracting lenses for the objective, and ocular optical subsystems have to be in the entrance direction of the first reflecting surface where the entrance optical axis is first bent and in the exit direction of the final reflecting surface where the optical path is again made parallel with the entrance optical axis, and so the size of such refracting lenses comes to the size of the image-inversion optical subsystem in the thickness of the direction of the camera. Thus, some restraints are also imposed on making the real-image type finder thin.

On the other hand, a prior art image-inversion optical subsystem has reflecting surfaces constructed of plane surfaces, and so has generally no power. For this reason, some proposals have been made to impart power to the reflecting surfaces of a prism or mirror acting as the image-inversion optical subsystem, thereby allowing it to function an objective, and ocular optical subsystem for the purpose of achieving compactness. In such an optical system, the image-inversion optical subsystem functions partly as the objective, and ocular optical subsystem. It is thus to be understood that the image-inversion optical subsystem used herein is included in the objective, and ocular optical subsystem, and the means having the image-inversion action is referred to as the "image-inversion means" and the member to form the "image-inversion means" is especially called a "reflection optical subsystem with powers imparted to reflecting surfaces".

JP-A 8-248481 discloses a real-image type finder wherein rotationally asymmetric curved surfaces are used for the reflecting surfaces of a prism. This publication teaches that aspheric or toric surfaces may be used as the curved surfaces. However, only rotationally symmetric aspheric surfaces are described as the curved surfaces. A toric surface is generally a surface with respect to two coordinate axes or, in another parlance, is not an asymmetric curved surface.

JP-A 9-152646 discloses a real-image type finder wherein rotationally asymmetric curved surfaces are used for the reflecting surfaces of a prism. In Example 1, the objective optical subsystem is made up of only one prism having a positive power. The half angle of view shown there is 13.0° in the Y-direction and 8.8° in the X-direction. Example 2 shows an objective optical subsystem consisting of one negative refracting lens, one positive refracting lens and one prism having a positive power.

JP-A 10-68887 discloses a binocular wherein rotationally asymmetric curved surfaces are used for the reflecting surfaces of a prism. Example 1 is directed to a single image-formation system wherein the objective optical subsystem is made up of two prisms. The half angle of view shown there is 6.55° in the horizontal direction and 8.73° in the vertical direction. No detailed makeup of the ocular optical subsystem is described.

JP-A 10-197705 discloses a binocular with rotationally asymmetric curved surfaces used for the reflecting surfaces of a prism. In Examples 1 to 3, the objective optical subsystem is made up of two refracting lenses and one prism while the ocular optical subsystem is made up of one prism. The half angle of view shown there is 4.36° to 6.10° in the horizontal direction and 3.27° to 4.70° in the vertical direction. In Example 4, the objective optical subsystem and the ocular optical subsystem are each made up of one prism. The half angle of view is then 6.7° in the horizontal direction and 5.0° in the vertical direction.

JP-A 10-197796 discloses a real-image type finder optical system with a rotationally asymmetric curved surface used in an image-inversion optical subsystem. Any design example is not shown in most examples, and so its performance, size, etc. remain unclear.

However, such prior arts have various problems as explained below.

In the system set forth in JP-A 8-248481, powers are imparted to the reflecting surfaces of the prism. Since the reflecting surfaces are decentered or inclined with respect to axial chief rays, there are rotationally asymmetric decentration aberrations. However, these aberrations cannot be corrected by rotationally symmetric aspheric surfaces. Even at toric surfaces, sufficient correction cannot be made for skew rays. This publication fails to disclose any means for solving these correction problems whatsoever. It is thus believed that any high-performance is not achieved.

In the system set forth in JP-A 9-152646, such decentration aberrations as mentioned above are reduced by using rotationally asymmetric curved surfaces for the reflecting surfaces of a prism. In Example 1, nonetheless, the decentration aberrations remain undercorrected even by use of such rotationally asymmetric curved surfaces because of a large angle of reflection at the first reflecting surface located in the objective optical subsystem; no sufficient performance is again obtained. In addition, this finder optical system has a very narrow angle of view, and so have very limited applications. In Example 2, as many as two refracting lenses are unavoidably used in the objective optical subsystem and, hence, any sufficient size reduction is not achieved, because of a failure in taking full advantage of the powers of the reflecting surfaces in spite of being a single-focus finder.

In the system set forth in JP-A 10-68887, five rotationally asymmetric reflecting surfaces are used to make correction for decentration aberrations. However, the examples are all directed to a binocular with a narrow angle of view. Most cameras, whether they are of the single-focus type or of the zoom type, include a wide-angle system (with a focal length of about 25 mm to about 40 mm and a half angle of view of 28.4° to 40.8° as calculated on the basis of 35-mm film), and so this system cannot immediately be applied thereto. An increased angle of view causes increases in the effective areas of the reflecting surfaces of a prism, which in turn cause an increase in the size of the prism with increasing amounts of aberrations due to an increased angle of reflection at the reflecting surfaces. In the scope of the invention disclosed in this publication, it is thus difficult to achieve a finder having a large angle of view. In addition, this publication fails to disclose the makeup of the ocular optical subsystem or take the whole size of the optical system into consideration.

In the system set forth in JP-A 10-197705, too, rotationally asymmetric reflecting surfaces are used. However, this system is an optical system for binocular purposes as in the above prior arts, and so can hardly be applied to a finder due to its narrow angle of view.

JP-A 10-197796 teaches how the prism should be located and constructed so as to enable the finder system to be reduced in size. However, this is little achievable because performance is not taken into account.

Thus, all the prior arts have problems in connection with performance and size, and never until now is any compact yet high-performance finder capable of solving these problems at the same time achievable.

SUMMARY OF THE INVENTION

In view of such prior art problems as explained above, an object of the present invention is to provide a high-performance real-image type finder optical system which is reduced in size in general and thickness in particular.

According to the first aspect of the invention accomplished so as to achieve the aforesaid object, there is provided a finder optical system comprising, in order from an object side thereof, an objective optical subsystem having a positive refracting power, an image-inversion means for erecting a real image formed by said objective optical subsystem having only one image-formation action to an erect image, and an ocular optical subsystem having a positive refractive power, with at least one of reflecting surfaces being defined by a roof surface, characterized in that:

said objective optical subsystem comprises at least two reflecting surfaces, each defined by a rotationally asymmetric surface having a power, and at least one of said reflecting surfaces is defined by a reflecting surface that is not the same surface as a transmitting surface, with said at least one reflecting surface satisfying the following condition (1):

$$5° < |\theta| < 25° \tag{1}$$

where θ is an angle of reflection of an axial chief ray with respect to a normal to the reflecting surface that is not the same surface as a transmitting surface.

According to the second aspect of the invention accomplished so as to achieve the aforesaid object, there is provided a finder optical system comprising, in order from an object side thereof, an objective optical subsystem having a positive refracting power, an image inversion means for erecting a real image formed by said objective optical subsystem having only one image formation action to an erect image, and an ocular optical subsystem having a positive refractive power, with at least one of reflecting surfaces being defined by a roof surface, characterized in that:

said objective optical subsystem comprises at least a plurality of reflecting surfaces, each defined by a rotationally asymmetric surface having a power, and at least two of said reflecting surfaces are each defined by a reflecting surface that is not the same surface as a transmitting surface, with at least one of said at least two reflecting surfaces satisfying the following condition (3):

$$5° < |\theta| < 45° \tag{3}$$

where θ is an angle of reflection of an axial chief ray with respect to a normal to the reflecting surface that is not the same surface as a transmitting surface.

In what follows, a detailed account will be given of why the aforesaid arrangements are used in the first and second aspects of the invention and how they act.

For a real-image type finder optical system, it is structurally required that an image-inversion optical subsystem be located in an optical path. In many cases, the image-inversion optical subsystem is located between an objective optical subsystem and an ocular optical subsystem to ensure a certain number of reflecting surfaces and a field mask is disposed on an intermediate image-formation plane to set out a visual field, as already explained in the "prior art". For this reason, there is generally used an arrangement wherein one prism is located between the objective optical subsystem and the intermediate image-formation plane, and between the intermediate image-formation plane and the ocular optical subsystem, respectively. However, such an arrangement has the following problems in reducing the size of the finder.

The first problem arises in connection with the location of the objective optical subsystem, and the ocular optical subsystem. This is unfavorable for reducing the thickness of a camera, because a refracting lens must be located on an axis parallel with an entrance axis for the reason already explained in conjunction with the prior art. In a zoom optical system in particular, the objective optical subsystem is likely to become long, resulting in an adverse influence on the slimming-down of the camera.

The second problem arises in connection with the construction of the image-inversion optical subsystem. In the invention where one surface in the image-inversion optical subsystem is defined by a roof surface, any practical arrangement cannot be obtained without using at least three reflecting surfaces throughout the optical system. In other words, the objective and ocular optical subsystems must be built up in such a manner that they can be located in an optical path. However, the short focal length of the objective optical subsystem makes it difficult to gain any satisfactory back focus, and so makes it difficult to ensure an increased number of reflecting surfaces. For this reason, some considerable limitations are imposed on the construction of a prism located on the objective optical subsystem side, the angle of turning-back of the optical path, etc. This is a leading factor of making the downsizing of a finder optical system difficult.

Thus, the construction of the objective optical subsystem in particular is a grave impediment to the achievement of finder size reductions.

In the present invention, power is imparted to a reflecting surface in a reflecting optical subsystem which has been located so far on an objective optical subsystem side with no power given thereto, so that the reflecting optical subsystem is allowed to play a role as an objective optical subsystem, thereby shortening the length of the objective optical subsystem in the thickness direction of a camera and making it easy to locate a principal point within an image-inversion optical subsystem having reflecting surfaces with powers imparted thereto, so that the reflecting surfaces can easily be ensured. This enables the optical system to be effectively downsized.

However, the reflecting surfaces in the finder optical system are decentered at large angles with respect to axial chief rays; that is, their optical paths are turned back. For this reason, the imparting of powers to the reflecting surfaces gives rise to considerable decentration aberration which is not found in a co-axial optical system, causing the performance of the finder optical system to become worse. This decentration aberration cannot be corrected by use of a conventional rotationally symmetric surface configuration, for instance, a rotationally symmetric aspheric surface.

The definition of a decentration system, and decentration aberration are now explained.

Here let a Z-axis be an optical axis defined by a straight line section of the axial chief ray terminating at the first surface of an optical system, a Y-axis be an axis that is perpendicular to the Z-axis and lies in a decentered plane of each of the surfaces forming a phototaking optical system, and an X-axis be an axis that is perpendicular to both the optical axis and the Y-axis. The light ray is traced in the forward direction from an object toward an image plane.

Generally, a spherical lens system constructed only of spherical lenses is designed such that spherical aberration produced at the spherical lenses and aberrations such as coma and field curvature are mutually corrected at some surfaces, thereby reducing the aberrations throughout the system.

To make satisfactory correction for aberrations with a limited number of surfaces, on the other hand, rotationally symmetric aspheric surfaces, etc. are used. This is to reduce various aberrations produced at the spherical surfaces.

In a decentered optical system, however, it is impossible to make correction for rotationally asymmetric aberrations produced by decentration with a rotationally symmetric optical system. The rotationally asymmetric aberrations produced by decentration, for instance, include distortion and field curvature as well as axial astigmatism and coma.

An account is first given of rotationally asymmetric field curvature. For instance, assume that a ray from an object point at infinity is reflected at a decentered concave mirror upon incidence thereon to form an image. Then, the back focal length of the concave mirror from its portion on which the ray is incident to an image plane is half of the radius of curvature of the portion on which the ray strikes, when there is air on the image plane side. Thereupon, the resultant image plane tilts with respect to the axial chief ray, as shown in FIG. 27. With a rotationally symmetric optical system, it is thus impossible to make correction for the rotationally asymmetric field curvature.

To make correction for this tilting field curvature with a concave mirror M per se, which is a field curvature source, it is required to construct the concave mirror M of a rotationally asymmetric surface. Furthermore in this example, it is required to make curvature (refracting power) strong in the positive Y-axis direction and make curvature (refracting power) weak in the negative Y-axis direction. If a rotationally asymmetric surface having the same effect as in the aforesaid arrangement is incorporated together with the concave mirror M in the optical system, it then possible to obtain a flat image plane with the use of a reduced number of surfaces.

In view of correction of aberrations, it is preferable to use a rotationally asymmetric surface having no axis of rotational symmetry both within and without the plane, because the degree of freedom is increased.

Then, an account is given of rotationally asymmetric astigmatism.

As in the foregoing, the decentered concave mirror M also produces astigmatism with respect to the axial chief ray, as shown in FIG. 28. Correction of this astigmatism may be made by properly varying the curvatures of the rotationally asymmetric surface in the X- and Y-axis directions, as in the foregoing.

Subsequently, an account is given of rotationally asymmetric coma.

As in the foregoing, the decentered concave mirror M also produces coma with respect to the axial chief ray, as shown in FIG. 29. Correction of this coma may be made by varying the inclination of the rotationally asymmetric surface farther off the origin of the X-axis and properly altering the inclination of the surface depending on the positive or negative direction of the Y-axis.

In the finder optical system according to the invention, it is also possible to impart power to at least one rotationally asymmetric surface having the aforesaid reflecting action by decentering it with respect to the axial chief ray. With this arrangement, it is possible to make correction for decentration aberrations with the reflecting surface itself, which aberrations are produced by imparting power thereto. It is thus possible to make the power of the refracting surface of a prism weak, thereby reducing the occurrence of chromatic aberrations themselves.

Preferably in the finder optical system of the invention, it is preferable that the member having the aforesaid reflecting action is formed of a prism. This makes it possible to construct the reflecting surface in the form of an integral component and so determine the decentration of the reflecting surface in a component design stage, thereby decreasing fabrication precision to a lower level and curtailing fabrication cost. Because of the back-surface reflection of the prism, it is possible to make the curvature of the reflecting surface weak even when the same power as that by surface reflection is obtained. It is thus possible to make small a Petzval sum having an influence on field curvature, thereby obtaining a flat image plane.

Preferably, the rotationally asymmetric surface used herein should be a free-form surface symmetric with respect to plane, which surface has only one plane of symmetry. As used herein, the free-form surface is defined by the following equation (a). In this regard, it is noted that the axis of the free-form surface is given by the Z-axis in the defining equation.

$$Z = cr^2 / [1 + \sqrt{\{1 - (1+k)c^2 r^2\}}] + \sum_{j=2}^{66} C_j X^m Y^n \quad (a)$$

Here the first term in equation (a) is a spherical term and the second term is a free-form surface term. In the spherical term, c is the vertex curvature, k is the cornic constant (conical constant), and $r=\sqrt{(X^2+Y^2)}$.

The free-form surface term is given by $$\sum_{j=2}^{66} C_j X^m Y^n = C_2 X + C_3 Y +$$

-continued $$C_4X^2 + C_5XY + C_6Y^2 +$$
$$C_7X^3 + C_8X^2Y + C_9XY^2 + C_{10}Y^3 +$$
$$C_{11}X^4 + C_{12}X^3Y + C_{13}X^2Y^2 + C_{14}XY^3 + C_{15}Y^4 +$$
$$C_{16}X^5 + C_{17}X^4Y + C_{18}X^3Y^2 + C_{19}X^2Y^3 +$$
$$C_{20}XY^4 + C_{21}Y^5 +$$
$$C_{22}X^6 + C_{23}X^5Y + C_{24}X^4Y^2 + C_{25}X^3Y^3 +$$
$$C_{26}X^2Y^4 + C_{27}XY^5 + C_{28}Y^6 +$$
$$C_{29}X^7 + C_{30}X^6Y + C_{31}X^5Y^2 + C_{32}X^4Y^3 +$$
$$C_{33}X^3Y^4 + C_{34}X^2Y^5 + C_{35}XY^6 + C_{36}Y^7 \ldots$$

where $C_j$ is a coefficient where j is an integer of 2 or greater.

Generally in the aforesaid free-form surface, both the X-Z plane and the Y-Z plane have no plane of symmetry. In the present invention, however, the free-form surface is allowed to have only one symmetric plane parallel with the Y-Z plane by reducing all the odd-numbered powers with respect to X to zero. In defining equation (a), for instance, this may be achieved by reducing to zero the coefficients of terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ...

Also, the free-form surface is allowed to have only one symmetric plane parallel with the X-Z plane by reducing all the odd-numbered powers with respect to Y to zero. In the aforesaid defining equation, for instance, this may be achieved by reducing to zero the coefficients of terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ...

If a symmetric plane is given by either one of the directions of the aforesaid symmetric plane and, for instance, the optical system is decentered in the Y-axis direction with respect to the symmetric plane parallel with the Y-Z plane and decentered in the X-axis direction with respect to the symmetric plane parallel with the X-Z plane, it is then possible to make effective correction for rotationally asymmetric aberrations produced by decentration and, at the same time, improve productivity.

The aforesaid defining equation (a) is herein referred to as one example as already mentioned. The present invention is characterized in that by use of a rotationally asymmetric surface having only one plane of symmetry, rotationally asymmetric aberrations produced by decentration are corrected simultaneously with productivity improvements. It is thus to be understood that the same is also true of any other defining equations.

If such a free-form surface as mentioned above is used, it is then possible to make correction for decentration aberration to some extent. To use this free-form surface with an objective optical subsystem in a finder optical system, however, additional conditions should be satisfied.

Generally, finder optical systems used on cameras, etc. include a wide-angle type for single-focus purposes, and a wide-angle type for zoom purposes as well. For this reason, the finder optical systems, too, are required to function as the wide-angle type. Correspondingly, the objective should be designed in such a way as to accommodate to a wide angle of view.

The reflecting surface that is the image-inversion means is largely decentered with respect to the axial chief ray, and so the angle of reflection of a rim ray varies with its direction of incidence; in other words, this angle of reflection is either larger or smaller than the angle of reflection of the axial chief ray. As the angle of view becomes large, the difference in the angle of incidence of the rim ray becomes large. This implies that the amount of decentration aberration produced varies largely with the direction of the rim ray, with the occurrence of asymmetric field curvature and asymmetric distortion in particular. For instance, one of viewing screens becomes blurred or a rectangular object looks like a trapezoidal object. These aberrations cannot well be corrected only by use of a free-form surface when the angle of view is wide as encountered in a finder. Unless the aberrations are well corrected, how the screens are viewed is largely affected. The aberrations must also be fully corrected because even when only a slight aberration remains in the objective optical subsystem in particular, it is largely magnified through the ocular optical subsystem. In other words, the reflecting surface has to be constructed as follows.

For the finder optical system, it is required that light be reflected at a large angle because of the need of turning back its optical path. However, as the angle of reflection becomes large, the amount of decentration aberration produced becomes large. The decentration aberration cannot well be corrected only by use of a single reflecting surface even when it is defined by a free-form surface. In other words, it is required to use at least two reflecting surfaces, each defined by a free-form surface.

The angle of reflection, too, has to be set out as follows.

In some cases, a reflecting surface is constructed of the same surface as a transmitting surface (hereinafter called a common reflecting surface). When a light ray is reflected and bent at such a surface, it is preferred to make the angle of incidence of the light ray on the surface greater than the angle of total reflection, thereby totally reflecting the light ray. However, the imparting of power to a surface having a large angle of reflection renders it difficult to obtain well-balanced performance because the decentration aberration produced thereat becomes large. In addition, the angle of incidence of rim rays becomes small due to strong curvature. This, too, makes the total reflection of all light beams difficult.

In consequence, attention is directed to a reflecting surface independent of a transmitting surface, which has an unlimited angle of reflection (hereinafter referred to as the independent reflecting surface). If, as in the first aspect of the invention, the reflecting surface independent of the transmitting surface is constructed of at least one surface, it is then possible to diminish the angle of reflection at the independent reflecting surface and, hence, reduce the amount of decentration aberration produced even when strong power is imparted thereto. This is favorable in consideration of performance. Accordingly, the independent reflecting surface should preferably satisfy the following condition (1):

$$5° < |\theta| < 25° \tag{1}$$

where $\theta$ is the angle of reflection of the axial chief ray with respect to the normal to the reflecting surface that is not the same surface as the transmitting surface.

When the lower limit of 5° in this condition is not reached, the optical path cannot effectively be turned back, resulting in a failure in achieving finder size reductions. When the upper limit of 25° is exceeded, any high performance cannot be achieved due to too large an amount of decentration aberration produced at the independent reflecting surface.

More preferably, the independent reflecting surface has to satisfy the following condition (2):

$$5° < |\theta| < 21.5° \tag{2}$$

If, as in the second aspect of the invention, the reflecting surface independent of the transmitting surface is constructed of at least two surfaces, well-balanced aberrations and, hence, high performance will be expected because of cancellation of decentration aberrations by two such surfaces. However, too large an angle of reflection may place aberrations in a well-balanced state, but makes the amount of aberration produced at each surface large and so makes performance likely to become worse, when surface precision drops or decentration errors occur. This is not preferable because extra expenses are incurred without placing fabrication precision under strict control. Thus, at least one surface of two or three independent reflecting surfaces should preferably satisfy the following condition (3):

$$5° < |\theta| < 45° \quad (3)$$

where θ is the angle of reflection of the axial chief ray with respect to the normal to the reflecting surface that is not the same surface as the transmitting surface.

When the lower limit of 5° in this condition is not reached, the optical path cannot effectively be turned back, resulting in a failure in achieving finder size reductions. When the upper limit of 45° is exceeded, on the other hand, deterioration become noticeable due to errors caused by an increase in the amount of aberrations produced at the independent reflecting surface.

More preferably, the independent reflecting surfaces have to satisfy the following condition (4):

$$5° < |\theta| < 37° \quad (4)$$

According to the first and second aspects of the invention as explained above, it is possible to achieve a real-image type finder which has high performance although it is smaller in size than a conventional finder arrangement.

Then, some specific constructions of the objective optical subsystem are explained. As already mentioned, compactness is achievable by adding power to the reflecting surface (s) in the reflection optical subsystem disposed in the objective optical subsystem. However, if any proper optical path is not provided in constructing the reflection optical subsystem with power imparted to a reflecting surface(s), no compactness may then be obtained because of a size increase in the thickness direction of a camera, or an increase in the size of an effective area of the reflecting surface, which may otherwise cause an increase in the size of a prism itself. This problem can be solved according to the third to eighth aspects of the invention wherein the number of reflections and the optical path are properly determined so that the reflection optical subsystem having power can be downsized, as explained below.

According to the third aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, each of which is defined by a rotationally asymmetric surface, with a second reflecting surface being defined by the same surface as a first transmitting surface and a first reflecting surface satisfying the following condition (5):

$$5° < |\theta| < 25° \quad (5)$$

where θ is an angle of reflection of an axial chief ray with respect to a normal to the first reflecting surface.

In what follows, why such an arrangement is used in the third aspect of the invention and how it acts will be explained.

To reflect all light beams from the center of a picture plane to the periphery of the picture plane when constructing the reflecting surfaces, it is required to make the effective areas of the reflecting surfaces independent of each other. Otherwise, the picture plane may often be shaded due to a failure in reflecting light rays. In the objective optical subsystem of the invention having a relatively large angle of view, however, the effective areas of the reflecting surfaces are likely to become large due to the large divergence of light beams. To make the reflecting surfaces independent of each other, it is required to increase the angle of reflection or make the spacing between the reflecting surfaces large, resulting in an increase in the size of the reflection optical subsystem.

For this reason, therefore, a light ray refracted through the first transmitting surface is reflected at the first reflecting surface. The resultant reflected light is again reflected at the second reflecting surface defined by the same surface as the first transmitting surface, and then refracted through the second transmitting surface. In the present invention, it is thus possible to construct the second reflecting surface in such a way that the light ray is totally reflected thereat. That is, it is not necessary to provide the effective area of the first transmitting surface separately from the effective area of the second reflecting surface and, hence, it is not necessary to make the spacing between the first transmitting surface and the first reflecting surface large or make the angle of reflection at the first reflecting surface. According to the third aspect of the invention, it is thus possible to obtain an objective optical subsystem downsized in the thickness direction of a camera.

In addition, the prism used herein is made up of two reflecting surfaces, at one of which light can be totally reflected, so that a bright finder optical system can be obtained with reduced light quantity losses. This aspect of the invention has another merit in that the size of the finder optical system is unlikely to increase in the thickness direction of a camera even when the effective areas of the reflecting surfaces are increased for wide-angle purposes, because the second reflection surface is the same as the first transmitting surface.

As already explained with reference to the first aspect of the invention, the reflecting surface independent of the transmitting surface is made up of one surface, and so the amount of decentration aberration produced must be controlled. To this end, the following condition (5) should preferably be satisfied.

$$5° < |\theta| < 25° \quad (5)$$

where θ is the angle of reflection of the axial chief ray with respect to the normal to the first reflecting surface.

When the lower limit of 5° in this condition is not reached, the optical path cannot effectively be turned back, resulting in a failure in achieving finder size reductions. When the upper limit of 25° is exceeded, on the other hand, any high performance cannot be achieved because the amount of decentration aberration produced at the independent reflecting surface is too large.

More preferably, the first reflecting surface should satisfy the following condition (6):

$$5° < |\theta| < 21.5° \quad (6)$$

According to the third aspect of the invention as explained above, it is possible to achieve a slimmed-down, bright yet high-performance real-image type finder.

According to the fourth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical system comprises a prism comprising three reflecting surfaces, at least two reflecting surfaces of which are each defined by a rotationally asymmetric surface, with a first reflecting surface being defined by the same surface as a second transmitting surface and a third reflecting surface being defined by the same surface as a first transmitting surface, and the second reflecting surface of said reflecting surfaces of said prism has a strongest power.

In what follows, why such an arrangement is used in the fourth aspect of the invention and how it acts will be explained.

Referring here to a prior art objective optical subsystem, it is difficult to obtain any satisfactory back focus and ensure many reflecting surfaces because of its short focal length, as stated with reference to the first and second aspects of the present invention. The back focus may not be obtained without scarifying design performance or may be ensured by increasing the number of lenses. Consequently, the given number of reflections must be ensured in an ocular optical subsystem, and so excessive loads are applied on its design. On the other hand, the increase in the number of reflections causes an optical path to be extended, and so makes the volume of a prism likely to become large.

In this aspect of the invention, a light ray refracted through the first transmitting surface is reflected at the first reflecting surface. The resulting reflected light is reflected at the second reflecting surface, and then reflected at the third reflecting surface formed of the same surface of the first transmitting surface. The resultant reflected light is finally refracted through the second transmitting surface formed of the same surface as the first reflecting surface. In this aspect of the invention, it is thus possible to ensure the number of reflections relatively easily without applying loads on design performance, because the principal point of the objective optical subsystem is moved into the prism by imparting powers to the reflecting surfaces. Furthermore, it is possible to make the volume of the prism extremely small relative to the number of reflections, because the optical path can make one rotation in the prism.

In this aspect of the invention, the first and third reflecting surfaces should preferably be constructed in such a manner that total reflection occurs thereat. In this case, it is required to make the angle of incidence of light on them greater than the total angle of reflection. In consideration of correction of aberrations, it is not preferable to increase the powers of the reflecting surfaces, as stated with reference to the first and second aspects of the present invention. It is thus preferable to impart the strongest powers to the second reflecting surface of the three reflecting surfaces of the prism.

According to the fourth aspect of the invention, light can be totally reflected at two reflecting surfaces, irrespective of the fact that the prism is constructed of three reflecting surfaces. It is thus possible to obtain a bright finder optical system with extremely reduced light quantity losses.

According to the fourth aspect of the invention as explained above, it is possible to achieve a bright yet high-performance real-image type finder having a reduced volume.

According to the fifth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising three reflecting surfaces, at least two reflecting surfaces of which are each defined by a rotationally asymmetric surface, with a second reflecting surface being defined by the same as a second transmitting surface or both a first transmitting surface and a second transmitting surface.

In what follows, why such an arragement is used in the fifth aspect of the invention and how it acts will be explained.

The size of intermediate image-formation by an objective optical subsystem in a finder optical system is determined by its specification. In consideration of the slimming-down of a camera, it is unfavorable to locate the objective optical subsystem vertically with respect to an entrance axis, because the thickness direction of the camera cannot in principle be made smaller than the height of intermediate image-formation. Too many reflections, on the other hand, cause an optical path to become long, and so makes the volume of a prism likely to become large.

In the fifth aspect of the invention, therefore, a light ray refracted through the first transmitting surface is reflected at the first reflecting surface. The resultant reflected light is reflected at the second reflecting surface, and then reflected at the third reflecting surface. The resulting reflected light is finally refracted through the second transmitting surface made up of the same surface as the second reflecting surface. Alternatively, the light ray refracted through the first transmitting surface is reflected at the first reflecting surface. The resultant reflected light is reflected at the second reflecting surface made up of the same surface as the first transmitting surface, and then reflected at the third reflecting surface. The resulting reflected light is finally refracted through the second transmitting surface made up of the same as the first transmitting surface, and the second reflecting surface. According to this aspect of the invention, it is thus possible to totally reflect light at the second reflecting surface; that is, it is not necessary to provide the effective entrance portion of the second reflecting surface separately from the effective area of the second transmitting surface or both the effective areas of the first and second transmitting surfaces. It is accordingly not necessary to widen the separations between the second transmitting surface and the second transmitting surface and between the first transmitting surface and the second reflecting surface or enlarge the angle of reflection of light at the second reflecting surface. According to the fifth aspect of the invention, it is thus possible to achieve an objective optical subsystem made small in the thickness direction of the camera.

According to the fifth aspect of the invention, it is also possible to extend the exit axis of the objective optical subsystem parallel with the entrance axis, thereby achieving an extremely slimmed-down arrangement wherein the size of the camera in the thickness direction is little affected by the size of an intermediate image-formation plane.

If the objective optical subsystem is constructed using two independent reflecting surfaces, decentration aberrations produced thereat can then cancel each other out, so that the degree of freedom in the angle of reflection can increase with an increase in the degree of freedom in designing the optical path.

Especially when the directions of incidence and emergence of an axial chief ray are made parallel with each other, the objective optical subsystem can then be manipulated as a part of a zoom optical system.

According to the fifth aspect of the invention as explained above, it is thus possible to obtain an extremely slimmed-down yet high-performance real-image type finder.

According to the sixth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising four reflecting surfaces, at least two reflecting surfaces of which are each defined by a rotationally asymmetric surface, with a second reflecting surface being defined by the same surface as a first transmitting surface and a third reflecting surface being defined by the same surface as a second transmitting surface.

In what follows, why such an arrangement is used in the sixth aspect of the invention and how it acts will be explained.

An optical path in a finder optical system may be largely altered by increasing the number of reflections. However, the increased number of reflections often makes a prism likely to become large. An objective optical subsystem, on the other hand, is difficult to achieve a long optical path length and, hence, to make sure of many-enough reflections because of its short focal length.

In the sixth aspect of the invention, therefore, a light ray refracted through the first transmitting surface is reflected at the first reflecting surface. The resultant reflected light is reflected at the second reflecting surface made up of the same surface as the first transmitting surface, then at the third reflecting surface, and then at the fourth reflecting surface. The resulting reflected light is finally refracted through the second transmitting surface made up of the same surface of the third reflecting surface.

According to this aspect of the invention, it is thus possible to totally reflect light at the second and third reflecting surfaces and, hence, to achieve an objective optical subsystem which can be made small in the thickness direction of a camera irrespective of the fact that the number of reflections is as many as four.

According to this aspect of the invention, it is also possible to make the exit axis of the objective optical subsystem parallel with the entrance axis thereof, as in the fifth aspect of the invention. It is thus possible to achieve an extremely slimmed-down arrangement wherein the size of the camera in the thickness direction is little affected by the size of intermediate image-formation.

If the objective optical subsystem is constructed using two independent reflecting surfaces as in the fifth aspect of the invention, decentration aberrations produced thereat can then cancel each other out as explained with reference to the second aspect of the invention, so that the degree of freedom in the angle of reflection can increase with an increase in the degree of freedom in designing the optical path. Especially when the directions of incidence and emergence of an axial chief ray are made parallel with each other, the objective optical subsystem can then be manipulated as a part of a zoom optical system.

According to the sixth aspect of the invention as explained above, it is thus possible to obtain an extremely slimmed-down yet high-performance real-image type finder.

According to the seventh aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising reflecting surfaces, each of which is defined by a rotationally asymmetric surface, with first and second reflecting surfaces being independent of first and second transmitting surfaces, and having a power of the same sign.

In what follows, why such an arrangement is used in the seventh aspect of the invention and how it acts will be explained.

An effective turning-back of an optical path in a finder optical system is often achieved by increasing the angle of reflection or the number of reflecting surfaces. However, the increased angle of reflection causes the effective areas of reflection surfaces to become large, resulting in prism size increases, and the imparting of powers to the reflecting surfaces makes decentration aberrations likely to occur thereat. The increased number of reflecting surfaces, on the other hand, causes transfer of accumulated surface precision errors and decentration errors, which is unfavorable in view of fabrication.

In this aspect of the invention, therefore, a light ray refracted through the first transmitting surface is reflected at the first reflecting surface, and the resultant reflected light is reflected at the second reflecting surface, and then refracted through the second transmitting surface. Herein the first and second reflecting surfaces are defined by surfaces independent of the transmitting surfaces.

According to the seventh aspect of the invention wherein all the reflecting surfaces are defined by surfaces independent of the transmitting surfaces, it is thus possible to allow an optical path to cross over itself in the prism, thereby enabling an effective yet large turning-back of the optical path without increasing the angle of reflection of light at each reflecting surface. An additional merit of this aspect is that performance deterioration can be reduced even when surface precision errors or decentration errors occur, because the angle of reflection of light at each reflecting surface is so relatively small that the amount of decentration aberration produced can be reduced in itself. For the same reason, performance deterioration is unlikely to occur even when the angle of reflection of rim rays becomes large to a certain extent in an wide-angle arrangement.

In this case, however, it is not preferable the first and second reflecting surfaces have a negative/positive power construction or a positive/negative power construction, because the powers of the surfaces must be increased to keep the power of the optical system intact, resulting in an increase in the amount of aberrations produced. Stated otherwise, it is not necessary to impart powers of opposite signs to the reflecting surfaces because the reflecting surfaces are free from chromatic aberration; it is preferable to impart the power of the same sign to the reflecting surfaces in a power-divided manner.

According to the seventh aspect of the invention as explained above, it is thus possible to achieve a high-performance real-image type finder which is little affected by fabrication errors, and is of small size as well.

According to the eighth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising three reflecting surfaces, at least two reflecting surfaces of which are each defined by a rotationally asymmetric surface, with all first to third reflecting surfaces being defined by surfaces independent of first and second transmitting surfaces.

In what follows, why such an arrangement is used in the eighth aspect of the invention and how it acts will be explained.

For the objective optical subsystem in a finder optical system, it is required to make full correction for aberrations as already stated, because the aberrations are magnified through the ocular optical subsystem. As explained with reference to the first aspect of the invention, however, decentration aberration cannot always be well corrected only by use of an increased number of reflecting surfaces defined by the same surfaces as transmitting surfaces.

In this aspect of the invention, therefore, a light ray refracted through the first transmitting surface is reflected at the first reflecting surface. The resultant reflected light is reflected at the second reflecting surface and then at the third reflected surface. Finally, the resulting reflected light is refracted through the second transmitting surface. Thus, the first to third reflecting surfaces are defined by surfaces independent of the transmitting surfaces.

In this aspect of the invention, the three reflecting surfaces are defined by surfaces independent of the transmitting surfaces; the objective optical subsystem can be made up of three surfaces having relatively small angles of reflection because any limitations such as total reflection are not imposed on the angle of reflection. It is thus possible to make full correction of decentration aberration. It is also possible to alter the angle of reflection in a relatively free manner by controlling the power of each reflecting surface because of the degree of freedom in each reflecting surface. In other words, this aspect of the invention makes it possible to construct a high-performance finder optical system with well-corrected decentration aberration. According to this aspect of the invention, it is acceptable to construct at least one surface of the three reflecting surfaces as a total-reflection surface, thereby reducing light quantity losses.

According to the eighth aspect of the invention as explained above, it is possible to obtain a downsized yet high-performance real-image type finder.

Some specific embodiments of the finder optical system including an ocular optical subsystem according to the invention will now be explained. As already explained with reference to the first and second aspects of the present invention, the construction of the objective optical subsystem is important for the size reduction of the finder optical system. In some cases, however, the finder optical system cannot be downsized unless the ocular optical subsystem has any proper arrangement. For the finder optical system, it is required to properly determine the number of reflections therein so as to obtain an erect image. With the exception of special finders such as a waist-level finder, it is further required to make an entrance optical axis substantially parallel with an exit optical axis, so that when peering through the viewing screen, the camera operator can observe the same direction as the viewing direction. While the ocular optical subsystem and the image-inversion means disposed there meet these two conditions at the same time, it is required to achieve the size reduction of the finder optical system.

The ninth to seventeenth aspects of the present invention, as explained below, are each directed to an image-inversion mean disposed in an ocular optical subsystem suitable for the objective optical subsystem explained with reference to the third aspect of the invention. In the image-inversion means incorporated in the objective optical subsystem according to the third aspect of the invention, reflection occurs twice; no image inversion occurs. For the present finder optical system comprising a roof surface, it is required that an odd number of reflecting surfaces be provided in the image-inversion means located on the ocular optical subsystem.

According to the ninth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface and a first reflecting surface satisfying the following condition (7), and said ocular optical subsystem comprises a prism comprising three reflecting surfaces, with a first reflecting surface being defined by the same surface as a second transmitting surface and a third reflecting surface being defined by the same surface as a first transmitting surface:

$$5°<|\theta|<25° \tag{7}$$

where $\theta$ is an angle of reflection of an axial chief ray with respect to a normal to the first reflecting surface of said prism in said objective optical subsystem.

According to the tenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a first reflecting surface being defined by the same surface as a second transmitting surface and a third reflecting surface being defined by the same surface as a first transmitting surface, while the following condition (9) is satisfied:

$$0.1 < d/Ih < 2.5 \tag{9}$$

where d is a distance along an axial chief ray from the first transmitting surface to an entrance pupil of said prism in said objective optical subsystem, and Ih is a maximum intermediate image-formation height.

In what follows, why such arrangements are used in the ninth and tenth aspects of the present invention and how they act will be explained.

For such an image-inversion means as explained with reference to the third aspect of the invention, it is difficult to freely alter the direction of exiting the objective optical subsystem if size and performance are taken into account, because the image-inversion means comprises only two reflecting surfaces. It is thus difficult to make the exit optical axis of the finder parallel with the entrance optical axis thereof only by using one reflecting surface for image inversion. If the objective optical subsystem is constructed of five reflecting surfaces, such a problem may be solved. However, it is not only difficult to acquire an optical path length long-enough to construct the ocular optical subsystem of five reflecting surfaces, but the prism becomes large as well. It is thus most preferable to construct the ocular optical subsystem of three reflecting surfaces.

For the ocular optical subsystem, it is possible to acquire some optical path length because it has a longer focal length than the objective optical subsystem. Because the light beam passing through the optical path becomes thick, however, the effective areas of the reflecting surfaces tend to become large; the prism, when constructed of three reflecting surfaces, tends to become large. The increase in the number of reflecting surfaces also gives rise to increased light quantity losses, and so the viewing screen of the finder becomes too dark to view.

In the ocular optical subsystem according to this aspect of the invention, therefore, a light ray refracted through the first transmitting surface is reflected at the first reflecting surface. The resultant reflected light is reflected at the second reflecting surface and then at the third reflecting surface defined by the same surface as the first transmitting surface. Finally, the resulting reflected light is refracted through the second transmitting surface defined by the same surface as the first reflecting surface.

According to this aspect of the invention, it is possible to construct the first and third reflecting surfaces of the same surfaces as the transmitting surfaces, thereby reducing the size of the prism even when the effective areas of the reflecting surfaces become large. Since the first and third reflecting surfaces are constructed as total-reflection surfaces, it is also possible to obtain an ocular optical subsystem which, albeit comprising three surfaces, has extremely reduced light quantity losses.

In the finder optical system, on the other hand, an object is viewed through the ocular optical subsystem once an image thereof is formed in the objective optical subsystem, and a field mask located on an intermediate image plane is viewed only through the ocular optical subsystem. Therefore, if aberrations are corrected in such a way that they can cancel each other out at the objective and ocular optical subsystems, the field mask becomes very difficult to view. It is thus required that the aberrations be independently corrected at the objective and ocular optical subsystems, respectively.

In the ninth aspect of the invention, therefore, it is required that decentration aberration be fully corrected at the objective optical subsystem. In other words, it is preferable to satisfy the following condition (7):

$$5° < |\theta| < 25° \tag{7}$$

where $\theta$ is the angle of reflection of the axial chief ray with respect to the normal to the first reflecting surface in the prism for the objective optical subsystem.

When the lower limit of 5° in this condition is not reached, the optical path cannot effectively be turned back, resulting in a failure in achieving finder size reductions. When the upper limit of 25° is exceeded, any high performance cannot be achieved due to too large an amount of decentration aberration produced at the independent reflecting surface.

More preferably, the following condition (8) should be satisfied:

$$5° < |\theta| < 21.5° \tag{8}$$

On the other hand, although the ocular optical subsystem may be downsized as explained above, the effective areas of the reflecting surfaces in the objective optical subsystem tend to become large because of its large angle of view, resulting in a prism size increase. In the tenth aspect of the invention, therefore, it is preferable to satisfy the following condition (9):

$$0.1 < d/Ih < 2.5 \tag{9}$$

where d is the distance along the axial chief ray from the first transmitting surface to the entrance pupil in said prism for said objective optical subsystem, and Ih is the maximum height of the intermediate image.

When the lower limit of 0.1 in this condition is not reached, the height of marginal rays incident on the first transmitting surfaces becomes too small to correct aberrations at the periphery of the viewing screen. When the upper limit of 2.5 is exceeded, the height of marginal rays incident on the first transmitting surface becomes too large, resulting unavoidably in a prism size increase.

More preferably, the following condition (10) should be satisfied:

$$0.2 < d/Ih < 1.2 \tag{10}$$

It is acceptable to construct these reflecting surfaces of free-form surfaces with powers imparted thereto.

According to the eleventh aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, in which an axial chief ray does not cross over itself, and all first, second and third reflecting surfaces are defined by surfaces independent of first and second transmitting surfaces.

According to the twelfth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a first reflecting surface being defined by the same surface as a second transmitting surface, and all first, and a third reflecting surface being defined by a surface independent of first and second transmitting surfaces.

According to the thirteenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a second reflecting surface being defined by the same surface as a second transmitting surface.

According to the fourteenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a second reflecting surface being defined by the same surface as a first transmitting surface.

According to the fifteenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a third reflecting surface being defined by the same surface as a first transmitting surface, and all first, and a first reflecting surface being defined by a surface independent of first and second transmitting surfaces.

According to the sixteenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a first reflecting surface being defined by the same surface as a second transmitting surface and a second reflecting surface being defined by the same surface as the first transmitting surface.

According to the seventeenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a second reflecting surface being defined by the same surface as a second transmitting surface, and a third reflecting surface being defined by the same surface as a first transmitting surface.

In what follows, why such arrangements are used in the eleventh to seventeenth aspects of the invention and how they act will be explained.

In the ocular optical subsystem, the reflecting surfaces tend to become large because the light beam passing through it is larger than that passing through the objective optical subsystem; the prism becomes large unless the reflecting surface are not properly located. When the axial chief ray crosses over itself in the prism to allow its optical path to make one rotation, the prism may often become large in the thickness direction of a camera, although depending on how the reflecting surfaces are located.

In the eleventh aspect of the invention, therefore, a light ray refracted through the first transmitting surface is reflected at the first reflecting surface. The resultant reflected light is reflected at the second reflecting surface and then at the third reflecting surface. The resulting reflected light is finally refracted through the second transmitting surface. It is thus possible to prevent the axial chief ray from crossing over itself in the prism.

According to this aspect of the invention wherein the axial chief ray does not make one rotation in the prism, it is thus possible to prevent the prism from becoming large in the thickness direction of the camera even when the effective areas of the reflecting surfaces become large. Because the first to third reflecting surfaces are all defined by surfaces independent of the transmitting surfaces, it is also possible to alter the direction of reflection in a relatively free manner, resulting in some contributions to size reductions. It is acceptable to construct these reflecting surfaces of free-form surfaces with powers imparted thereto.

In the ocular optical subsystem according to the twelfth aspect of the invention, a light ray refracted through the first transmitting surface is reflected at the first reflecting surface, then at the second reflecting surface and then at the third reflecting surface, and is finally refracted through the second transmitting surface defined by the same surface as the first reflecting surface, while the effect explained with reference to the eleventh aspect of the invention is maintained. It is thus possible to construct the second reflecting surface of the same surface as the first transmitting surface, thereby achieving finder size reductions, because there is no need of providing the second transmitting surface located nearest to the pupil and having an increased effective area separately from the first reflecting surface. It is also possible to construct the first reflecting surface as a total-reflection surface, thereby reducing light quantity losses. Alternatively, these reflecting surfaces may be constructed as free-form surfaces with powers imparted thereto. In particular, the second and third surfaces can be reduced in terms of the angle of reflection. This is favorable in view of performance because even when powers are imparted to the first and third surfaces, decentration aberrations produced thereat are not very large.

In the ocular optical subsystem according to the thirteenth aspect of the invention, a light ray refracted through the first transmitting surface is reflected at the first reflecting surface, then at the second reflecting surface and then at the third reflecting surface, and is finally refracted through the second transmitting surface defined by the same surface as the second reflecting surface, while the effect explained with reference to the eleventh aspect of the invention is maintained. It is thus possible to construct the second reflecting surface of the same surface as the second transmitting surface, thereby reducing the size of the finder in the thickness direction, because there is no need of providing the second reflecting surface located relatively near to a pupil (eye point) and having an increased effective reflecting area separately from the second transmitting surface located nearest to the pupil (eye point) and having an increased effective reflecting area. It is also possible to construct the second reflecting surface as a total-reflection surface, thereby reducing light quantity losses. Alternatively, it is acceptable to construct these reflecting surfaces as free-form surfaces with powers imparted thereto. In particular, the first and third surfaces can be reduced in terms of the angle of reflection. This is favorable in view of performance because even when powers are imparted to the second and third surfaces, decentration aberrations produced thereat are not very large.

In the ocular optical subsystem according to the fourteenth aspect of the invention, a light ray refracted through the first transmitting surface is reflected at the first reflecting surface, then at the second reflecting surface defined by the same surface as the first transmitting surface and then at the third reflecting surface, and is finally refracted through the second transmitting surface, while the effect explained with reference to the eleventh aspect of the invention is maintained. It is thus possible to construct the second reflecting surface of the same surface as the first transmitting surface, thereby reducing the size of the finder in the thickness direction, because there is no need of providing the second reflecting surface and the first transmitting surface separately from each other by increasing the angle of the first reflecting surface or enlarging the spacing between the first transmitting surface and the first reflecting surface. It is also possible to construct the second reflecting surface as a total-reflection surface, thereby reducing light quantity losses. Alternatively, it is acceptable to construct these reflecting surfaces as free-form surfaces with powers imparted thereto. In particular, the first and third surfaces can be reduced in terms of the angle of reflection. This is favorable in view of performance because even when powers are imparted to the first and third surfaces, decentration aberrations produced thereat are not very large.

In the ocular optical subsystem according to the fifteenth aspect of the invention, a light ray refracted through the first transmitting surface is reflected at the first reflecting surface, then at the second reflecting surface and then at the third reflecting surface defined by the same surface as the first transmitting surface, and is finally refracted through the second transmitting surface, while the effect explained with reference to the eleventh aspect of the invention is maintained. It is thus possible to construct the third reflecting surface of the same surface as the first transmitting surface, thereby reducing the size of the finder in the thickness direction, because there is no need of providing the third reflecting surface and the first transmitting surface separately from each other by increasing the angle of the second reflecting surface or enlarging the spacing between the first and second reflecting surfaces or the second and third reflecting surfaces. It is also possible to construct the third reflecting surface as a total-reflection surface, thereby reducing light quantity losses. Alternatively, it is acceptable to construct these reflecting surfaces as free-form surfaces with powers imparted thereto. In particular, the first and second surfaces can be reduced in terms of the angle of reflection. This is favorable in view of performance because even when powers are imparted to the first and second surfaces, decentration aberrations produced thereat are not very large.

In the ocular optical subsystem according to the sixteenth aspect of the invention, a light ray refracted through the first transmitting surface is reflected at the first reflecting surface, then at the second reflecting surface defined by the same surface as the first transmitting surface and then at the third reflecting surface, and is finally refracted through the second transmitting surface defined by the same surface as the first reflecting surface, while the effect explained with reference to the eleventh aspect of the invention is maintained. It is thus possible to accomplish the twelfth and fourteenth aspects of the invention at the same time, thereby achieving an extremely slimmed-down finder optical system. Especially because, in this aspect of the invention, two reflecting surfaces, i.e., the first and second reflecting surfaces can be constructed as total-reflection surfaces, it is possible to achieve a finder optical system which is extremely reduced in terms of light quantity losses, albeit being made up of as many as three reflecting surfaces. Alternatively, it is acceptable to construct these reflecting surfaces as free-form surfaces with powers imparted thereto. In particular, the third surface can be reduced in terms of the angle of reflection. This is favorable in view of performance because even when power is imparted to the third surface, decentration aberration produced thereat is not very large.

In the ocular optical subsystem according to the seventeenth aspect of the invention, a light ray refracted through the first transmitting surface is reflected at the first reflecting surface, then at the second reflecting surface defined by the same surface as the second transmitting surface and then at the third reflecting surface defined by the same surface as the first transmitting surface, and is finally refracted through the second transmitting surface defined by the same surface as the second reflecting surface, while the effect explained with reference to the eleventh aspect of the invention is maintained. It is thus possible to accomplish the thirteenth and fifteenth aspects of the invention at the same time, thereby achieving an extremely slimmed-down finder optical system. Especially because, in this aspect of the invention, two reflecting surfaces, i.e., the first and third reflecting surfaces can be constructed as total-reflection surfaces, it is possible to achieve a finder optical system which is extremely reduced in terms of light quantity losses, albeit being made up of as many as three reflecting surfaces. Alternatively, it is acceptable to construct these reflecting surfaces as free-form surfaces with powers imparted thereto. In particular, the first surface can be reduced in terms of the angle of reflection. This is favorable in view of performance because even when power is imparted to the first surface, decentration aberration produced thereat is not very large.

According to the eleventh to seventeenth aspects of the invention as explained above, it is possible to achieve a downsized yet high-performance real-image type finder.

The eighteenth and nineteenth aspects of the present invention, as explained below, are each directed to an image-inversion mean disposed in an ocular optical subsystem suitable for the objective optical subsystem explained with reference to the fourth aspect of the invention. In the image-inversion means incorporated in the objective optical subsystem according to the fourth aspect of the invention, reflection occurs three times; image inversion occurs. For the present finder optical system comprising a roof surface, it is required that an even number of reflecting surfaces be provided in the image-inversion means located on the ocular optical subsystem.

According to the eighteenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising three reflecting surfaces, at least one reflecting surface of which is defined by a rotationally asymmetric surface, with a first reflecting surface being defined by the same surface as a second transmitting surface and a third reflecting surface being defined by the same surface as a first transmitting surface, said second reflecting surface having a strongest power, and said ocular optical subsystem comprises a prism comprising two reflecting surfaces, with a second transmitting surface being defined by the same surface as a first reflecting surface.

In what follows, why such an arrangement is used in the eighteenth aspect of the invention and how it acts will be explained.

Such an image-inversion means as explained with reference to the fourth aspect of the invention comprises three reflecting surfaces. However, if two surfaces of three such reflecting surfaces are constructed as total-reflection surfaces, it is difficult to provide free alteration of the direction of light that leaves the objective optical subsystem. For this reason, if the ocular optical subsystem is not properly constructed, it is then possible to make the exit optical axis parallel with respect to the entrance optical axis of the finder. This problem may be solved by increasing the number of reflecting surfaces. However, too large a number of reflections does not only give rise to an increase in the size of the prism, but also an increase in light quantity losses, which may otherwise cause the viewing screen of the finer to become too dark to view.

In the eighteenth aspect of the invention, therefore, a light ray refracted through the first transmitting surface is reflected at the first reflecting surface. The resultant reflected light is then reflected at the second reflecting surface, and finally refracted through the second transmitting surface defined by the same surface as the first reflecting surface.

According to the eighteenth aspect of the invention, the first reflecting surface is defined by the same surface as the second transmitting surface while the image-inversion means in the ocular optical subsystem is made up of as small as two surfaces. It is thus unnecessary to increase the angle of reflection of light at the first reflecting surface so as to provide the first reflecting surface and the second transmitting surface separately from each other, and so it is easy to make the entrance optical axis parallel with respect to the exit optical axis while achieving finder size reductions. It is also possible to construct the first reflecting surface as a total-reflection surface and, hence, to reduce light quantity losses. In this embodiment, it is acceptable to construct these reflecting surfaces of free-form surfaces with powers imparted thereto.

According to the eighteenth aspect of the invention as explained above, it is possible to obtain a downsized yet high-performance real-image type finder.

According to the nineteenth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising three reflecting surfaces, at least one reflecting surface of which is defined by a rotationally asymmetric surface, with a first reflecting surface being defined by the same surface as a second transmitting surface and a third reflecting surface being defined by the same surface as a first transmitting surface, and said ocular optical subsystem comprises a prism which comprises four reflecting surfaces, and in which an axial chief ray does not cross over itself.

In what follows, why such an arrangement is used in the nineteenth aspect of the invention and how it acts will be explained.

In the ocular optical subsystem, the reflecting surfaces tend to become large with increasing effective areas thereof; in other words, if the reflecting surfaces are not properly constructed, the prism is then likely to become large. Too small a number of reflections narrows the options available to possible optical paths, and so there are some considerable limitations on the location of the reflecting surfaces, etc., which may have an adverse influence on the downsizing of the finder. In addition, when the axial chief ray is allowed to cross over itself in the prism for one rotation of its optical path, the prism often becomes large in the thickness direction of a camera depending on the location of the reflecting surfaces. This is unfavorable for the slimming-down of the prism.

In the nineteenth aspect of the invention, therefore, a light ray refracted through the first transmitting surface is reflected at the first reflecting surface, then at the second reflecting surface, then at the third reflecting surface, and finally at the fourth reflecting surface. The resultant reflected light is eventually refracted through the second transmitting surface, so that the axial chief ray can be prevented from crossing over itself in the prism.

According to the nineteenth aspect of the invention wherein the optical path does not cross over itself in the prism made up of four reflecting surface, it is thus possible to select a proper reflecting surface arrangement depending on various options available to the optical path. It is also possible to achieve an effectively slimmed-down finder optical system because there is no need of locating the reflecting surfaces in the thickness direction of the camera. If the third reflecting surface is defined by the same surface as the second transmitting surface, it is then possible to downsize the prism. If the first and third reflecting surfaces are defined by the same surface as the second transmitting surface, it is then possible to make the prism much smaller. In this embodiment, it is acceptable to construct these reflecting surfaces of free-form surfaces with powers imparted thereto.

According to the nineteenth aspect of the invention as explained above, it is possible to achieve a downsized yet high-performance real-image type finder.

The twentieth aspect of the invention, as explained below, is directed to an image-inversion mean disposed in an ocular optical subsystem suitable for the objective optical subsystem explained with reference to the fifth aspect of the invention. In the image-inversion means incorporated in the objective optical subsystem according to the fifth aspect of the invention, reflection occurs three times; image inversion occurs. For the present finder optical system comprising a roof surface, it is required that an even number of reflecting surfaces be provided in the image-inversion means located on the ocular optical subsystem.

According to the twentieth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising three reflecting surfaces, at least one reflecting surface of which is defined by a rotationally asymmetric surface, with a second reflecting surface being defined by the same surface as both a first transmitting surface and a second transmitting surface, and said ocular optical subsystem comprises a prism comprising two reflecting surfaces, which are all defined by surfaces independent of a first transmitting surface and a second transmitting surface.

In what follows, why such an arrangement is used in the twentieth aspect of the invention and how it acts will be explained.

With such an image-inversion means as explained with reference to the fifth aspect of the invention, it is possible to make the exit optical axis of the objective optical subsystem parallel with the entrance optical axis thereof, thereby reducing the size of the objective optical subsystem in the thickness direction of a camera. In other words, unless the image-inversion means is located in such a manner that the size of the objective optical subsystem does not increase depending on the construction of the ocular optical subsystem, it is then impossible to obtain any slimmed-down finder optical system. Too many reflections do not only cause prism size increases but also an increase in light quantity losses, which may otherwise cause the viewing screen of the finder to become too dark to view.

In the twentieth aspect of the invention, therefore, a light ray refracted through the first transmitting surface is reflected at the first reflecting surface, and then at the second reflecting surface. Finally, the resultant reflected light is refracted through the second transmitting surface.

According to the twentieth aspect of the invention, it is thus possible to reduce the number of reflecting surfaces to two and locate them independently to impart the degree of freedom to the locations of the reflecting surfaces, thereby reducing the size of the prism. The use of less reflecting surfaces is more favorable in terms of light quantity losses than the use of four or more reflecting surfaces. According to this aspect of the invention, it is thus possible to obtain a finder optical system that is reduced in the thickness direction of the camera and takes full advantage of the effect of the fifth aspect of the invention. In this embodiment, it is acceptable to construct these reflecting surfaces of free-form surfaces with powers imparted thereto.

According to the twentieth aspect of the invention as explained above, it is possible to achieve a downsized yet high-performance real-image type finder.

The twenty-first and twenty-second aspects of the invention, as explained below, are each directed to an image-inversion mean disposed in an ocular optical subsystem suitable for the objective optical subsystem explained with reference to the sixth aspect of the invention. In the image-inversion means incorporated in the objective optical subsystem according to the sixth aspect of the invention, reflection occurs four times; no image inversion occurs. For the present finder optical system comprising a roof surface, it is required that an odd number of reflecting surfaces be provided in the image-inversion means located on the ocular optical subsystem.

According to the twenty-first aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising four reflecting surfaces, at least two reflecting surfaces of which are each defined by a rotationally asymmetric surface, with a second reflecting surface being defined by the same surface as a first transmitting surface and a third reflecting surface being defined by the same surface as a second transmitting surface, and said ocular optical subsystem comprises a prism comprising three reflecting surfaces, which are all defined by surfaces independent of a first transmitting surface and a second transmitting surface, with an axial chief ray crossing over itself between a first reflecting surface and a second reflecting surface.

According to the twenty-second aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising four reflecting surfaces, at least two reflecting surfaces of which are each defined by a rotationally asymmetric surface, with a second reflecting surface being defined by the same surface as a first transmitting surface and a third reflecting surface being defined by the same surface as a second transmitting surface, and said ocular optical subsystem comprises a prism comprising three reflecting surfaces, which are all defined by surfaces independent of said first transmitting surface and said second transmitting surface, with an axial chief ray crossing over itself between a second reflecting surface and a third reflecting surface.

In what follows, why such arrangements are used in the twenty-first and twenty-second aspects of the invention and how they act will be explained.

With such an image-inversion means as explained with reference to the sixth aspect of the invention, too, it is possible to make the exit optical axis of the objective optical subsystem parallel with the entrance optical axis thereof, thereby reducing the size of the objective optical subsystem in the thickness direction of a camera. In other words, unless the image-inversion means is located in such a manner that the size of the objective optical subsystem does not increase depending on the construction of the ocular optical subsystem, it is then impossible to obtain any slimmed-down finder optical system. Only by use of one reflecting surface in the sixth aspect of the invention, however, it is difficult to make the exit optical axis of the finder parallel with the entrance optical axis thereof. Such a problem may be solved by use of five reflecting surfaces. However, it is difficult for the ocular optical subsystem to acquire an optical path long-enough for five reflecting surfaces. If this is somehow achievable, increased light quantity losses then cause the viewing screen of the finder to become dark, together with an increase in the size of the prism. It is thus most preferred that the ocular optical subsystem be constructed of three reflecting surfaces.

In the ocular optical subsystem according to the twenty-first aspect of the invention, therefore, a light ray refracted through the first transmitting surface is reflected at the first reflecting surface. The resultant reflected light is reflected at the second reflecting surface, and then at the third reflecting surface. The resulting reflected light is refracted through the second transmitting surface upon crossing over itself between the first reflecting surface and the second reflecting surface. According to the twenty-first aspect of the invention wherein while the reflecting surfaces, provided independent of one another, are so located that there can be obtained a proper optical path allowing the optical system to become small, the exit optical axis of the finder is parallel with the entrance optical axis thereof with the optical axis crossing over itself between the first reflecting surface and the second reflecting surface, it is thus possible to reduce the volume of the prism.

According to the twenty-first aspect of the invention, it is thus possible to obtain a finder optical system that takes full advantage of the effect of the sixth aspect of the invention and is reduced in the thickness direction of the camera.

In the twenty-second aspect of the invention, a light ray refracted through the first transmitting surface is reflected at the first reflecting and then at the second reflecting surface. Upon crossing over itself between the first transmitting surface and the second reflecting surface, the thus reflected light is reflected at the third reflecting surface. The resulting reflected light is refracted through the second transmitting surface. In the twenty-second aspect of the invention, too, it is possible to obtain similar effect or reduce the size of the optical system.

According to the twenty-first and twenty-second aspects of the invention as explained above, it is possible to achieve a downsized yet high-performance real-image type finder.

The twenty-third to twenty-seventh aspects of the invention, as explained below, are each directed to an image-inversion mean disposed in an ocular optical subsystem suitable for the objective optical subsystem explained with reference to the seventh aspect of the invention. In the image-inversion means incorporated in the objective optical subsystem according to the seventh aspect of the invention, reflection occurs twice; no image inversion occurs. For the present finder optical system comprising a roof surface, it is required that an odd number of reflecting surfaces be provided in the image-inversion means located on the ocular optical subsystem.

According to the twenty-third aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, and which are all defined by surfaces independent of a first transmitting surface and a second transmitting surface and have a power of the same sign, and said ocular optical subsystem comprises a prism comprising one reflecting surface.

According to the twenty-fourth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, which are all defined by surfaces independent of a first transmitting surface and a second transmitting surface, and either one of which satisfies the following condition (11), and said ocular optical subsystem comprises a prism comprising one reflecting surface:

$$5° < |\theta| < 45° \tag{11}$$

where θ is an angle of reflection of an axial chief ray with respect to a normal to the first reflecting surface or the second reflecting surface.

According to the twenty-fifth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, and which are all defined by surfaces independent of a first transmitting surface and a second transmitting surface, and said ocular optical subsystem comprises a prism comprising one reflecting surface, while the following condition (13) is satisfied:

$$0.1 < d/Ih < 2.5 \tag{13}$$

where d is a distance along an axial chief ray from the first transmitting surface to an entrance pupil of the prism in said objective optical subsystem, and Ih is a maximum intermediate image-formation height.

Reflecting surfaces are larger than refracting surfaces in terms of the degree of deterioration due to surface precision errors, decentration errors, etc.; the number of reflecting surfaces should preferably be reduced as many as possible. Too many reflecting surfaces also result in a prism size increase.

In the ocular optical subsystem according to this aspect of the invention, therefore, a light ray refracted through the first transmitting surface is reflected at the first reflecting surface. Then, the thus reflected light is refracted through the second transmitting surface. Since only one reflecting surface is used in the ocular optical subsystem, it is thus possible to use a total of three reflecting surfaces throughout the finder optical system, thereby making the finder optical system less susceptible to deterioration due to errors. Since the ocular optical subsystem comprising one reflecting surface is used in combination with the objective optical subsystem according to the seventh aspect of the invention, it is also possible to reduce the size of the prism.

In the finder optical system, on the other hand, an object is viewed through the ocular optical subsystem once an image thereof is formed in the objective optical subsystem, and a field mask located on an intermediate image plane is viewed only through the ocular optical subsystem. Therefore, if aberrations are corrected in such a way that they can cancel each other out at the objective and ocular optical subsystems, the field mask becomes very difficult to view. It is thus required that the aberrations be independently corrected at the objective and ocular optical subsystems, respectively.

In this case, however, it is not preferable the first and second reflecting surfaces of the prism located in the objective optical subsystem have a negative/positive power construction or a positive/negative power construction, because the powers of the surfaces must be increased to keep the power of the optical subsystem intact, resulting in an increase in the amount of higher-order aberrations produced. Stated otherwise, it is not necessary to impart powers of opposite signs to the reflecting surfaces because the reflecting surfaces are free from chromatic aberration and so any deterioration due to the chromatic aberration is not found. In the twenty-third aspect of the invention, therefore, it is preferable to impart the power of the same sign to the reflecting surfaces in a power-divided manner.

In the twenty-fourth aspect of the invention, therefore, it is required that decentration aberration be fully corrected at the objective optical subsystem. In other words, it is preferable to satisfy the following condition (11):

$$5° < |\theta| < 45° \tag{11}$$

where θ is the angle of reflection of the axial chief ray with respect to the normal to the first reflecting surface or the second reflecting surface.

When the lower limit of 5° in this condition is not reached, the optical path cannot effectively be turned back, resulting in a failure in achieving finder size reductions. When the upper limit of 45° is exceeded, any high performance cannot be achieved due to too large an amount of decentration aberration produced at the first or second reflecting surface.

More preferably, the following condition (12) should be satisfied:

$$5° < |\theta| < 20° \tag{12}$$

On the other hand, although the ocular optical subsystem may be downsized as explained above, the effective areas of the reflecting surfaces in the objective optical subsystem tend to become large because of its large angle of view, resulting in a prism size increase. In the twenty-fifth aspect of the invention, therefore, it is preferable to satisfy the following condition (13):

$$0.1 < d/Ih < 2.5 \tag{13}$$

where d is the distance along the axial chief ray from the first transmitting surface to the entrance pupil in said prism for said objective optical subsystem, and Ih is the maximum height of the intermediate image.

When the lower limit of 0.1 in this condition is not reached, the height of marginal rays incident on the first transmitting surfaces becomes too small to correct aberrations at the periphery of the viewing screen. When the upper limit of 2.5 is exceeded, the height of marginal rays incident on the first transmitting surface becomes too large, resulting unavoidably in a prism size increase.

More preferably, the following condition (14) should be satisfied:

$$0.2 < d/Ih < 1.2 \tag{14}$$

In the twenty-third, twenty-fourth and twenty-fifth aspects of the invention, it is acceptable to construct these reflecting surfaces of free-form surfaces with powers imparted thereto.

According to the twenty-third, twenty-fourth and twenty-fifth aspects of the invention as explained above, it is possible to obtain a downsized yet high-performance real-image type finder.

According to the twenty-sixth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, and which are defined by surfaces independent of a first transmitting surface and a second transmitting surface, and said ocular optical subsystem comprises a prism comprising three reflecting surfaces which are all defined by surfaces independent of a first transmitting surface and a second transmitting surface, with an axial chief ray being reflected from a first reflecting surface to an object side.

According to the twenty-seventh aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising two reflecting surfaces, at least one reflecting surface of which is defined by a rotationally asymmetric surface, and which are defined by surfaces independent of a first transmitting surface and a second transmitting surface, and said ocular optical subsystem comprises a prism comprising three reflecting surfaces which are all defined by surfaces independent of a first transmitting surface and a second transmitting surface, with an axial chief ray being reflected from a first reflecting surface to a pupil side.

In what follows, why such arrangements are used in the twenty-sixth and twenty-seventh aspects of the invention and how they act will be explained.

As already explained with reference to the twenty-fifth aspect of the invention, the less the number of reflecting surfaces, the less the deterioration due to fabrication errors. However, when the image-inversion means is made up of one reflecting surface, the size of the finder in the vertical direction with respect to the entrance optical axis thereof becomes large, because the ocular optical subsystem is greater in focal length than the objective optical subsystem. For this reason, the finder optical system tends to become large in the lateral direction. This often offers an undesired design problem, imposing some constraints on the finder layout on a camera, for instance, the position where the finder is peered through.

In the ocular optical subsystem according to the twenty-sixth aspect of the invention, therefore, a light ray refracted through the first transmitting surface is reflected from the first reflecting surface to the object side. The resultant reflected light is reflected at the second reflecting surface and then at the third reflecting surface. The thus reflected light is refracted through the second transmitting surface. Herein the first, second and third reflecting surfaces are defined by surfaces independent of the transmitting surface.

According to the twenty-sixth aspect of the invention wherein the ocular optical subsystem is made up of three reflecting surfaces, it is thus possible to turn back an optical path, thereby reducing the size of the finder in the vertical direction with respect to the entrance optical axis thereof. According to this aspect of the invention, it is also possible to particularly reduce the size of the finder in the thickness direction of a camera because the optical path is once turned back to the object side.

In the twenty-seventh aspect of the invention, a light ray refracted through the first transmitting surface is reflected from the first reflecting surface to the pupil side. The resultant reflecting light is reflected at the second reflecting surface and then at the third reflecting surface. The thus reflected light is then refracted through the second transmitting surface. Herein the first, second and third reflecting surfaces are defined by surfaces independent of the transmitting surfaces.

In the twenty-seventh aspect of the invention, too, similar effects as in the twenty-sixth aspect of the invention are expectable. Especially because the optical path is turned back at the first reflecting surface toward the pupil side, it is possible to extremely reduce the size of the finder in the vertical direction with respect to the entrance optical axis thereof.

In the twenty-sixth and twenty-seventh aspects of the invention, it is acceptable to construct these reflecting surfaces of free-form surfaces with powers imparted thereto.

According to the twenty-sixth and twenty-seventh aspects of the invention as explained above, it is possible to obtain a downsized yet high-performance real-image type finder.

The twenty-eighth and twenty-ninth aspects of the invention, as explained below, are each directed to an image-inversion mean disposed in an ocular optical subsystem suitable for the objective optical subsystem explained with reference to the eighth aspect of the invention. In the image-inversion means incorporated in the objective optical subsystem according to the eighth aspect of the invention, reflection occurs three times; image inversion occurs. For the present finder optical system comprising a roof surface, it is required that an even number of reflecting surfaces be provided in the image-inversion means located on the ocular optical subsystem.

According to the twenty-eighth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising three reflecting surfaces, at least two reflecting surfaces of which is each defined by a rotationally asymmetric surface, and which are all defined by surfaces independent of a first transmitting surface and a second transmitting surface, and said ocular optical subsystem comprises a prism comprising two reflecting surfaces, with a second transmitting surface being defined by the same surface as a first reflecting surface.

In what follows, why such an arrangement is used in the twenty-eighth aspect of the invention and how it acts will be explained.

In the eighth aspect of the invention, the objective optical subsystem is made up of three reflecting surfaces, and so particular care has to be taken of light quantity loses due to revelation. For the ocular optical subsystem that is longer in focal length than the objective optical subsystem, it is difficult to set out an optical path using four reflecting surfaces. The use of four reflecting surfaces is also not preferable for the downsizing of the finder, because the prism tends to become large. It is therefore most preferred that the ocular optical subsystem is made up of two reflecting surfaces.

In the ocular optical subsystem according to the twenty-eighth aspect of the invention, therefore, a light ray refracted through the first transmitting surface is reflected at the first reflecting surface and then at the second reflecting surface. The reflected light is then refracted through the second transmitting surface defined by the same surface as the first reflecting surface.

While the image-inversion means in the ocular optical subsystem is made up of as small as two surfaces, the first reflecting surface is defined by the same surface as the second transmitting surface. It is thus possible to reduce the size of the finder because there is no need of increasing the angle of reflection at the reflecting surface, thereby providing both the surfaces separately from each other. Since the first reflecting surface can be constructed of a total-reflection surface, it is also possible to obtain a finder optical system with limited light quantity losses. Alternatively, these reflecting surface may be constructed of free-form surfaces with powers imparted thereto.

According to the twenty-eighth aspect of the invention as explained above, it is possible to obtain a downsized yet high-performance real-image type finder.

According to the twenty-ninth aspect of the invention, the aforesaid object is achieved by the provision of a real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, characterized in that:

said objective optical subsystem comprises a prism comprising three reflecting surfaces, at least two reflecting surfaces of which is each defined by a rotationally asymmetric surface, and which are all defined by surfaces independent of a first transmitting surface and a second transmitting surface, and said ocular optical subsystem comprises a prism comprising two reflecting surfaces which are all defined by surfaces independent of a first transmitting surface and a second transmitting surface.

In what follows, why such an arrangement is used in the twenty-ninth aspect of the invention and how it acts will be explained.

As already explained with reference to the twenty-eighth aspect of the invention, the image-inversion means located in the ocular optical subsystem according to the twenty-ninth aspect of the invention should preferably be made up of two surfaces. When one surface is constructed of a total-reflection surface as in the twenty-eighth aspect of the invention, however, some constraints are imposed on the angle of reflection. When, in this case, it is intended to make the exit optical axis of the finder parallel with the entrance optical axis thereof, it is often impossible to achieve sufficient finder size reductions in view of a given camera layout, because there is no degree of freedom in locating reflecting surfaces inclusive of the objective optical subsystem.

In the ocular optical subsystem according to this aspect of the invention, therefore, a light ray refracted through the first transmitting surface is reflected at the first reflecting and then at the second reflecting surface. The reflected light is then refracted through the second transmitting surface. Herein the first and second reflecting surfaces are defined by independent surfaces. In other words, the two reflecting surfaces are defined by surfaces independent of the transmitting surfaces, so that the exit optical axis of the finder can easily be made parallel with the entrance optical axis thereof because of little constraints on the angle of reflection. It is also possible to reduce the size of the finder optical system because of an increased degree of freedom in the reflecting surfaces forming the image-inversion means in the objective optical subsystem. Alternatively, these reflecting surfaces may be constructed of free-form surfaces with powers imparted thereto.

According to the twenty-ninth aspect of the invention as explained above, it is possible to obtain a downsized yet high-performance real-image type finder.

In the first to twenty-ninth aspects of the invention, the objective optical subsystem may be made up of one prism that includes an image-inversion means and has a positive power. By doing so, it is possible to eliminate the refracting lens required for the objective optical subsystem as explained in the "prior art" and, hence, to achieve a slimmed-down finder optical system best suited for a single-focus camera, etc.

In the first to twenty-ninth aspects of the invention, it is acceptable to locate at least one refracting lens having no reflecting surface in the ocular optical subsystem. By doing so, diopter movement can be effected through a mechanism that is simpler than that needed to move a relatively large member such as a prism.

In the first to twenty-ninth aspects of the invention, the roof surface should preferably be located at the position of a reflecting surface included in the image-inversion means disposed from the intermediate image-formation plane to the pupil side. The performance of a roof surface is affected by fabrication precision imposed on the roof angle, as known in the art; that is, the roof surface is very difficult to fabricate if power is imparted thereto or it is constructed of a free-form surface. It is thus preferable that the roof surface has no power or takes no part in aberration correction. For the objective optical subsystem, on the other hand, it is difficult to use a sufficient number of reflecting surfaces because its focal length is shorter than that of the ocular optical subsystem, as already mentioned. When the roof surface is used in the objective optical subsystem, therefore, decentration aberration cannot often be corrected even when other surfaces are constructed of free-form surfaces. In consideration of performance, it is thus preferable that the roof surface is located on the ocular optical subsystem side which is positioned from the intermediate image-formation plane to the pupil side and where the number of reflections is easily acquired.

In the fourth and tenth to nineteenth aspects of the invention, too, the following condition (15) should preferably be satisfied as explained with reference to the first aspect of the invention:

$$5°<|\theta|<25° \quad (15)$$

where θ is the angle of the axial chief ray with respect to the normal to a reflecting surface that is not the same surface as the transmitting surface.

When the lower limit of 5° in this condition is not reached, the optical path cannot effectively be turned back, resulting in a failure in reducing the size of the finder. When the upper limit of 25° is exceeded, deterioration due to errors becomes noticeable due to too large an amount of decentration aberration produced at the independent reflecting surface.

In the third to fourth apsects and the nineth to nineteenth aspects of the invention, the following condition (16) should more preferably be satisfied:

$$5°<|\theta|<21.5° \quad (16)$$

where θ is the angle of the axial chief ray with respect to the normal to a reflecting surface that is not the same surface as the transmitting surface.

In the fifth to eighth, twentieth to twenty-third and twenty-fifth to twenty-ninth aspects of the invention, too, the following condition (17) should preferably be satisfied as explained with reference to the second aspect of the invention:

$$5°<|\theta|<45° \quad (17)$$

where θ is the angle of the axial chief ray with respect to the normal to a reflecting surface that is not the same surface as the transmitting surface.

When the lower limit of 5° in this condition is not reached, the optical path cannot effectively be turned back, resulting in a failure in reducing the size of the finder. When the upper limit of 45° is exceeded, deterioration due to errors becomes noticeable due to too large an amount of decentration aberration produced at the independent reflecting surface.

More preferably in the fifth to eighth and twentieth to twenty-ninth aspect of the invention, the following condition (18) should be satisfied:

$$5°<|\theta|<37° \quad (18)$$

where θ is the angle of the axial chief ray with respect to the normal to a reflecting surface that is not the same surface as the transmitting surface.

The size of a prism depends on the size of an axial marginal light ray, and the size of a rim ray incident on a surface thereof. Especially because reflecting surfaces, because of being decentered, are often designed in such a manner that light rays are obliquely incident thereon, it is required to increase the areas of the reflecting surfaces with increasing ray heights. As the areas of the reflecting surfaces increase, it is required to increase the angle of reflection at one surface so that a light beam reflected at that surface can be separated from another surface or widen the space between adjacent reflecting surfaces. This has influences on not only the size of the prism but also the performance of the prism. It is thus required that the position of the entrance pupil of the objective optical subsystem be properly determined to lower the heights of rim rays.

Preferably in the first to ninth, eleventh to twenty-fourth and twenty-sixth to twenty-ninth aspects of the invention, the position of the entrance pupil of the objective optical subsystem should satisfy the following condition (19):

$$0.1<d/Ih<2.5 \quad (19)$$

where d is the distance along the axial chief ray from the first transmitting surface to the entrance pupil of the prism located in the objective optical subsystem, and Ih is the maximum intermediate image-formation height.

When the lower limit of 0.1 in this condition is not reached, the height of a rim ray incident on the first transmitting surface becomes too small to make correction for aberrations at the periphery of the viewing screen, and when the upper limit of 2.5 is exceeded, the height of the rim ray incident on the first transmitting surface become s too large, resulting in an increase in the size of the prism.

More preferably in first to ninth, eleventh to twenty-fourth and twenty-sixth to twenty-ninth aspects of the invention, the following condition (20) should be satisfied:

$$0.2<d/Ih<1.2 \quad (20)$$

where d is the distance along the axial chief ray from the first transmitting surface to the entrance pupil of the prism located in the objective optical subsystem, and Ih is the maximum intermediate image-formation height.

For the same reasons, it is required to properly determinethe position of the exit pupil of the objective optical subsystem. In the first to twenty-ninth aspects of the invention, it is preferable to satisfy the following condition (21):

$$-5°<\alpha<15° \quad (21)$$

where α is a maximum exit angle of the objective optical subsystem on the basis of an axial chief ray. Herein the same direction as the angle of an incident ray on the objective optical subsystem on the basis of the axial chief ray is defined as a positive direction. For an exit plane, an axial chief ray at the exit plane is used as a reference. In other words, the + sign indicates that the position of the exit pupil is located on the object side with respect to the intermediate image-formation plane; the − sign indicates that the position of the exit pupil is located on the pupil (eye point) side with respect to the intermediate image-formation plane; and 0 indicates that the exit pupil is at a telecentric position.

When the lower limit of −5° is not reached, the size of the prims becomes large, and when the upper limit of 15° is exceeded, the hight of a rim ray becomes too small to make correction for aberrations at the periphery of the viewing screen.

More preferably in the first to twenty-ninth aspects of the invention, the following condition (22) should be satisfied:

$$-1°<\alpha<7° \quad (22)$$

where α is the maximum exit angle of the objective optical subsystem on the basis of the axial chief ray.

By use of the reflecting surfaces, the exit optical axis can easily be bent with respect to the entrance optical axis. In consideration of performance, however, it is not preferable to impart powers to the reflecting surfaces, because too large a bending of the exit optical axis makes it impossible to make satisfactory correction for decentration aberration for the reason that the amount of decentration aberration produced depends on the angle of reflection.

In the fifth, sixth, and twentieth to twenty-second aspects of the invention, it is thus preferable to satisfy the following condition (23):

$$0° \leq |\phi| < 30° \tag{23}$$

where $\phi$ is the angle between a center chief ray incident on the objective optical subsystem and a center chief ray incident on the intermediate image-formation plane. Herein $|\phi|$ is understood to refer to positive 0° to positive 90° inclusive of angles made by the chief rays.

In the fifth, sixth, and twentieth to twenty-second aspects of the invention, it is more preferable to satisfy the following condition (24):

$$0° \leq |\phi| < 20° \tag{24}$$

where $\phi$ is the angle between a center chief ray incident on the objective optical subsystem and a center chief ray incident on the intermediate image-formation plane.

In the third, fourth, and ninth to nineteenth aspects of the invention, it is also preferable to satisfy the following condition (26):

$$30° < |\phi| < 80° \tag{25}$$

where $\phi$ is the angle between the center chief ray incident on the objective optical subsystem and the center chief ray incident on the intermediate image-formation plane. Herein $|\phi|$ is understood to refer to positive 0° to positive 90° inclusive of angles made by the chief rays.

In the third, fourth, and ninth to nineteenth aspects of the invention, it is more preferable to satisfy the following condition (26):

$$40° < |\phi| < 70° \tag{26}$$

where $\phi$ is the angle between the center chief ray incident on the objective optical subsystem and the center chief ray incident on the intermediate image-formation plane.

In the seventh, eighth, and twenty-third to twenty-ninth aspects of the invention, it is preferable to satisfy the following condition (27):

$$60° < |\phi| \leq 90° \tag{27}$$

where $\phi$ is the angle between the center chief ray incident on the objective optical subsystem and the center chief ray incident on the intermediate image-formation plane. Herein $|\phi|$ is understood to refer to positive 0° to positive 90° inclusive of angles made by the chief rays.

In the seventh, eighth, and twenty-third to twenty-ninth aspects of the invention, it is more preferable to satisfy the following condition (28):

$$70° < |\phi| \leq 90° \tag{28}$$

where $\phi$ is the angle between the center chief ray incident on the objective optical subsystem and the center chief ray incident on the intermediate image-formation plane.

In the first to twenty-ninth aspects of the invention, it is also preferable to satisfy the following condition (29):

$$0.05 < m < 10 \tag{29}$$

where m is a magnification of the finder defined by a focal length of the objective optical subsystem divided by a focal length of the ocular optical subsystem.

When the lower limit of 0.05 in this condition is not reached, the focal length of the objective optical subsystem becomes too short to set out reflecting surfaces, and when the upper limit of 10 is exceeded, the optical system becomes too large, resulting in a failure in achieving compactness. For a zoom optical system, one state in the zooming area thereof should preferably satisfy this condition.

In the first to twenty-ninth aspects of the invention, it is more preferable to satisfy the following condition (30):

$$0.1 < m < 2 \tag{30}$$

where m is a magnification of the finder defined by the focal length of the objective optical subsystem divided by the focal length of the ocular optical subsystem.

Further in the first to twenty-ninth aspects of the invention, it is preferable to satisfy the following condition (31):

$$1° < \alpha_{ob} < 60° \tag{31}$$

where $\alpha_{ob}$ is a maximum half angle of view of the objective optical subsystem.

When the lower limit of 1° in this condition is not reached, the angle of view becomes too narrow for use as a camera finder, and when the upper limit of 60° is exceeded, the angle of incidence on the optical system becomes too large to achieve high performance and compactness at the same time. For a zoom optical system, one state in the zooming area thereof should satisfy this condition.

In the first to twenty-ninth aspects of the invention, it is more preferable to satisfy the following condition (32):

$$5° < \alpha_{ob} < 45° \tag{32}$$

where $\alpha_{ob}$ is the maximum half angle of view of the objective optical subsystem.

Furthermore in the first to twenty-ninth aspects of the invention, it is preferable to satisfy the following condition (33):

$$1° < \alpha_{oc} < 30° \tag{33}$$

where $\alpha_{oc}$ is a maximum exit angle of the ocular optical subsystem.

When the lower limit of 1° in this condition is not reached, the angle of view becomes too narrow to peer through the finder, and when the upper limit of 30° is exceeded, the optical system becomes too large, resulting a failure in achieving compactness.

In the first to twenty-ninth aspects of the invention, it is more preferable to satisfy the following condition (34):

$$3° < \alpha_{oc} < 20° \tag{34}$$

where $\alpha_{oc}$ is the maximum exit angle of the ocular optical subsystem.

In the first to twenty-ninth aspects of the invention, it is preferable that the rotationally asymmetric surface is defined by a free-form surface having one plane of symmetry.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
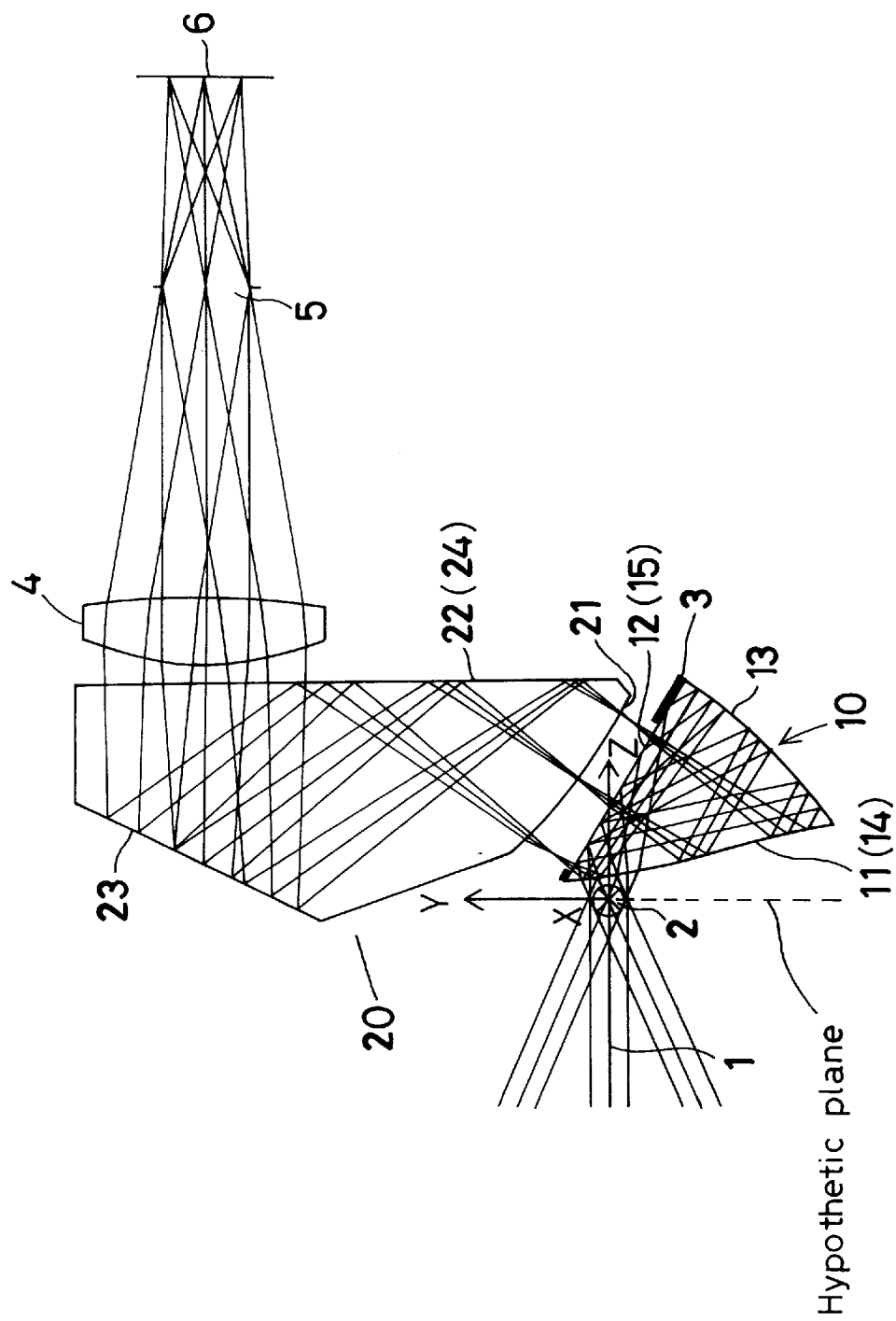
FIG. 1 is a sectional view of Example 1 of the finder optical system according to the invention.

In what follows, the present invention is first explained with reference to Numerical Examples 1 to 5. It is here noted that constructive parameters in each example will be given later.

In each example, the center of a virtual surface (surface No. 1: entrance pupil 2) is defined as the origin of a decentered optical system by an axis chief ray 1 leaving the center of an object (not shown) and passing through the center of a stop (exit pupil 5). By definition, the direction along an axial chief ray 1 from the center of the object to the first surface of an optical system is a Z-axis direction, the plane including the Z-axis and the center of an image plane 6 is a Y-Z plane, the direction within a surface in the optical system where a ray is bent and perpendicular with respect to the Z-axis in the Y-Z plane is a Y-axis, and the direction perpendicular with respect to both Y-axis and Z-axis is an X-axis. By definition, again, the direction from an object point to the first surface in the optical system is a positive Z-direction, the direction from the surface to the back of the paper is a positive X-direction, and the axis forming a right-hand coordinate system with the X- and Y-axes is a Y-axis.

Throughout Examples 1 to 5, each surface is decentered in the Y-Z plane, and the only one symmetric plane of each rotationally asymmetric free-form surface is defined by the X-Z plane.

Given to each decentered surface are the amount of displacement of the vertex position of the surface from the origin (surface No. 1: entrance pupil 2) of the coordinate system (x, y, and z in the X-, Y-, and Z-axis directions) and the tilt angle ($\alpha°$, $\beta°$, and $\gamma°$) of the center axis (the Z-axis in equation (a) for the free-form surface and the Z-axis in equation (b) given later for the aspheric surface) with respect to the X-, Y-, and Z-axes. It should be here noted that the positive $\alpha$ and $\beta$ mean counterclockwise rotation with respect to their positive axis directions, and the positive $\gamma$ means clockwise rotation with respect to the positive Z-axis direction.

It should be noted that when, of the optical action surfaces forming the optical system in each example, a certain specific surface and the subsequent surface form a co-axial optical system, the surface separation therebetween as well as the index of refraction and Abbe constant of the medium are given thereto according to conventional methods.

The shape of the free-form surface used herein is defined by the aforesaid equation (a), and the Z-axis therein provides the axis of the free-form surface.

The aspheric surface used herein is a rotationally symmetric aspheric surface given by the following defining equation (b):

$$Z=(y^2/R)/[1+\{1-(1+K)y^2/R^2\}^{1/2}]+Ay^4+By^6+Cy^8+Dy^{10}+ \quad (b)$$

It should be noted that when the direction of propagation of light is positive, Z represents an optical axis (axial chief ray), and y represents a direction vertical with respect to the optical axis. In equation (b) above, R is the paraxial radius of curvature, K is the conical constant, and A, B, C, D, . . . are the fourth, sixth, eighth, tenth, . . . aspherical coefficients, respectively. The Z-axis in this defining equation represents the axis of the rotationally symmetric aspheric surface.

It should be noted that the terms with respect to free-form, and aspheric surfaces without data are zero. The indices of refraction given are on a d-line (587.56 nm wavelength) basis, and the lengths are given in mm.

The free-form surface may also be defined by other defining equations, for instance, Zernike polynominal (c). For example, the shape of the free-form surface may be defined by the following equation. The axis in Zernike polynomial is given by the Z-axis in this defining equation. The rotationally asymmetric surface is defined by the polar coordinates for the Z-axis height with respect to the X-Y plane. A is the distance from the Z-axis within the X-Y plane, and R is the azimuthal angle around the Z-axis, as represented by the angle of rotation as measured with respect to the Z-axis.

$$x=R\times Cos(A) \quad y=R\times sin(A) \quad Z=D_2+D_3R\cos(A)+D_4R\sin(A)$$

$$+D_5R^2\cos(2A)+D_6(R^2-1)+D_7R^2\sin(2A)+D_8R^3\cos(3A)+D_9(3R^3-2R)\cos(A)$$

$$+D_{10}(3R^3-2R)\sin(A)+D_{11}R^3\sin(3A)+D_{12}R^4\cos(4A)+D_{13}(4R^4-3R^2)\cos(2A)$$

$$+D_{14}(6R^4-6R^2+1)+D_{15}(4R^4-3R^2)\sin(2A)+D_{16}R^4\sin(4A)+D_{17}R^5\cos(5A)+D_{18}(5R^5-4R^3)\cos(3A)$$

$$+D_{19}(10R^5-12R^3+3R)\cos(A)+D_{20}(10R^5-12R^3+3R)\sin(A)$$

$$+D21(5R^5-4R^3)\sin(3A)+D_{22}R^5\sin(5A)+D_{23}R^6\cos(6A)+D_{24}(6R^6-5R^4)\cos(4A)$$

$$+D_{25}(15R^6-20R^4+6R^2)\cos(2A)+D_{26}(20R^6-30R^4+12R^2-1)$$

$$+D_{27}(15R^6-20R^4+6R^2)\sin(2A)+D_{28}(6R^6-5R^4)\sin(4A)+D_{29}R^5\sin(6A) \quad (C)$$

To design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$, ... should be used.

Further, the free-form surface may be defined by the following defining equation (d):

$$Z=\Sigma\Sigma CnmXY$$

For instance, this equation may be expanded with respect to k=7 (seventh term) to obtain:

$$Z=C_2+C_3y+C_4|x|+C_5y^2+C_6y|x|+C_7x^2$$

$$+C_8y^3+C_9y^2|x|+C_{10}yx^2+C_{11}|x^3|+C_{12}y^4+C_{13}y^3|x|+C_{14}y^2x^2+C_{15}y|x^3|+C_{16}x^4$$

$$+C_{17}y^5+C_{18}y^4|x|+C_{19}y^3x^2+C_{20}y^2|x^3|+C_{21}yx^4+C_{22}|x^5|+C_{23}y^6+C_{24}y5|x|+C_{25}y^4x^2+C_{26}y^3|x^3|$$

$$+C_{27}y^2x^4+C_{28}y|x^5|+C_{29}x^6+C_{30}y^7+C_{31}y^6|x|+C_{32}y^5x^2+C_{33}y^4|x^3|$$

$$+C_{34}y^3x^4+C_{35}y^2|x^5|+C_{36}yx^6+C_{37}|x^7| \quad (d)$$

While, in the examples to be described later, the surface shape is expressed in terms of the free-form surface defined by equation (a), it should be understood that the same advantages are achievable even with equations (c) and (d).

In Numerical Examples 1 to 5, a virtual image was formed at −0.5 m$^{-1}$ from the pupil plane (2,000 mm on the object side). From the lens data, however, it should be understood that an image-formation system is provided, wherein an ideal lens having a focal length of 10 mm is located at a pupil plane 5 to form an image on an image plane 6.

While the prisms and refracting lenses were made up of plastics throughout Numerical Examples 1 to 5, it should be understood that they may be made up of glasses. The use of a plastic material of low hygroscopicity is preferable because deterioration due to environmental changes can be reduced.

In the examples given later, it is not always necessary to make the image plane perfectly parallel with the Z-axis; it is acceptable to tilt the image plane slightly for the purpose of parallax correction.

EXAMPLE 1

FIG. 1 is a Y-Z sectional view for Example 1 including an axial chief ray. Example 1 is directed to a finder optical system having a horizontal half angle of view of 16.05°, a vertical half angle of view of 22.59°, a pupil diameter of φ 4 mm, an intermediate image-formation size of 2.53×3.66 mm (with a diagonal image height of 4.45 mm) and a finder magnification of 0.4. As calculated as the focal length of a rotationally symmetric optical system, the objective optical subsystem has a focal lengthof 8.8 mm and the ocular optical subsystem has a focal length of 21.8 mm. Given later will be the constructive parameters for this example, wherein "HRP" represents a virtual surface, "FFS" a free-form surface, "ASS" a rotationally symmetric aspheric surface, and "IIP" an intermediate image-information plane. The same will apply hereinafter.

The finder optical system of Example 1 is built up of, in order of propagation of light from its object side, an objective optical subsystem made up of only one or a first prism 10 having a positive power and consisting of a first transmitting surface 11, a first reflecting surface 12, a second reflecting surface 13 of positive power, a third reflecting surface 14 and a second transmitting surface 15, a field mask 3 for defining a field range, and an ocular optical subsystem made up of a second prism 20 having a positive power and consisting of a first transmitting surface 21 of positive power, a first reflecting surface 22, a second reflecting surface 23 defined by a roof surface and a second transmitting surface 24 and a double-convex positive lens 4 having a rotationally symmetric aspheric surface on its object side. The first transmitting surface 11 and third transmitting surface 14, and the second transmitting surface 15 and first reflecting surface 12 of the first prism 10, and the second transmitting surface 24 and first reflecting surface 22 of the second prism 20 are defined by optical action surfaces, each having a combined transmitting and reflecting action.

Although, in this example, the first reflecting surface 22 of the second prism 20 is constructed of a plane surface, yet it may be constructed of a free-form surface.

Of the constructive parameters given later, the parameters from the second to twelfth surfaces represent the amount of decentration on the basis of the virtual surface (surface No. 1) that is a decentration reference surface. The image plane is substantially vertical with respect to the Z-axis.

EXAMPLE 2

Figure 2:
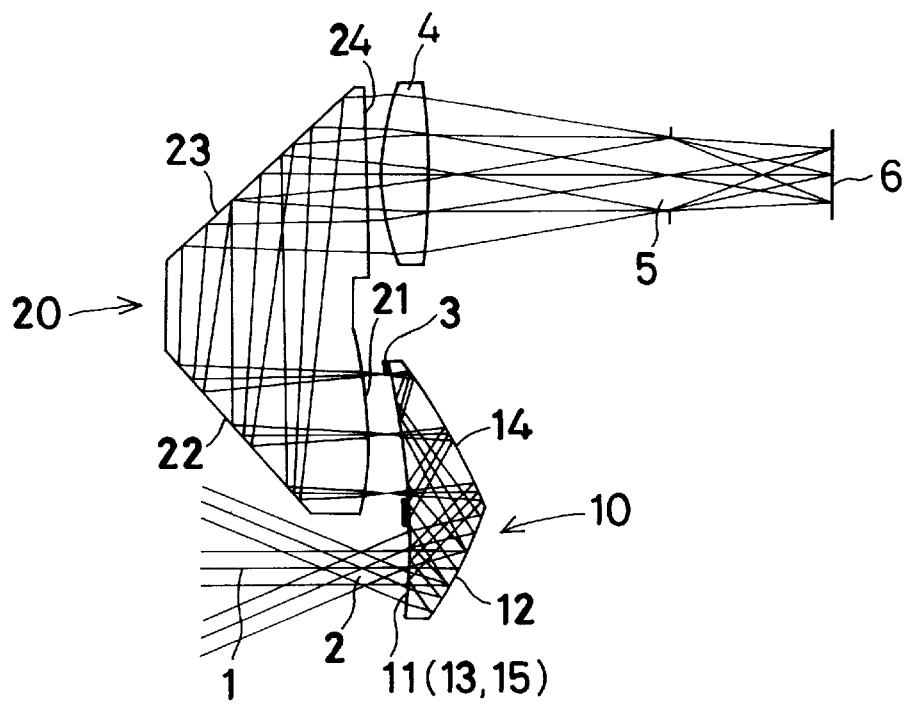
FIG. 2 is a sectional view of Example 2 of the finder optical system according to the invention.

FIG. 2 is a Y-Z sectional view for Example 2 including an axial chief ray. Example 2 is directed to a finder optical system having a horizontal half angle of view of 16.05°, a vertical half angle of view of 22.59°, a pupil diameter of φ 4 mm, an intermediate image-formation size of 2.53×3.66 mm (with a diagonal image height of 4.45 mm) and a finder magnification of 0.4. As calculated as the focal length of a rotationally symmetric optical system, the objective optical subsystem has a focal length of 8.8 mm and the ocular optical subsystem has a focal length of 21.8 mm.

The finder optical system of Example 2 is built up of, in order of propagation of light from its object side, an objective optical subsystem made up of only one or a first prism 10 having a positive power and consisting of a first transmitting surface 11 of negative power, a first reflecting surface 12 of positive power, a second reflecting surface 13, a third reflecting surface 14 of positive power and a second transmitting surface 15 of negative power, a field mask 3 for defining a field range, and an ocular optical subsystem made up of a second prism 20 having a positive power and consisting of a first transmitting surface 21 of positive power, a first reflecting surface 22 defined by a roof surface, a second reflecting surface 23 and a second transmitting surface 24 and a double-convex positive lens 4 having a rotationally symmetric aspheric surface on its object side. The first transmitting surface 11, second transmitting surface 15 and second reflecting surface 13 of the first prism 10 are defined by an optical action surface having a combined transmitting and reflecting action.

In this example, the first reflecting surface 22 of the second prism 20 is constructed of a plane surface. However, it is acceptable to construct this surface of a free-form surface. Herein the roof surface is applied to the first reflecting surface 22 of the second prism 20. However, it is acceptable to apply the roof surface to the second reflecting surface 23 of the second prism 20.

Of the constructive parameters given later, the parameters from the second to twelfth surfaces represent the amount of decentration on the basis of the virtual surface (surface No. 1) that is a decentration reference surface. The image plane is substantially vertical with respect to the Z-axis.

EXAMPLE 3

Figure 3:
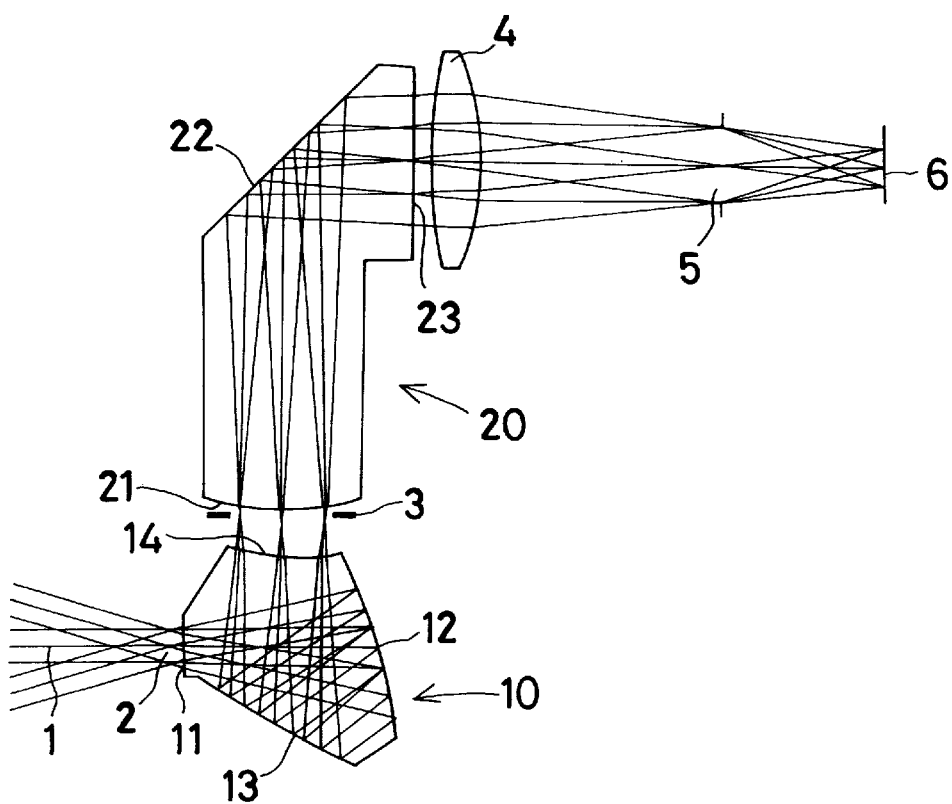
FIG. 3 is a sectional view of Example 3 of the finder optical system according to the invention.

FIG. 3 is a Y-Z sectional view for Example 3 including an axial chief ray. Example 3 is directed to a finder optical system having a horizontal half angle of view of 16.05°, a vertical half angle of view of 22.59°, a pupil diameter of φ 4 mm, an intermediate image-formation size of 2.53×3.66 mm (with a diagonal image height of 4.45 mm) and a finder magnification of 0.4. As calculated as the focal length of a rotationally symmetric optical system, the objective optical subsystem has a focal length of 8.8 mm and the ocular optical subsystem has a focal length of 21.8 mm.

The finder optical system of example 3 is built up of, in order of propagation of light from its object side, an objective optical subsystem made up of only one or a first prism 10 having a positive power and consisting of a first transmitting surface 11 of negative power, a first reflecting surface 12 of positive power, a second reflecting surface 13 of positive power, and a second transmitting surface 14 of negative power, a field mask 3 for defining a field range, and an ocular optical subsystem made up of a second prism 20 having a positive power and consisting of a first transmitting surface 21 of positive power, a first reflecting surface 22 defined by a roof surface, and a second transmitting surface 23 and a double-convex positive lens 4 having a rotationally symmetric aspheric surface on its object side.

Although, in this example, the first reflecting surface 22 of the second prism 20 is constructed of a plane surface, yet it may be constructed of a free-form surface.

Of the constructive parameters given later, the parameters from the second to tenth surfaces represent the amount of decentration on the basis of the virtual surface (surface No. 1) that is a decentration reference surface. The image plane is substantially vertical with respect to the Z-axis.

EXAMPLE 4

Figure 4:
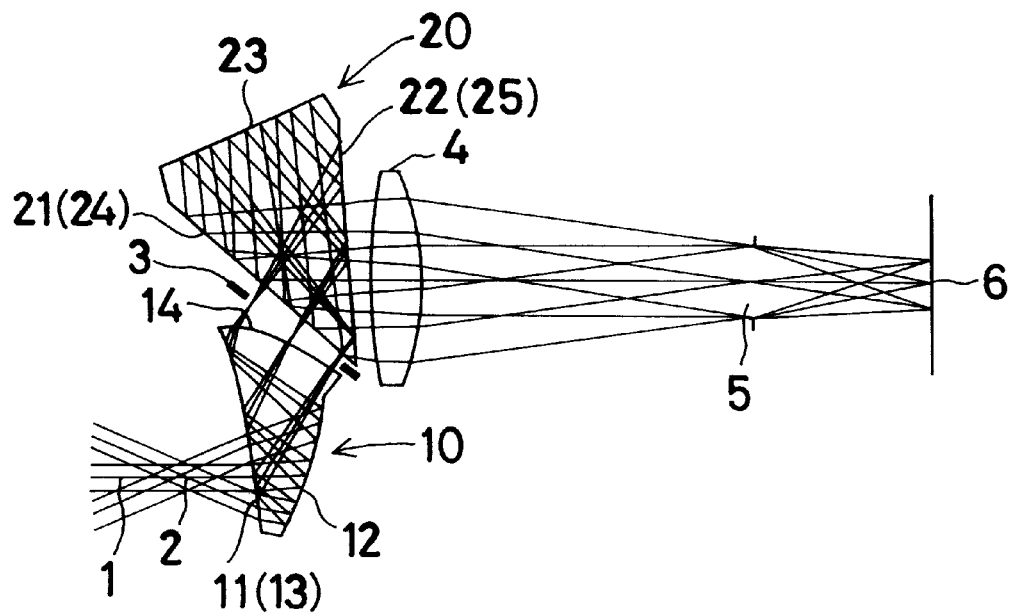
FIG. 4 is a sectional view of Example 4 of the finder optical system according to the invention.

FIG. 4 is a Y-Z sectional view for Example 4 including an axial chief ray. Example 4 is directed to a finder optical system having a horizontal half angle of view of 16.05°, a vertical half angle of view of 22.59°, a pupil diameter of φ 4 mm, an intermediate image-formation size of 2.00×2.90 mm (with a diagonal image height of 3.52 mm) and a finder magnification of 0.32. As calculated as the focal length of a rotationally symmetric optical system, the objective optical subsystem has a focal length of 7.0 mm and the ocular optical subsystem has a focal length of 21.8 mm.

The finder optical system of Example 4 is built up of, in order of propagation of light from its object side, an objective optical subsystem made up of only one or a first prism 10 having a positive power and consisting of a first transmitting surface 11 of negative power, a first reflecting surface 12 of positive power, a second reflecting surface 13 of negative power, and a second transmitting surface 14 of negative power, a field mask 3 for defining a field range, and an ocular optical subsystem made up of a second prism 20 having a positive power and consisting of a first transmitting surface 21, a first reflecting surface 22, a second reflecting surface 23 defined by a roof surface, a third reflecting surface 24 and a second transmitting surface 25 and a double-convex positive lens 4 having a rotationally symmetric aspheric surface on its object side. The first transmitting surface 11 and second reflecting surface 13 of the first prism 10, and the first transmitting surface 21 and third reflecting surface 24, and the second transmitting surface 25 and first reflecting surface 22 of the second prism 20 are defined by optical action surfaces, each having a combined transmitting and reflecting action.

In this example, the first and third reflecting surfaces of the second prism 20 are each constructed of a plane surface. However, it is acceptable to construct these surfaces of free-form surfaces.

Of the constructive parameters given later, the parameters from the second to twelfth surfaces represent the amount of decentration on the basis of the virtual surface (surface No. 1) that is a decentration reference surface. The image plane is substantially vertical with respect to the Z-axis.

EXAMPLE 5

Figure 5:
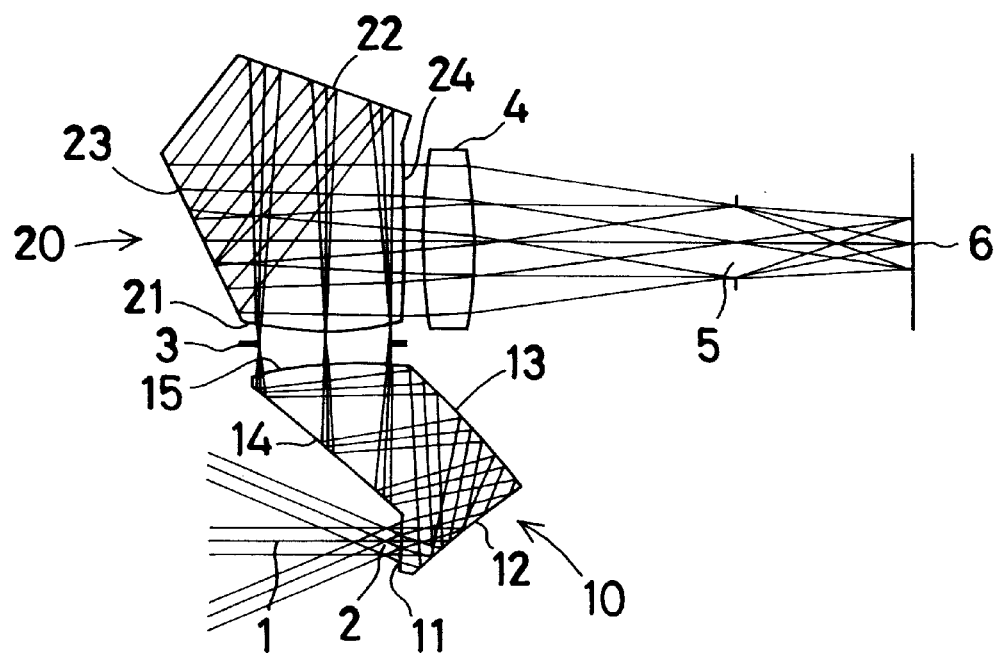
FIG. 5 is a sectional view of Example 5 of the finder optical system according to the invention.
Figure 6:
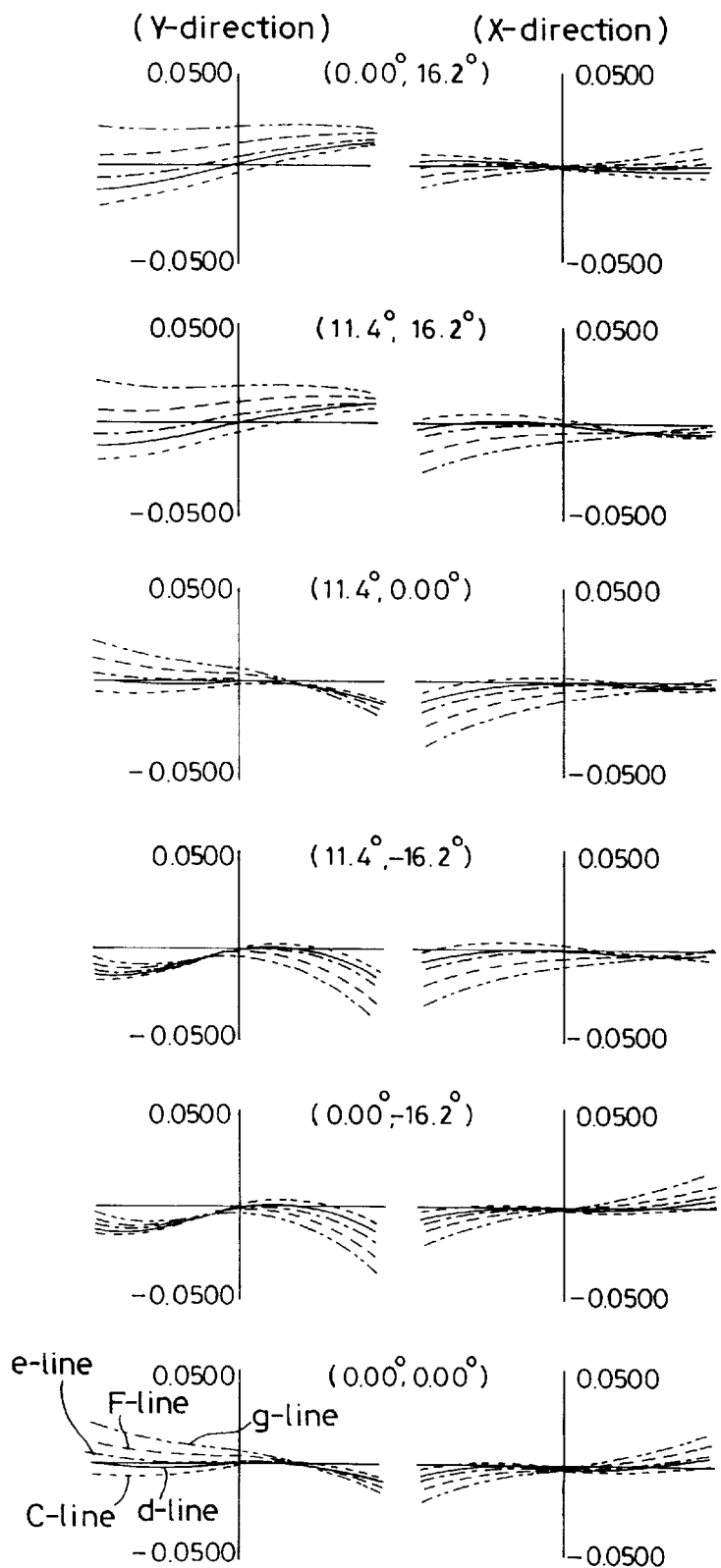
FIG. 6 is a transverse aberration diagram for Example 1 of the finder optical system according to the invention.
Figure 7:
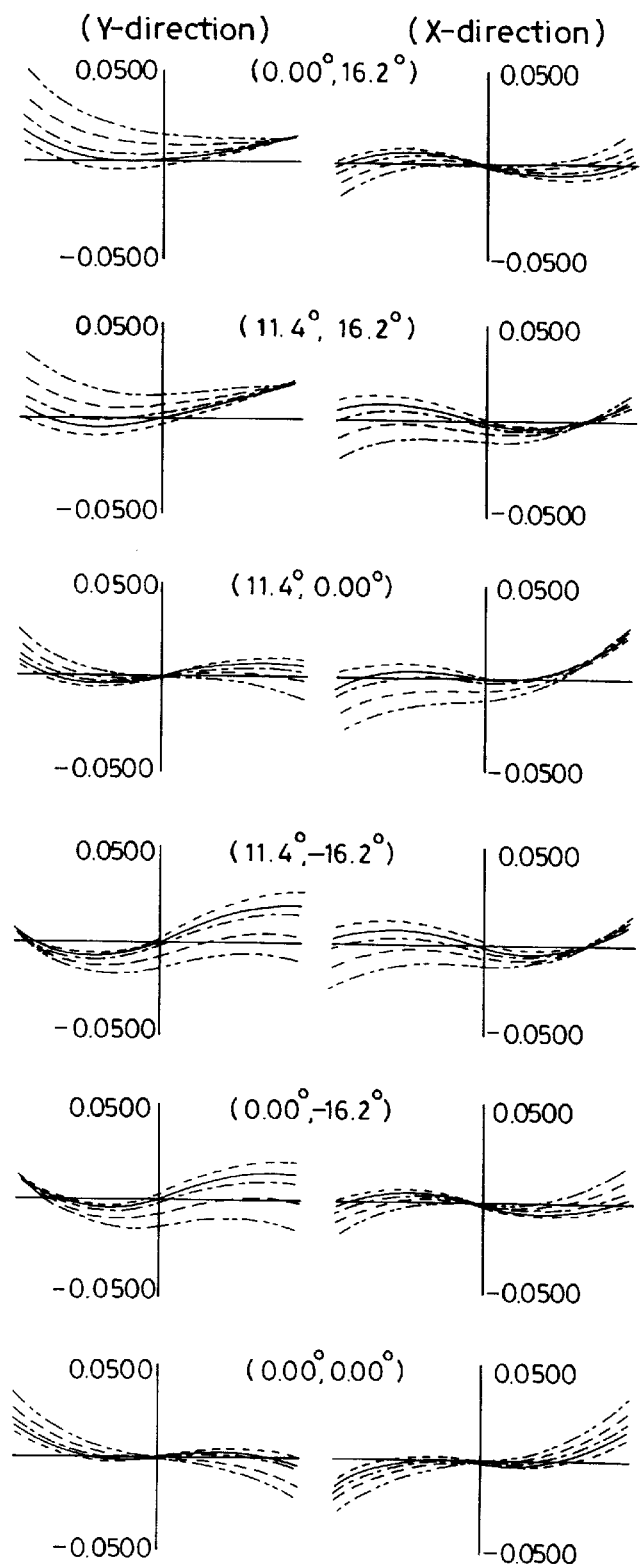
FIG. 7 is a transverse aberration diagram for Example 2 of the finder optical system according to the invention.
Figure 8:
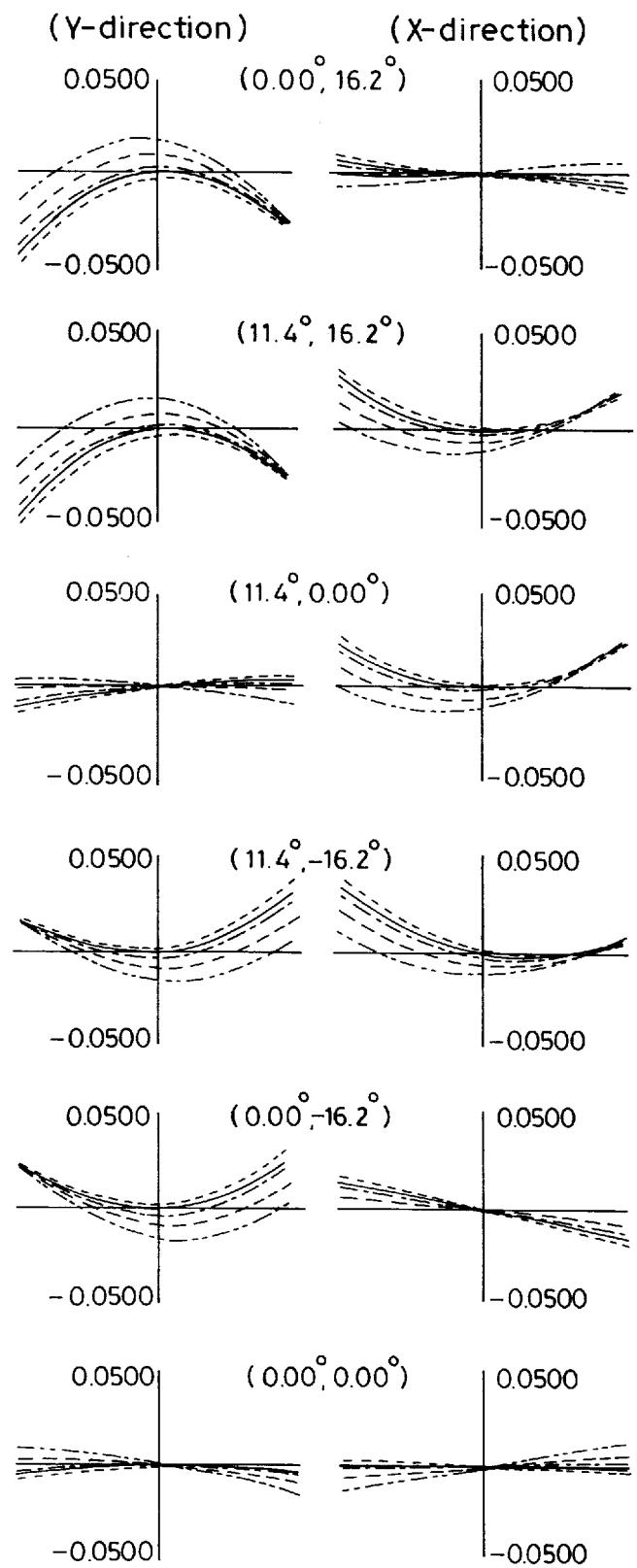
FIG. 8 is a transverse aberration diagram for Example 3 of the finder optical system according to the invention.
Figure 9:
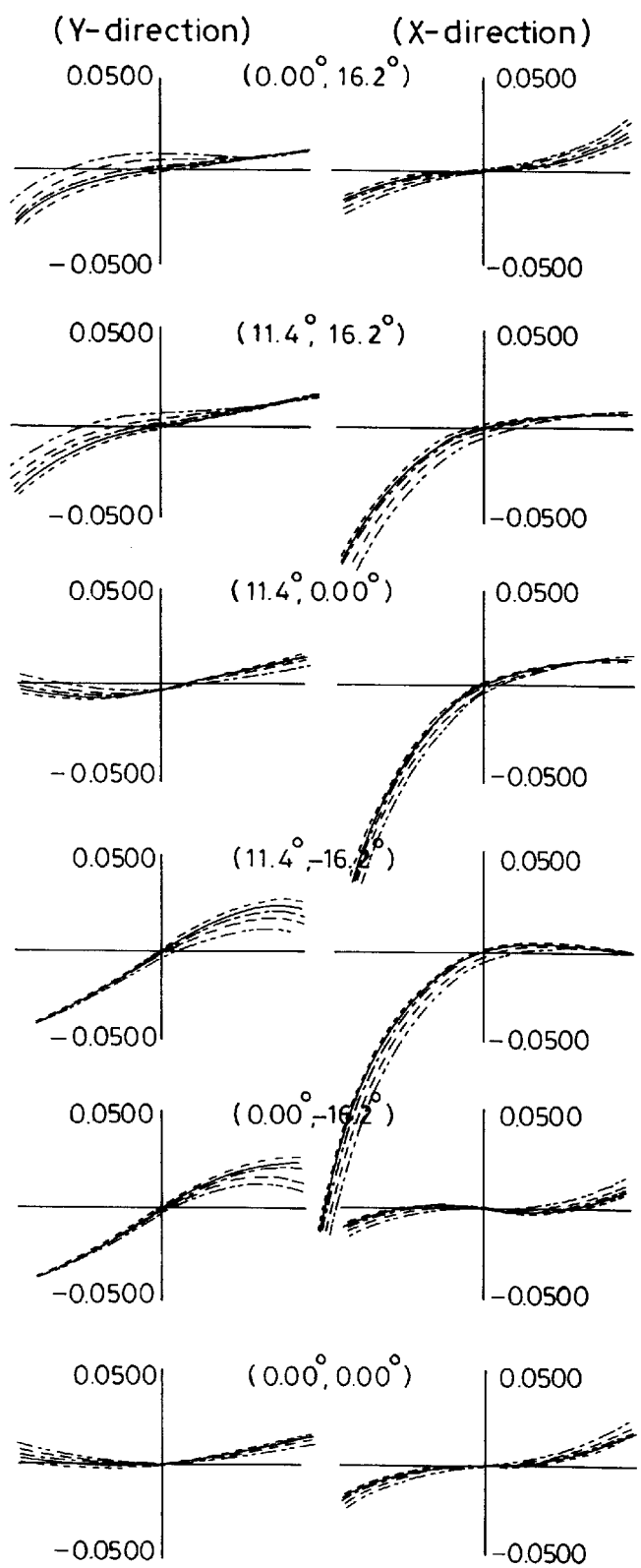
FIG. 9 is a transverse aberration diagram for Example 4 of the finder optical system according to the invention.
Figure 10:
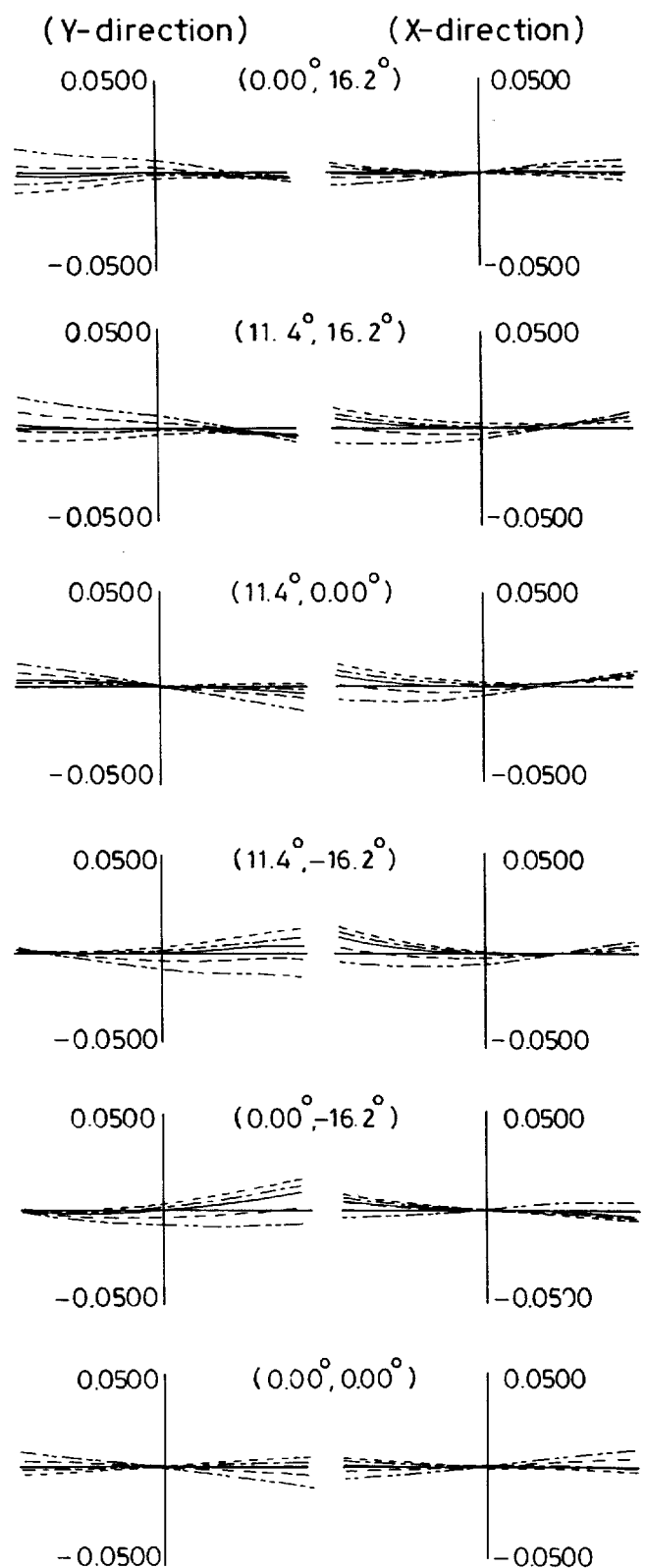
FIG. 10 is a transverse aberration diagram for Example 5 of the finder optical system according to the invention.

FIG. 5 is a Y-Z sectional view for Example 5 including an axial chief ray. Example 5 is directed to a finder optical system having a horizontal half angle of view of 16.05°, a vertical half angle of view of 22.59°, a pupil diameter of φ 4 mm, an intermediate image-formation size of 2.53×3.66 mm (with a diagonal image height of 4.45 mm) and a finder magnification of 0.34. As calculated as the focal length of a rotationally symmetric optical system, the objective optical subsystem has a focal length of 8.8 mm and the ocular optical subsystem has a focal length of 25.6 mm.

The finder optical system of Example 5 is built up of, in order of propagation of light from its object side, an objective optical subsystem made up of only one or a first prism 10 having a positive power and consisting of a first transmitting surface 11 of negative power, a first reflecting surface 12 of positive power, a second reflecting surface 13 of positive power, a third reflecting surface 14 of negative power and a second transmitting surface 15 of positve power, a field mask 3 for defining a field range, and an ocular optical subsystem made up of a second prism 20 consisting of a first transmitting surface 21 of positive power, a first reflecting surface 22 defined by a roof surface, a second reflecting surface 23 and a second transmitting surface 24 of positive power and a double-convex positive lens 4 having a rotationally symmetric aspheric surface on its object side.

Although, in this example, the first reflecting surface 23 of the second prism 20 is constructed of a plane surface, yet it may be constructed of a free-form surface.

Of the constructive parameters given later, the parameters from the second to tenth surfaces represent the amount of decentration on the basis of the virtual surface (surface No. 1) that is a decentration reference surface. The image plane is substantially vertical with respect to the Z-axis.

Enumerated below the constructive parameters in examples 1 to 5, wherein "HRP" represents a virtual surface, "FFS" a free-form surface, "ASS" a rotationally symmetric aspheric surface, and "IIP" an intermediate image-information plane.

EXAMPLE 1

| Surface No. | Radius of curvature | Surface separation | Displacement and tilt | Refractive index | Abbe's No. |
|---|---|---|---|---|---|
| Object plane | ∞ | 3000.00 | | | |
| 1 | ∞ (HRP) | | | | |
| 2 | FFS①  | | (1) | 1.5254 | 56.2 |
| 3 | FFS②  | | (2) | 1.5254 | 56.2 |
| 4 | FFS③  | | (3) | 1.5254 | 56.2 |
| 5 | FFS①  | | (1) | 1.5254 | 56.2 |
| 6 | FFS②  | | (2) | | |
| 7 | ∞ (IIP) | | (4) | | |
| 8 | 21.82 | | (5) | 1.5254 | 56.2 |
| 9 | ∞ | | (6) | 1.5254 | 56.2 |
| 10 | ∞ | | (7) | 1.5254 | 56.2 |
| 11 | ∞ | | (6) | | |
| 12 | ASS① | 3.00 | (8) | 1.4924 | 57.6 |
| 13 | −52.69 | 15.00 | | | |
| 14 | ∞ (Stop) | 10.05 | | | |
| Image plane | ∞ | | | | |

ASS①

R  13.59
K  0.0000
A  −5.1934 × 10$^{-5}$
B  −2.1012 × 10$^{-6}$
C  4.3116 × 10$^{-8}$

FFS①

| $C_4$ | 1.1739 × 10$^{-3}$ | $C_6$ | 3.0375 × 10$^{-3}$ | $C_8$ | 2.3557 × 10$^{-4}$ |
| $C_{10}$ | 3.8251 × 10$^{-5}$ | $C_{11}$ | 3.0390 × 10$^{-5}$ | $C_{13}$ | −6.5708 × 10$^{-5}$ |
| $C_{15}$ | −3.2852 × 10$^{-5}$ | $C_{17}$ | 2.7127 × 10$^{-6}$ | $C_{19}$ | 2.0080 × 10$^{-6}$ |
| $C_{21}$ | 3.6084 × 10$^{-6}$ | | | | |

FFS②

| $C_4$ | −5.8050 × 10$^{-3}$ | $C_6$ | −2.5703 × 10$^{-3}$ | $C_8$ | −1.3454 × 10$^{-4}$ |
| $C_{10}$ | −2.2372 × 10$^{-5}$ | $C_{11}$ | 2.7374 × 10$^{-4}$ | $C_{13}$ | 8.5300 × 10$^{-6}$ |
| $C_{15}$ | 1.8911 × 10$^{-5}$ | $C_{17}$ | −7.5236 × 10$^{-6}$ | $C_{19}$ | −3.2329 × 10$^{-6}$ |
| $C_{21}$ | 3.7840 × 10$^{-6}$ | | | | |

FFS③

| $C_4$ | −1.6220 × 10$^{-2}$ | $C_6$ | −1.1670 × 10$^{-2}$ | $C_8$ | 3.2949 × 10$^{-4}$ |
| $C_{10}$ | 1.6608 × 10$^{-4}$ | $C_{11}$ | −4.0397 × 10$^{-5}$ | $C_{13}$ | −7.3149 × 10$^{-5}$ |
| $C_{15}$ | −3.0505 × 10$^{-5}$ | $C_{17}$ | −1.1524 × 10$^{-6}$ | $C_{19}$ | −8.5812 × 10$^{-7}$ |
| $C_{21}$ | 1.1888 × 10$^{-5}$ | | | | |

Displacement and tilt(1)

| X | 0.00 | Y | −3.79 | Z | 1.90 |
| α | 13.94 | β | 0.00 | γ | 0.00 |

Displacement and tilt(2)

| X | 0.00 | Y | 0.21 | Z | 3.74 |
| α | 61.15 | β | 0.00 | γ | 0.00 |

Displacement and tilt(3)

| X | 0.00 | Y | −6.74 | Z | 7.42 |
| α | −45.14 | β | 0.00 | γ | 0.00 |

Displacement and tilt(4)

| X | 0.00 | Y | 1.02 | Z | 5.22 |
| α | 53.48 | β | 0.00 | γ | 0.00 |

Displacement and tilt(5)

| X | 0.00 | Y | 1.43 | Z | 5.52 |
| α | 53.54 | β | 0.00 | γ | 0.00 |

Displacement and tilt(6)

| X | 0.00 | Y | 7.58 | Z | 10.07 |
| α | 0.72 | β | 0.00 | γ | 0.00 |

Displacement and tilt(7)

| X | 0.00 | Y | 18.79 | Z | 1.33 |
| α | −25.92 | β | 0.00 | γ | 0.00 |

Displacement and tilt(8)

| X | 0.00 | Y | 18.83 | Z | 10.93 |
| α | −0.02 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | 3000.00 | | | |
| 1 | ∞ (HRP) | | | | |
| 2 | FFS①  | | (1) | 1.5254 | 56.2 |
| 3 | FFS②  | | (2) | 1.5254 | 56.2 |
| 4 | FFS①  | | (1) | 1.5254 | 56.2 |
| 5 | FFS③  | | (3) | 1.5254 | 56.2 |
| 6 | FFS①  | | (1) | | |
| 7 | ∞ (IIP) | | (4) | | |
| 8 | −23.20 | | (5) | 1.5254 | 56.2 |
| 9 | ∞ | | (6) | 1.5254 | 56.2 |
| 10 | ∞ | | (7) | 1.5254 | 56.2 |
| 11 | ∞ | | (8) | | |
| 12 | ASS① | 3.00 | (9) | 1.4924 | 57.6 |
| 13 | −52.38 | 15.00 | | | |
| 14 | ∞ (Stop) | 10.05 | | | |
| Image plane | ∞ | | | | |

ASS①

R  13.51
K  0.0000
A  −9.1962 × 10$^{-5}$
B  3.3888 × 10$^{-7}$
C  −4.8963 × 10$^{-9}$

FFS①

| $C_4$ | −3.1022 × 10$^{-2}$ | $C_5$ | −7.8783 × 10$^{-3}$ | $C_8$ | −2.3226 × 10$^{-3}$ |
| $C_{10}$ | 3.2237 × 10$^{-4}$ | $C_{11}$ | −3.3849 × 10$^{-4}$ | $C_{13}$ | 2.5688 × 10$^{-4}$ |
| $C_{15}$ | −4.5045 × 10$^{-5}$ | $C_{17}$ | −1.1536 × 10$^{-5}$ | $C_{19}$ | −1.8320 × 10$^{-5}$ |
| $C_{21}$ | 7.8214 × 10$^{-7}$ | | | | |

FFS②

| $C_4$ | −2.7184 × 10$^{-2}$ | $C_6$ | −1.9035 × 10$^{-2}$ | $C_8$ | −9.8600 × 10$^{-4}$ |
| $C_{10}$ | 3.0471 × 10$^{-4}$ | $C_{11}$ | −1.7294 × 10$^{-4}$ | $C_{13}$ | 2.3804 × 10$^{-4}$ |
| $C_{15}$ | −1.0334 × 10$^{-4}$ | $C_{17}$ | 2.1893 × 10$^{-5}$ | $C_{19}$ | −2.3541 × 10$^{-5}$ |
| $C_{21}$ | 1.2933 × 10$^{-5}$ | | | | |

FFS③

| $C_4$ | −2.6416 × 10$^{-2}$ | $C_6$ | −1.3943 × 10$^{-2}$ | $C_8$ | −8.1128 × 10$^{-4}$ |
| $C_{10}$ | −2.4783 × 10$^{-4}$ | $C_{11}$ | −8.8003 × 10$^{-5}$ | $C_{13}$ | −5.3787 × 10$^{-5}$ |
| $C_{15}$ | −5.8138 × 10$^{-5}$ | $C_{17}$ | −6.8915 × 10$^{-6}$ | $C_{19}$ | −7.9375 × 10$^{-6}$ |
| $C_{21}$ | −3.7668 × 10$^{-6}$ | | | | |

Displacement and tilt(1)

| X | 0.00 | Y | 2.31 | Z | 2.89 |
| α | 1.09 | β | 0.00 | γ | 0.00 |

Displacement and tilt(2)

| X | 0.00 | Y | −0.28 | Z | 5.87 |
| α | −27.22 | β | 0.00 | γ | 0.00 |

Displacement and tilt(3)

| X | 0.00 | Y | 9.37 | Z | 4.85 |
| α | 31.93 | β | 0.00 | γ | 0.00 |

Displacement and tilt(4)

| X | 0.00 | Y | 8.23 | Z | 0.96 |
| α | 0.00 | β | 0.00 | γ | 0.00 |

Displacement and tilt(5)

| X | 0.00 | Y | 8.23 | Z | 0.46 |
| α | 0.04 | β | 0.00 | γ | 0.00 |

|   | -continued |   |   |   |   |   |
|---|---|---|---|---|---|---|
|   | Displacement and tilt(6) | | | | | |
| X | 0.00 | Y | 8.23 | Z | −7.40 |
| α | 42.67 | β | 0.00 | γ | 0.00 |
|   | Displacement and tilt(7) | | | | | |
| X | 0.00 | Y | 24.26 | Z | −6.09 |
| α | 47.30 | β | 0.00 | γ | 0.00 |
|   | Displacement and tilt(8) | | | | | |
| X | 0.00 | Y | 24.27 | Z | 0.38 |
| α | 0.21 | β | 0.00 | γ | 0.00 |
|   | Displacement and tilt(9) | | | | | |
| X | 0.00 | Y | 24.27 | Z | 1.38 |
| α | 0.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | 3000.00 | | | |
| 1 | ∞ (HRP) | | | | |
| 2 | −10.21 | | (1) | 1.5254 | 56.2 |
| 3 | FFS①  | | (2) | 1.5254 | 56.2 |
| 4 | FFS②  | | (3) | 1.5254 | 56.2 |
| 5 | FFS③  | | (4) | | |
| 6 | ∞ (IIP) | | (5) | | |
| 7 | 17.52 | | (6) | 1.5254 | 56.2 |
| 8 | ∞ | | (7) | 1.5254 | 56.2 |
| 9 | ∞ | | (8) | | |
| 10 | ASS①  | 3.00 | (9) | 1.4924 | 57.6 |
| 11 | −17.59 | 15.00 | | | |
| 12 | ∞ (Stop) | 10.05 | | | |
| Image plane | ∞ | | | | |

ASS①  
R  29.02  
K  0.0000  
A  −7.0132 × 10⁻⁵  
B  −5.7298 × 10⁻⁷  
C  2.0893 × 10⁻⁸

FFS①  
$C_4$ −1.4104 × 10⁻² $C_6$ −1.3604 × 10⁻² $C_8$ −5.4924 × 10⁻⁵  
$C_{10}$ −4.1580 × 10⁻⁵ $C_{11}$ −3.2084 × 10⁻⁵ $C_{13}$ −4.3059 × 10⁻⁵  
$C_{15}$ −3.2670 × 10⁻⁵ $C_{17}$ 2.3084 × 10⁻⁸ $C_{19}$ −5.0037 × 10⁻⁷  
$C_{21}$ 1.1176 × 10⁻⁸

FFS②  
$C_4$ 9.6620 × 10⁻³ $C_6$ 6.3102 × 10³ $C_8$ 1.2400 × 10⁻⁴  
$C_{10}$ 1.0270 × 10⁻⁴ $C_{11}$ −3.2780 × 10⁻⁵ $C_{13}$ −4.7140 × 10⁻⁵  
$C_{15}$ −2.9271 × 10⁻⁵ $C_{17}$ 2.4849 × 10⁶ $C_{19}$ 1.2015 × 10⁻⁶  
$C_{21}$ 1.4922 × 10⁻⁶

FFS③  
$C_4$ 4.5031 × 10⁻² $C_6$ 3.6824 × 10⁻²

|   | Displacement and tilt(1) | | | | |
|---|---|---|---|---|---|
| X | 0.00 | Y | 0.00 | Z | 0.92 |
| α | 0.96 | β | 0.00 | γ | 0.00 |
|   | Displacement and tilt(2) | | | | |
| X | 0.00 | Y | 0.07 | Z | 12.97 |
| α | 17.99 | β | 0.00 | γ | 0.00 |
|   | Displacement and tilt(3) | | | | |
| X | 0.00 | Y | −4.53 | Z | 6.56 |
| α | 62.09 | β | 0.00 | γ | 0.00 |

|   | -continued |   |   |   |   |   |
|---|---|---|---|---|---|---|
|   | Displacement and tilt(4) | | | | | |
| X | 0.00 | Y | 5.58 | Z | 6.82 |
| α | 85.75 | β | 0.00 | γ | 0.00 |
|   | Displacement and tilt(5) | | | | | |
| X | 0.00 | Y | 7.58 | Z | 6.82 |
| α | 90.00 | β | 0.00 | γ | 0.00 |
|   | Displacement and tilt(6) | | | | | |
| X | 0.00 | Y | 8.58 | Z | 6.82 |
| α | 90.00 | β | 0.00 | γ | 0.00 |
|   | Displacement and tilt(7) | | | | | |
| X | 0.00 | Y | 30.22 | Z | 6.82 |
| α | −45.00 | β | 0.00 | γ | 0.00 |
|   | Displacement and tilt(8) | | | | | |
| X | 0.00 | Y | 30.22 | Z | 15.04 |
| α | 0.00 | β | 0.00 | γ | 0.00 |
|   | Displacement and tilt(9) | | | | | |
| X | 0.00 | Y | 30.22 | Z | 16.24 |
| α | 0.00 | β | 0.00 | γ | 0.00 |

EXAMPLE 4

| Surface No. | Radius of curvature | Surface separation | Displacement and tilt | Refractive index | Abbe's No. |
|---|---|---|---|---|---|
| Object plane | ∞ | 3000.00 | | | |
| 1 | ∞ (HRP) | | | | |
| 2 | FFS①  | | (1) | 1.5254 | 56.2 |
| 3 | FFS②  | | (2) | 1.5254 | 56.2 |
| 4 | FFS①  | | (1) | 1.5254 | 56.2 |
| 5 | FFS③  | | (3) | | |
| 6 | ∞ (IIP) | | (4) | | |
| 7 | FFS④  | | (5) | 1.5254 | 56.2 |
| 8 | FFS⑤  | | (6) | 1.5254 | 56.2 |
| 9 | ∞ | | (7) | 1.5254 | 56.2 |
| 10 | FFS④  | | (5) | 1.5254 | 56.2 |
| 11 | FFS⑤  | | (6) | | |
| 12 | ASS①  | 3.00 | (8) | 1.4924 | 57.6 |
| 13 | −14.48 | 19.00 | | | |
| 14 | ∞ (Stop) | 10.05 | | | |
| Image plane | ∞ | | | | |

ASS①  
R  49.36  
K  0.0000  
A  2.2422 × 10⁻⁴  
B  −2.1818 × 10⁻⁷  
C  −3.5896 × 10⁻⁸

FFS①  
$C_4$ −9.8220 × 10⁻³ $C_6$ −6.8900 × 10⁻³ $C_8$ −3.1549 × 10⁻³  
$C_{10}$ −5.2160 × 10⁻⁴ $C_{11}$ −9.6016 × 10⁻⁵ $C_{13}$ 2.4513 × 10⁻⁵  
$C_{15}$ −5.9498 × 10⁻⁵ $C_{17}$ 1.2613 × 10⁻⁴ $C_{19}$ 3.3129 × 10⁻⁵  
$C_{21}$ −5.5819 × 10⁻⁶

FFS②  
$C_4$ −2.6929 × 10⁻² $C_6$ −2.5097 × 10⁻² $C_8$ −1.3109 × 10⁻³  
$C_{10}$ −1.1874 × 10⁻⁴ $C_{11}$ −1.0901 × 10⁻⁴ $C_{13}$ 1.1904 × 10⁻⁴  
$C_{15}$ 6.4033 × 10⁻⁶ $C_{17}$ 5.3055 × 10⁻⁵ $C_{19}$ 3.6825 × 10⁻⁵  
$C_{21}$ 5.3315 × 10⁻⁶

FFS③  
$C_4$ −3.8459 × 10⁻² $C_6$ −4.6718 × 10⁻² $C_8$ −6.7296 × 10⁻³  
$C_{10}$ −2.9308 × 10⁻³ $C_{11}$ 3.1503 × 10⁻⁴ $C_{13}$ 1.2625 × 10⁻⁴  
$C_{15}$ −8.6321 × 10⁻⁴ $C_{17}$ 2.6496 × 10⁻⁴ $C_{19}$ 3.9268 × 10⁻⁵  
$C_{21}$ −2.0608 × 10⁻⁴

-continued

FFS(4)

| | | | | | | |
|---|---|---|---|---|---|---|
| $C_4$ | $1.2868 \times 10^{-3}$ | $C_6$ | $1.5792 \times 10^{-4}$ | $C_8$ | $2.8184 \times 10^{-5}$ | |
| $C_{10}$ | $-3.9817 \times 10^{-5}$ | $C_{11}$ | $6.2694 \times 10^{-5}$ | $C_{13}$ | $-1.4742 \times 10^{-4}$ | |
| $C_{15}$ | $-2.9931 \times 10^{-5}$ | $C_{17}$ | $9.4073 \times 10^{-6}$ | $C_{19}$ | $-1.2991 \times 10^{-6}$ | |
| $C_{21}$ | $-2.1411 \times 10^{-7}$ | | | | | |

FFS(5)

| | | | | | | |
|---|---|---|---|---|---|---|
| $C_4$ | $-9.9518 \times 10^{-4}$ | $C_6$ | $-5.2292 \times 10^{-4}$ | $C_8$ | $1.7756 \times 10^{-4}$ | |
| $C_{10}$ | $4.2574 \times 10^{-4}$ | $C_{11}$ | $1.5962 \times 10^{-4}$ | $C_{13}$ | $-6.3254 \times 10^{-5}$ | |
| $C_{15}$ | $-1.3103 \times 10^{-5}$ | $C_{17}$ | $-3.5161 \times 10^{-6}$ | $C_{19}$ | $-6.0431 \times 10^{-7}$ | |
| $C_{21}$ | $6.5240 \times 10^{-6}$ | | | | | |

Displacement and tilt(1)

| X | 0.00 | Y | 2.96 | Z | 3.60 |
|---|---|---|---|---|---|
| α | 11.08 | β | 0.00 | γ | 0.00 |

Displacement and tilt(2)

| X | 0.00 | Y | 0.17 | Z | 7.14 |
|---|---|---|---|---|---|
| α | −17.58 | β | 0.00 | γ | 0.00 |

Displacement and tilt(3)

| X | 0.00 | Y | 7.22 | Z | 6.01 |
|---|---|---|---|---|---|
| α | 64.21 | β | 0.00 | γ | 0.00 |

Displacement and tilt(4)

| X | 0.00 | Y | 8.03 | Z | 6.51 |
|---|---|---|---|---|---|
| α | 58.59 | β | 0.00 | γ | 0.00 |

Displacement and tilt(5)

| X | 0.00 | Y | 10.73 | Z | 4.55 |
|---|---|---|---|---|---|
| α | 48.59 | β | 0.00 | γ | 0.00 |

Displacement and tilt(6)

| X | 0.00 | Y | 12.50 | Z | 9.45 |
|---|---|---|---|---|---|
| α | 3.69 | β | 0.00 | γ | 0.00 |

Displacement and tilt(7)

| X | 0.00 | Y | 19.07 | Z | 3.67 |
|---|---|---|---|---|---|
| α | −66.34 | β | 0.00 | γ | 0.00 |

Displacement and tilt(8)

| X | 0.00 | Y | 10.83 | Z | 10.69 |
|---|---|---|---|---|---|
| α | 0.04 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | 3000.00 | | | |
| 1 | ∞ (HRP) | | | | |
| 2 | FFS(1) | | (1) | 1.5254 | 56.2 |
| 3 | FFS(2) | | (2) | 1.5254 | 56.2 |
| 4 | FFS(3) | | (3) | 1.5254 | 56.2 |
| 5 | FFS(4) | | (4) | 1.5254 | 56.2 |
| 6 | FFS(5) | | (5) | | |
| 7 | ∞ (IIP) | | (6) | | |
| 8 | 20.59 | | (7) | 1.5254 | 56.2 |
| 9 | ∞ | | (8) | 1.5254 | 56.2 |
| 10 | ∞ | | (9) | 1.5254 | 56.2 |
| 11 | −184.32 | | (10) | | |
| 12 | ASS(1) | 3.00 | (11) | 1.4924 | 57.6 |
| 13 | −26.75 | 15.00 | | | |
| 14 | ∞ (Stop) | 10.05 | | | |
| Image plane | ∞ | | | | |

ASS(1)

| R | 28.46 |
|---|---|
| K | 0.0000 |
| A | $-3.2434 \times 10^{-5}$ |

-continued

| B | $-1.2227 \times 10^{-6}$ |
|---|---|
| C | $5.0214 \times 10^{-8}$ |

FFS(1)

| $C_4$ | $5.5207 \times 10^{-2}$ | $C_6$ | $-1.3221 \times 10^{-2}$ | | |
|---|---|---|---|---|---|

FFS(2)

| $C_4$ | $-1.3221 \times 10^{-2}$ | $C_6$ | $-1.8121 \times 10^{-3}$ | $C_8$ | $1.1703 \times 10^{-3}$ |
|---|---|---|---|---|---|
| $C_{10}$ | $1.5192 \times 10^{-4}$ | $C_{11}$ | $1.0196 \times 10^{-4}$ | $C_{13}$ | $-4.2316 \times 10^{-5}$ |

FFS(3)

| $C_4$ | $-2.2429 \times 10^{-2}$ | $C_6$ | $-1.3074 \times 10^{-2}$ | $C_8$ | $2.0501 \times 10^{-4}$ |
|---|---|---|---|---|---|
| $C_{10}$ | $-2.8256 \times 10^{-5}$ | $C_{11}$ | $-1.6519 \times 10^{-5}$ | $C_{13}$ | $-1.4893 \times 10^{-5}$ |
| $C_{15}$ | $-1.0367 \times 10^{-6}$ | | | | |

FFS(4)

| $C_4$ | $-1.1252 \times 10^{-2}$ | $C_6$ | $-7.9236 \times 10^{-4}$ | $C_8$ | $-3.2207 \times 10^{-4}$ |
|---|---|---|---|---|---|
| $C_{10}$ | $-3.8321 \times 10^{-4}$ | $C_{11}$ | $7.0905 \times 10^{-5}$ | $C_{13}$ | $1.4413 \times 10^{-5}$ |
| $C_{15}$ | $-4.8013 \times 10^{-7}$ | $C_{17}$ | $-5.1246 \times 10^{-6}$ | | |

FFS(5)

| $C_4$ | $-4.8688 \times 10^{-2}$ | $C_6$ | $2.6178 \times 10^{-2}$ | $C_8$ | $-1.5175 \times 10^{-3}$ |
|---|---|---|---|---|---|
| $C_{10}$ | $-1.4982 \times 10^{-3}$ | $C_{11}$ | $1.7080 \times 10^{-4}$ | $C_{13}$ | $1.2728 \times 10^{-4}$ |
| $C_{15}$ | $1.9131 \times 10^{-6}$ | | | | |

Displacement and tilt(2)

| X | 0.00 | Y | −0.01 | Z | 0.94 |
|---|---|---|---|---|---|
| α | −2.57 | β | 0.00 | γ | 0.00 |

Displacement and tilt(2)

| X | 0.00 | Y | −0.05 | Z | 3.60 |
|---|---|---|---|---|---|
| α | −51.10 | β | 0.00 | γ | 0.00 |

Displacement and tilt(3)

| X | 0.00 | Y | 6.12 | Z | 4.83 |
|---|---|---|---|---|---|
| α | 42.94 | β | 0.00 | γ | 0.00 |

Displacement and tilt(4)

| X | 0.00 | Y | 5.10 | Z | −3.27 |
|---|---|---|---|---|---|
| α | 49.20 | β | 0.00 | γ | 0.00 |

Displacement and tilt(5)

| X | 0.00 | Y | 9.61 | Z | 3.33 |
|---|---|---|---|---|---|
| α | 93.36 | β | 0.00 | γ | 0.00 |

Displacement and tilt(6)

| X | 0.00 | Y | 10.62 | Z | −3.37 |
|---|---|---|---|---|---|
| α | 90.00 | β | 0.00 | γ | 0.00 |

Displacement and tilt(7)

| X | 0.00 | Y | 11.62 | Z | −3.37 |
|---|---|---|---|---|---|
| α | 90.00 | β | 0.00 | γ | 0.00 |

Displacement and tilt(8)

| X | 0.00 | Y | 25.42 | Z | −3.37 |
|---|---|---|---|---|---|
| α | 70.86 | β | 0.00 | γ | 0.00 |

Displacement and tilt(9)

| X | 0.00 | Y | 16.75 | Z | −10.21 |
|---|---|---|---|---|---|
| α | 25.86 | β | 0.00 | γ | 0.00 |

Displacement and tilt(10)

| X | 0.00 | Y | 16.75 | Z | 1.16 |
|---|---|---|---|---|---|
| α | 0.00 | β | 0.00 | γ | 0.00 |

Displacement and tilt(11)

| X | 0.00 | Y | 16.75 | Z | 2.16 |
|---|---|---|---|---|---|
| α | 0.00 | β | 0.00 | γ | 0.00 |

FIGS. 6 to 10 are transverse aberration diagrams for Examples 1 to 5 above. In these transverse diagrams, the bracketed figures represent the horizontal (X-direction) and vertical (Y-direction) angles of view, and indicate transverse aberrations at those angles of view. Shown in the transverse diagrams are transverse aberrations at the center of the viewing screen, an about −70% position of the height of an image on the Y-axis, both an about 70% position of the height of an image in the X-direction and an about −70% position of the height of an image in the Y-direction, an about 70% position of the height of an image on the X-axis, both an about 70% position of the height of an image in the X-direction and an about 70% position of the height of an image in the Y-direction, and about 70% position of the height of an image on the Y-axis, as viewed from bottom to top.

Tabulated below are the values of $|\theta|$, d/Ih, $\alpha$, $|\phi|$, m, $\alpha_{ob}$ and $\alpha_{oc}$ in conditions (1) to (34) in each example. In the examples wherein a plurality of independent reflecting surfaces are used, the values of reflecting angle $\theta$ (in condition (1), etc.) are given in the order of propagation of light from above.

|        | $|\theta|$ | d/Ih | $\alpha$ | $|\phi|$ | m | $\alpha_{ob}$ | $\alpha_{oc}$ |
|--------|------|------|-----|------|------|------|------|
| Ex. 1  | 17.0 | 0.23 | 3.2 | 53.5 | 0.4  | 26.8 | 11.5 |
| Ex. 2  | 26.1 | 0.65 | 2.8 | 0    | 0.4  | 26.8 | 11.5 |
|        | 27.9 |      |     |      |      |      |      |
| Ex. 3  | 17.7 | 0.21 | 4.6 | 90   | 0.4  | 26.8 | 11.5 |
|        | 26.4 |      |     |      |      |      |      |
| Ex. 4  | 21.4 | 1.02 | 0.4 | 58.6 | 0.32 | 26.8 | 9.2  |
| Ex. 5  | 50.2 | 0.21 | 2.8 | 90   | 0.34 | 26.8 | 9.9  |
|        | 35.7 |      |     |      |      |      |      |
|        | 42.0 |      |     |      |      |      |      |

Examples 6 to 18 with no constructive parameters will now be explained.

Examples 6 to 18 shown in FIGS. 11 to 23, respectively, are each directed to a finder optical system made up of two prisms, wherein an intermediate image-formation plane is located between a first prism 10 and a second prism 20 or in the vicinity of either one thereof, and a field mask for determining a field range is disposed thereon. Thus, the first prism 10 is included in the objective optical subsystem and the second prism 20 is included in the ocular optical subsystem. The objective optical subsystem may be made up of one prism 10 as in Examples 1 to 5 or with a zoom optical system associated therewith. The ocular optical subsystem, too, may made up of the second prism 20 alone or with one refractive lens used therewith as in Examples 1 to 5. In each example, the exit optical axis of the finder optical subsystem is substantially parallel with the entrance optical axis thereof. FIGS. 11 to 23 are schematic sections wherein the optical surfaces forming the prism 10, 20 are shown in the form of plane surfaces. As in Examples 1 to 18, however, each optical surface may be constructed of a rotationally asymmetric free-form surface, etc.

EXAMPLE 6

Figure 11:
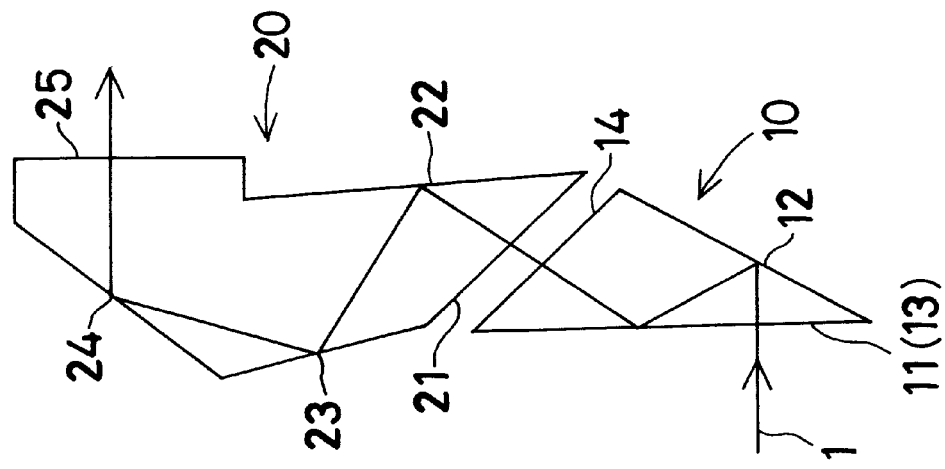
FIG. 11 is a schematic section of Example 6 of the finder optical system according to the invention.

Example 6 corresponds to the eleventh aspect of the invention where in the ocular optical subsystem according to the third aspect of the invention there is located a three-reflection prism with all reflecting surfaces defined by surfaces independent of transmitting surfaces. This example shown in FIG. 11 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22 defined by a roof surface, a second reflecting surface 23, a third reflecting surface 24 and a second transmitting surface 25. The first transmitting surface 11 and second reflecting surface 13 of the first prism 10 are defined by an optical action surface having a combined transmitting and reflecting action. Rotationally asymmetric surfaces are used for the first reflecting surface 12 and second reflecting surface 13 of the first prism 10. Herein the roof surface is used for the first reflecting surface 22 of the second prism 20. However, it is acceptable to use the roof surface for the second reflecting surface 23 or third reflecting surface 24 of the second prism 20. The surfaces of the second prism 20 other than the roof surface, for instance, the second reflecting surface 23 and third reflecting surface 24, too, may be constructed of rotationally asymmetric surfaces.

EXAMPLE 7

Figure 12:
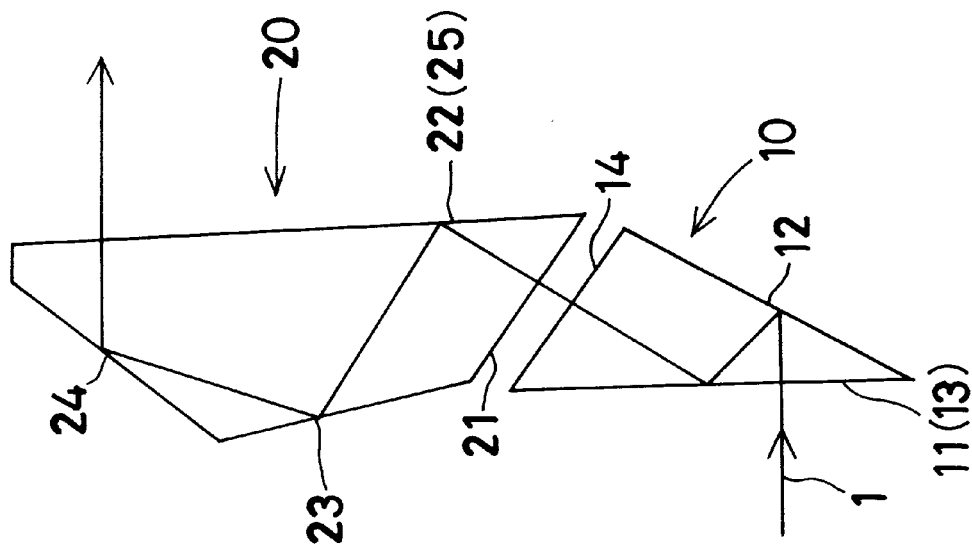
FIG. 12 is a schematic section of Example 7 of the finder optical system according to the invention.

Example 7 corresponds to the twelfth aspect of the invention where in the ocular optical subsystem according to the third aspect of the invention there is located a three-reflection prism with the first reflecting surface being defined by the same surface as the second transmitting surface. This example shown in FIG. 12 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22, a second reflecting surface 23 defined by a roof surface, a third reflecting surface 24 and a second transmitting surface 25. The first transmitting surface 11 and second reflecting surface 13 of the first prism 10, and the second transmitting surface 25 and first reflecting surface 22 of the second prism 20 are defined by optical action surfaces, each having a combined transmitting and reflecting action. Rotationally asymmetric surfaces are used for the first reflecting surface 12 and second reflecting surface 13 of the first prism 10. Herein the roof surface is used for the second reflecting surface 23 of the second prism 20. However, it is acceptable to use the roof surface for the third reflecting surface 24 of the second prism 20. The surfaces of the second prism 20 other than the roof surface, for instance, the first reflecting surface 22 and third reflecting surface 24, too, may be constructed of rotationally asymmetric surfaces.

EXAMPLE 8

Figure 13:
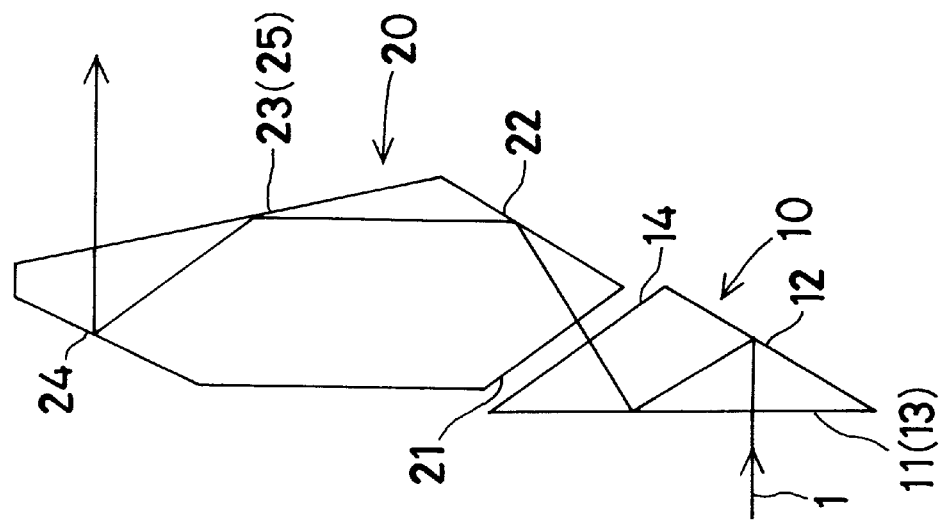
FIG. 13 is a schematic section of Example 8 of the finder optical system according to the invention.

Example 8 corresponds to the thirteenth aspect of the invention where in the ocular optical subsystem according to the third aspect of the invention there is located a three-reflection prism with the second reflecting surface being defined by the same surface as the second transmitting surface. This example shown in FIG. 13 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22 defined by a roof surface, a second reflecting surface 23, a third reflecting surface 24 and a second transmitting surface 25. The first transmitting surface 11 and second reflecting surface 13 of the first prism 10, and the second transmitting surface 25 and second reflecting surface 23 of the second prism 20 are defined by optical action surfaces, each having a combined transmitting and reflecting action. Rotationally asymmetric surfaces are used for the first reflecting surface 12 and second reflecting surface 13 of the first prism 10. Herein the roof surface is used for the first reflecting surface 22 of the second prism 20. However, it is acceptable to use the roof surface for the third reflecting surface 24 of the second prism 20. The surfaces of the second prism 20 other than the roof surface, for instance, the second reflecting surface 23 and third reflecting surface 24, too, may be constructed of rotationally asymmetric surfaces.

EXAMPLE 9

Figure 14:
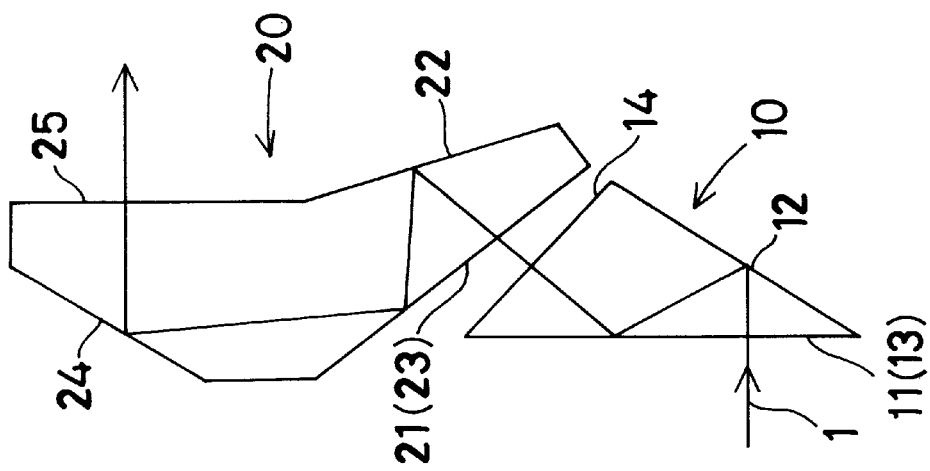
FIG. 14 is a schematic section of Example 9 of the finder optical system according to the invention.

Example 9 corresponds to the fourteeth aspect of the invention where in the ocular optical subsystem according to the third aspect of the invention there is located a three-reflection prism with the second reflecting surface being defined by the same surface as the first transmitting surface. This example shown in FIG. 14 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22 defined by a roof surface, a second reflecting surface 23, a third reflecting surface 24 and a second transmitting surface 25. The first transmitting surface 11 and second reflecting surface 13 of the first prism 10, and the first transmitting surface 21 and second reflecting surface 23 of the second prism 20 are defined by optical action surfaces, each having a combined transmitting and reflecting action. Rotationally asymmetric surfaces are used for the first reflecting surface 12 and second reflecting surface 13 of the first prism 10. Herein the roof surface is used for the first reflecting surface 22 of the second prism 20. However, it is acceptable to use the roof surface for the third reflecting surface 24 of the second prism 20. The surfaces of the second prism 20 other than the roof surface, for instance, the second reflecting surface 23 and third reflecting surface 24, too, may be constructed of rotationally asymmetric surfaces.

EXAMPLE 10

Figure 15:
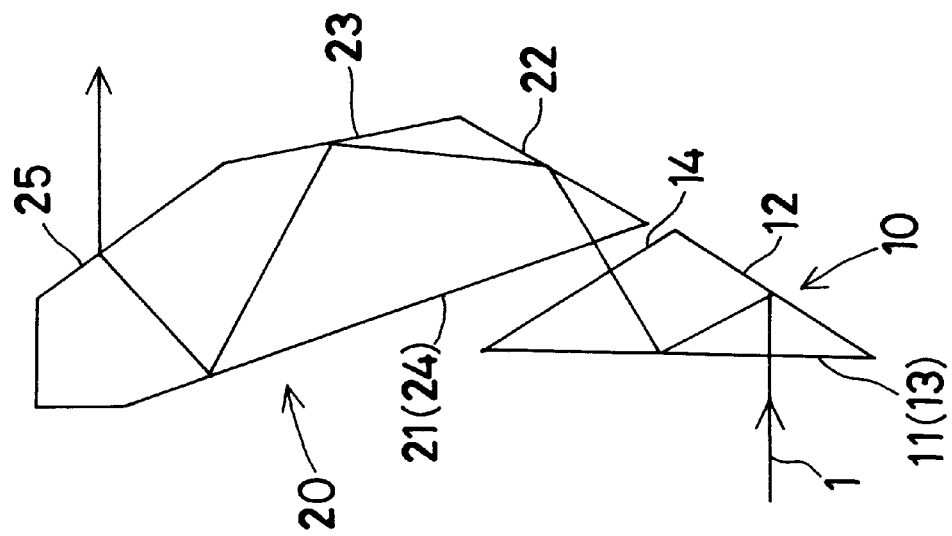
FIG. 15 is a schematic section of Example 10 of the finder optical system according to the invention.

Example 10 corresponds to the fifteenth aspect of the invention where in the ocular optical subsystem according to the third aspect of the invention there is located a three-reflection prism with the third reflecting surface being defined by the same surface as the first transmitting surface. This example shown in FIG. 15 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22 defined by a roof surface, a second reflecting surface 23, a third reflecting surface 24 and a second transmitting surface 25. The first transmitting surface 11 and second reflecting surface 13 of the first prism 10, and the first transmitting surface 21 and third reflecting surface 24 of the second prism 20 are defined by optical action surfaces, each having a combined transmitting and reflecting action. Rotationally asymmetric surfaces are used for the first reflecting surface 12 and second reflecting surface 13 of the first prism 10. Herein the roof surface is used for the first reflecting surface 22 of the second prism 20. However, it is acceptable to use the roof surface for the second reflecting surface 23 of the second prism 20. The surfaces of the second prism 20 other than the roof surface, for instance, the second reflecting surface 23 and third reflecting surface 24, too, may be constructed of rotationally asymmetric surfaces.

EXAMPLE 11

Figure 16:
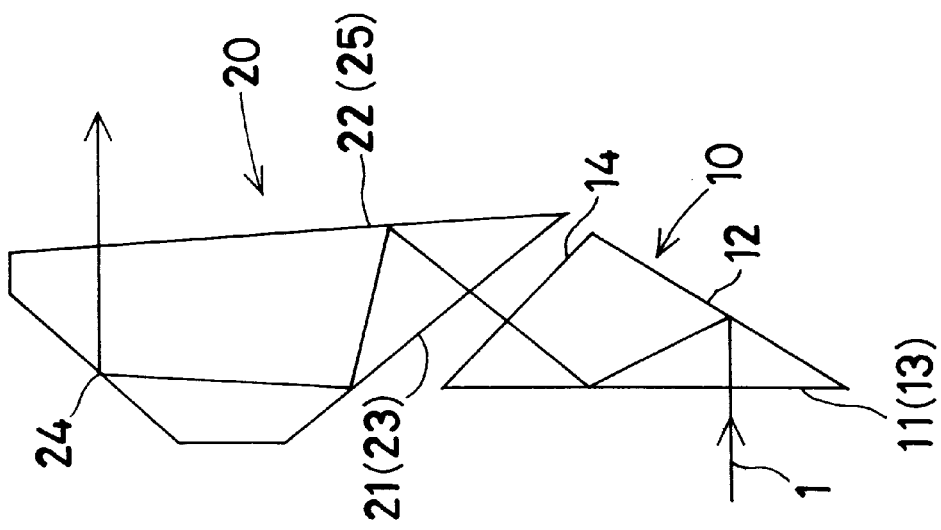
FIG. 16 is a schematic section of Example 11 of the finder optical system according to the invention.

Example 11 corresponds to the sixteenth aspect of the invention where in the ocular optical subsystem according to the third aspect of the invention there is located a three-reflection prism with the second reflecting surface being defined by the same surface as the first transmitting surface and the first reflecting surface being defined by the same surface as the second reflecting surface. This example shown in FIG. 16 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22, a second reflecting surface 23, a third reflecting surface 24 defined by a roof surface and a second transmitting surface 25. The first transmitting surface 11 and second reflecting surface 13 of the first prism 10, and the first transmitting surface 21 and second reflecting surface 23 and the second transmitting surface 25 and first reflecting surface 22 of the second prism 20 are defined by optical action surfaces, each having a combined transmitting and reflecting action. Rotationally asymmetric surfaces are used for the first reflecting surface 12 and second reflecting surface 13 of the first prism 10. The surfaces of the second prism 20 other than the roof surface, for instance, the first reflecting surface 22 and second reflecting surface 23, too, may be constructed of rotationally asymmetric surfaces.

EXAMPLE 12

Figure 17:
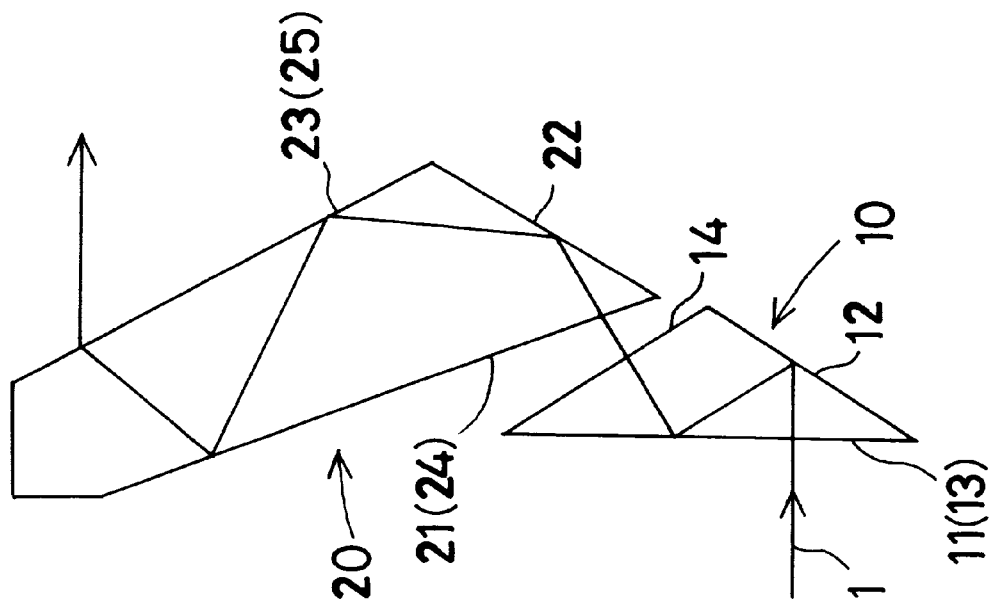
FIG. 17 is a schematic section of Example 12 of the finder optical system according to the invention.

Example 12 corresponds to the seventeenth aspect of the invention where in the ocular optical subsystem according to the third aspect of the invention there is located a three-reflection prism with the third reflecting surface being defined by the same surface as the first transmitting surface and the second reflecting surface being defined by the same surface as the second reflecting surface. This example shown in FIG. 17 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22 defined by a roof surface, a second reflecting surface 23, a third reflecting surface 24 and a second transmitting surface 25. The first transmitting surface 11 and second reflecting surface 13 of the first prism 10, and the first transmitting surface 21 and third reflecting surface 24 and the second transmitting surface 25 and second reflecting surface 23 of the second prism 20 are defined by optical action surfaces, each having a combined transmitting and reflecting action. Rotationally asymmetric surfaces are used for the first reflecting surface 12 and second reflecting surface 13 of the first prism 10. The surfaces of the second prism 20 other than the roof surface, for instance, the second reflecting surface 23 and third reflecting surface 24, too, may be constructed of rotationally asymmetric surfaces.

EXAMPLE 13

Figure 18:
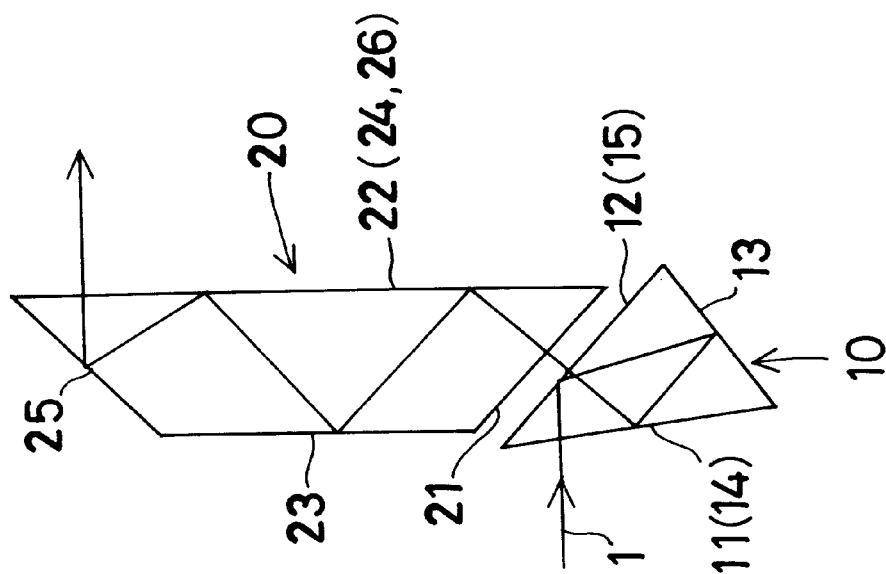
FIG. 18 is a schematic section of Example 13 of the finder optical system according to the invention.

Example 13 embodies the nineteenth aspect of the invention where in the ocular optical subsystem according to the fourth aspect of the invention there is located a four-reflection prism. This example shown in FIG. 18 is directed to a finder optical system made up of, in order of propagation of light from its object side, an objective optical subsystem made up of a first prism 10 having power and consisting of a first transmitting surface 11, a first reflecting surface 12, a second reflecting surface 13, a third reflecting surface 14 and a second transmitting surface 15, and an ocular optical subsystem made up of a second prism 20 consisting of a first transmitting surface 21, a first reflecting surface 22, a second reflecting surface 23 defined by a roof surface, a third reflecting surface 24, a fourth reflecting surface 25 and a second transmitting surface 26. The first transmitting surface 11 and third reflecting surface 13 and the second transmitting surface 15 and second reflecting surface 12 of the first prism 10, and the second transmitting surface 26, first reflecting surface 22 and third reflecting surface 26 of the second prism 20 are defined by optical action surfaces, each having a combined transmitting and reflecting action. Rotationally asymmetric surfaces are used for the first reflecting surface 12, second reflecting surface 13 and third reflecting surface 14 of the first prism 10. Herein the roof surface is used for the second reflecting surface 23 of the second prism 20. However, it is acceptable to use the roof surface for the fourth reflecting surface 25 of the second prism 20. The surfaces of the second prism 20 other than the roof surface, for instance, the first reflecting surface 22, third reflecting surface 24 and fourth reflecting surface 25, too, may be constructed of rotationally asymmetric surfaces.

EXAMPLE 14

Figure 19:
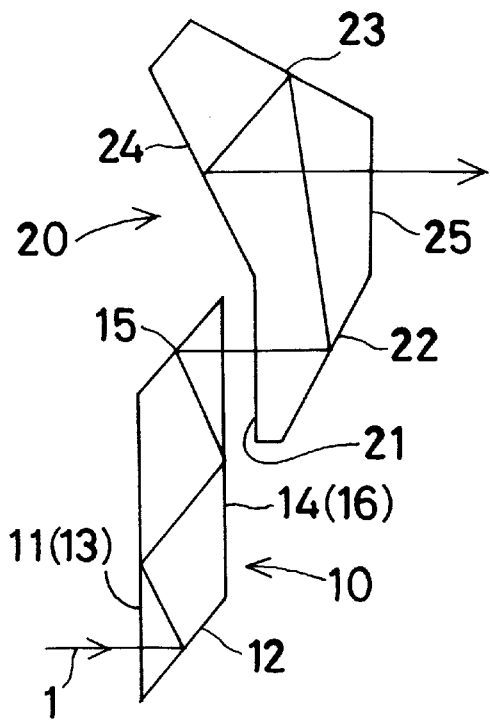
FIG. 19 is a schematic section of Example 14 of the finder optical system according to the invention.

Example 14 embodies the twenty-first aspect of the invention where in the ocular optical subsystem according to the sixth aspect of the invention there is located a three-reflection prism. This example shown in FIG. 19 is directed to a finder optical system made up of, in order of propagation of light from its object side, an objective optical subsystem made up of a first prism 10 having power and consisting of a first transmitting surface 11, a first reflecting surface 12, a second reflecting surface 13, a third reflecting surface 14, a fourth reflecting surface 15 and a second transmitting surface 16, and an ocular optical subsystem made up of a second prism 20 consisting of a first transmitting surface 21, a first reflecting surface 22 defined by a roof surface, a second reflecting surface 23, a third reflecting surface 24 and a second transmitting surface 25 with an axial chief ray crossing over itself between the first and second reflecting surfaces 22 and 23. The first transmitting surface 11 and second reflecting surface 13 and the second transmitting surface 16 and third reflecting surface 14 of the first prism 10 are defined by optical action surfaces, each having a combined transmitting and reflecting action. Rotationally asymmetric surfaces are used for the first reflecting surface 12, second reflecting surface 13, third reflecting surface 14 and fourth reflecting surface 15 of the first prism 10. Herein the roof surface is used for the first reflecting surface 22 of the second prism 20. However, it is acceptable to use the roof surface for the second reflecting surface 23 or third reflecting surface 24 of the second prism 20. The surfaces of the second prism 20 other than the roof surface, for instance, the second reflecting surface 23 and third reflecting surface 24, too, may be constructed of rotationally asymmetric surfaces.

EXAMPLE 15

Figure 20:
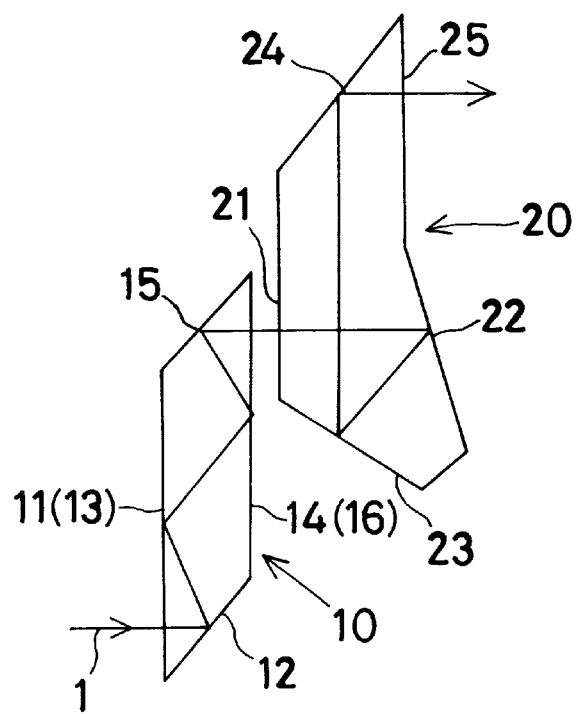
FIG. 20 is a schematic section of Example 15 of the finder optical system according to the invention.

Example 15 embodies the twenty-second aspect of the invention where in the ocular optical subsystem according to the sixth aspect of the invention there is located a three-reflection prism. This example shown in FIG. 20 is directed to a finder optical system made up of, in order of propagation of light from its object side, an objective optical subsystem made up of a first prism 10 having power and consisting of a first transmitting surface 11, a first reflecting surface 12, a second reflecting surface 13, a third reflecting surface 14, a fourth reflecting surface 15 and a second transmitting surface 16, and an ocular optical subsystem made up of a second prism 20 consisting of a first transmitting surface 21, a first reflecting surface 22 defined by a roof surface, a second reflecting surface 23, a third reflecting surface 24 and a second transmitting surface 25 with an axial chief ray crossing over itself between the second and third reflecting surfaces 23 and 24. The first transmitting surface 11 and second reflecting surface 13 and the second transmitting surface 16 and third reflecting surface 14 of the first prism 10 are defined by optical action surfaces, each having a combined transmitting and reflecting action. Rotationally asymmetric surfaces are used for the first reflecting surface 12, second reflecting surface 13, third reflecting surface 14 and fourth reflecting surface 15 of the first prism 10. Herein the roof surface is used for the first reflecting surface 22 of the second prism 20. However, it is acceptable to use the roof surface for the second reflecting surface 23 or third reflecting surface 24 of the second prism 20. The surfaces of the second prism 20 other than the roof surface, for instance, the second reflecting surface 23 and third reflecting surface 24, too, may be constructed of rotationally asymmetric surfaces.

EXAMPLE 16

Figure 21:
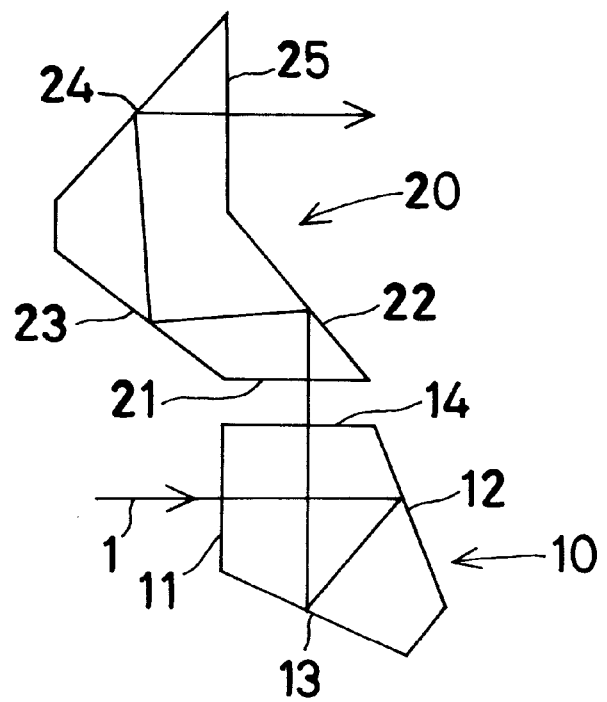
FIG. 21 is a schematic section of Example 16 of the finder optical system according to the invention.

Example 16 embodies the twenty-sixth aspect of the invention where in the ocular optical subsystem according to the seventh aspect of the invention there is located a three-reflection prism. This example shown in FIG. 21 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22 defined by a roof surface with an axial chief ray being reflected therefrom to the object side, a second reflecting surface 23, a third reflecting surface 24 and a second transmitting surface 25. Rotationally asymmetric surfaces are used for the first reflecting surface 12 and second reflecting surface 13 of the first prism 10. Herein the roof surface is used for the first reflecting surface 22 of the second prism 20. However, it is acceptable to use the roof surface for the second reflecting surface 23 or third reflecting surface 24 of the second prism 20. The surfaces of the second prism 20 other than the roof surface, for instance, the second reflecting surface 23 and third reflecting surface 24, too, may be constructed of rotationally asymmetric surfaces.

EXAMPLE 17

Figure 22:
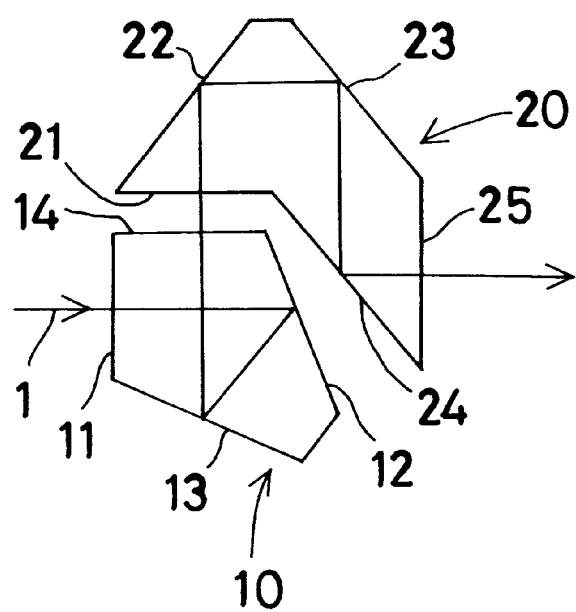
FIG. 22 is a schematic section of Example 17 of the finder optical system according to the invention.

Example 17 embodies the twenty-seventh aspect of the invention where in the ocular optical subsystem according to the seventh aspect of the invention there is located a three-reflection prism. This example shown in FIG. 22 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22 defined by a roof surface with an axial chief ray being reflected therefrom to an image side, a second reflecting surface 23, a third reflecting surface 24 and a second transmitting surface 25. Rotationally asymmetric surfaces are used for the first reflecting surface 12 and second reflecting surface 13 of the first prism 10. Herein the roof surface is used for the first reflecting surface 22 of the second prism 20. However, it is acceptable to use the roof surface for the second reflecting surface 23 or third reflecting surface 24 of the second prism 20. The surfaces of the second prism 20 other than the roof surface, for instance, the second reflecting surface 23 and third reflecting surface 24, too, may be constructed of rotationally asymmetric surfaces.

EXAMPLE 18

Figure 23:
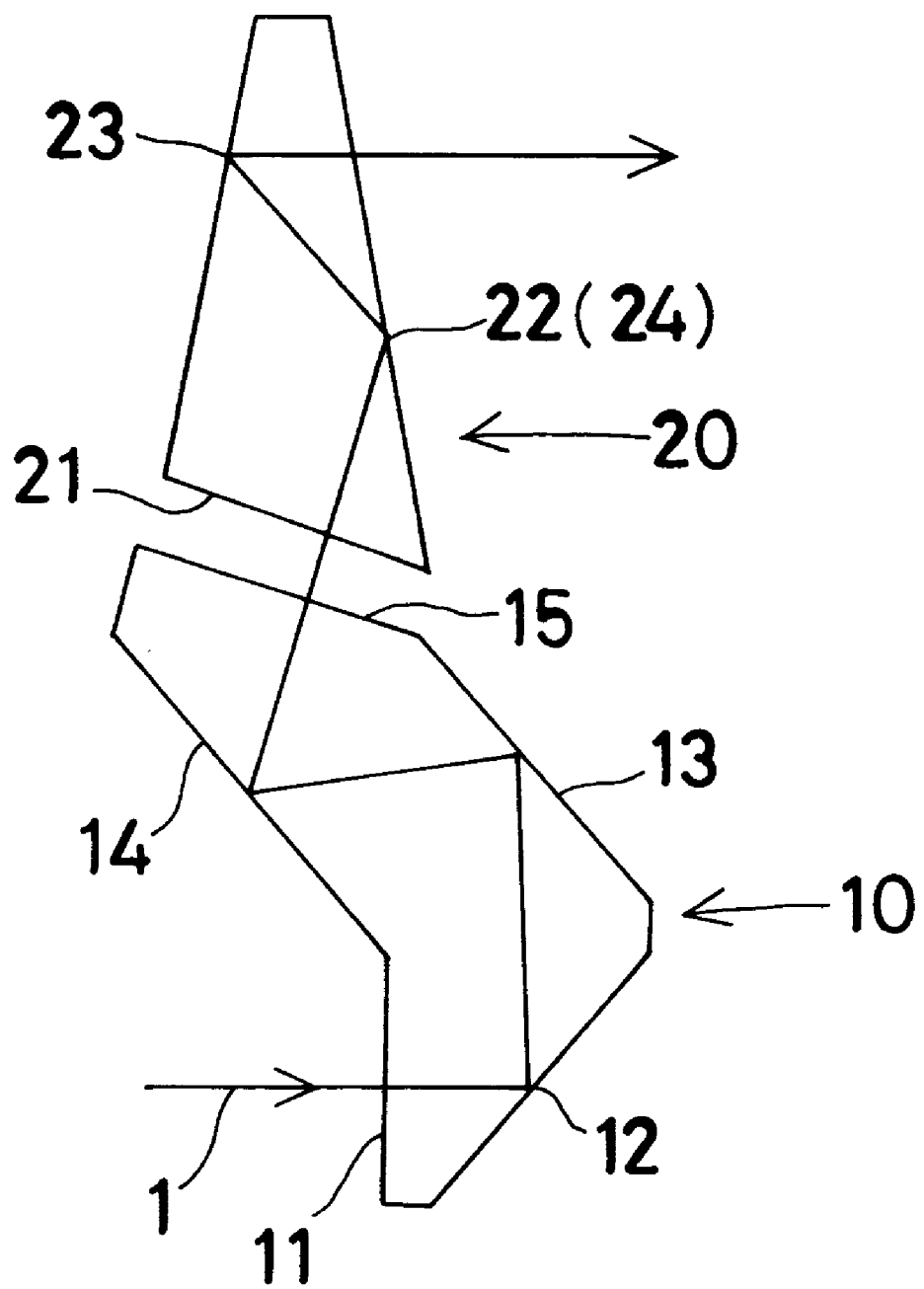
FIG. 23 is a schematic section of Example 18 of the finder optical system according to the invention.

Example 18 embodies the twenty-eighth aspect of the invention where in the ocular optical subsystem according to the eighth aspect of the invention there is located a two-reflection prism. This example shown in FIG. 23 is directed to a finder optical system made up of, in order of propagation of light from its object side, an objective optical subsystem made up of a first prism 10 having power and consisting of a first transmitting surface 11, a first reflecting surface 12, a second reflecting surface 13 and a second transmitting surface 14, and an ocular optical subsystem made up of a second prism 20 consisting of a first transmitting surface 21, a first reflecting surface 22, a second reflecting surface 23 defined by a roof surface and a second transmitting surface 24. Rotationally asymmetric surfaces are used for the first reflecting surface 12 and second reflecting surface 13 of the first prism 10. Herein the roof surface is used for the second reflecting surface 23 of the second prism 20. However, it is acceptable to use the roof surface for the third reflecting surface 14 of the second prism 10. The surfaces of the first prism 10 and second prism 20 other than the roof surface, for instance, the third reflecting surface 14 of the first prism 10 and the first reflecting surface 22 of the second prism 20, too, may be constructed of rotationally asymmetric surfaces.

The finder optical system of the invention as mentioned above may be used on an image pickup device wherein an object image is formed and received on an image pickup element such as a CCD or silver salt film for image-pickup purposes, especially, a camera, as exemplified below.

Figure 24:
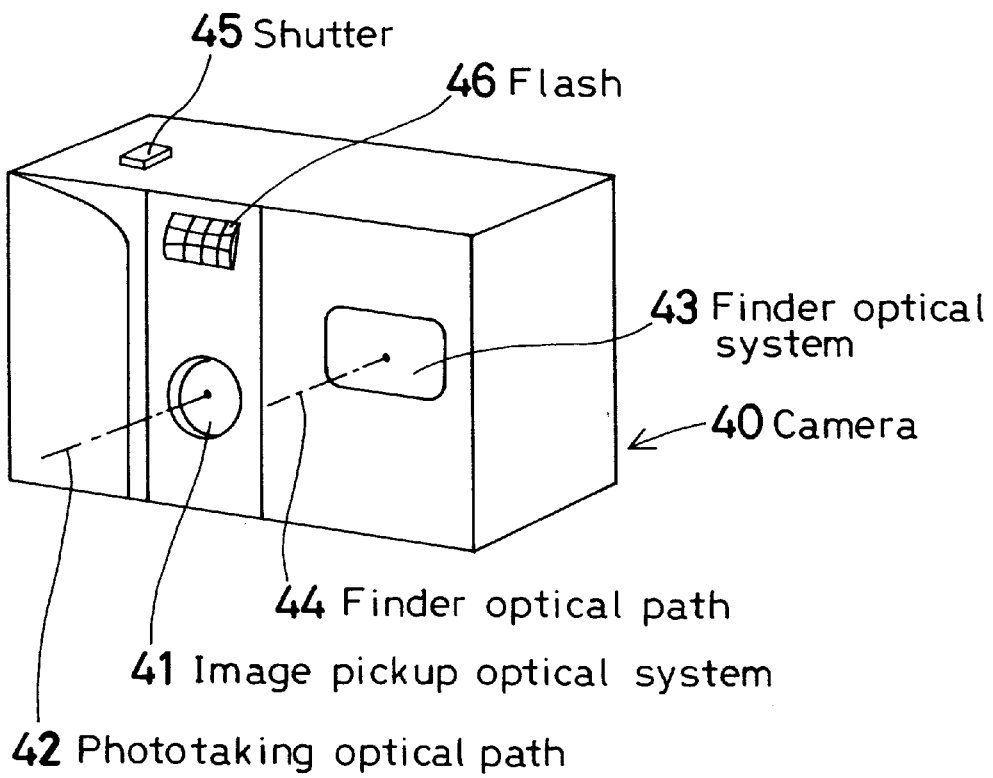
FIG. 24 is a forward perspective view of an appearance of an electronic camera to which the finder optical system according to the invention is applied.
Figure 25:
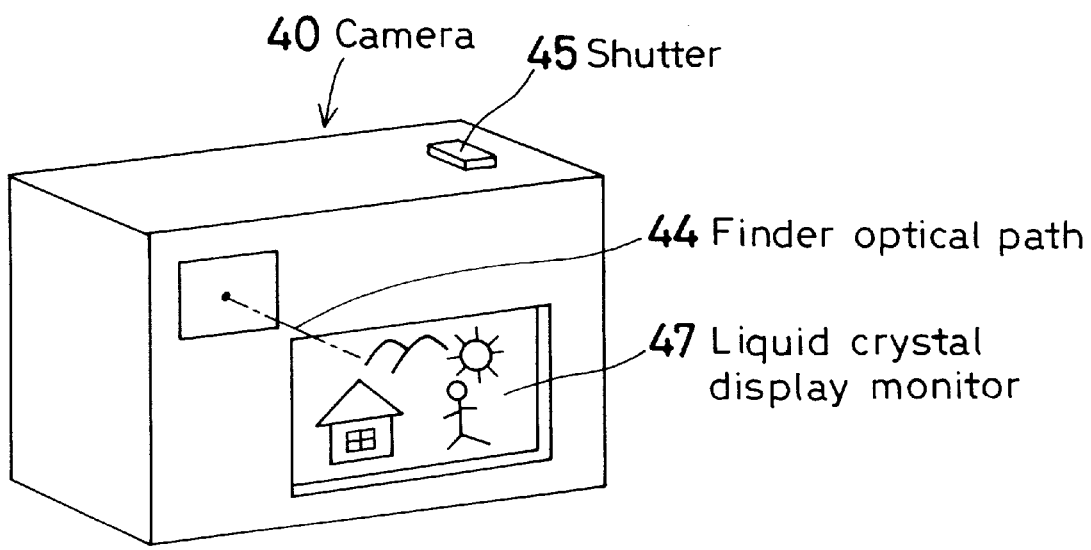
FIG. 25 is a rearward perspective view of the electronic camera of FIG. 24.
Figure 26:
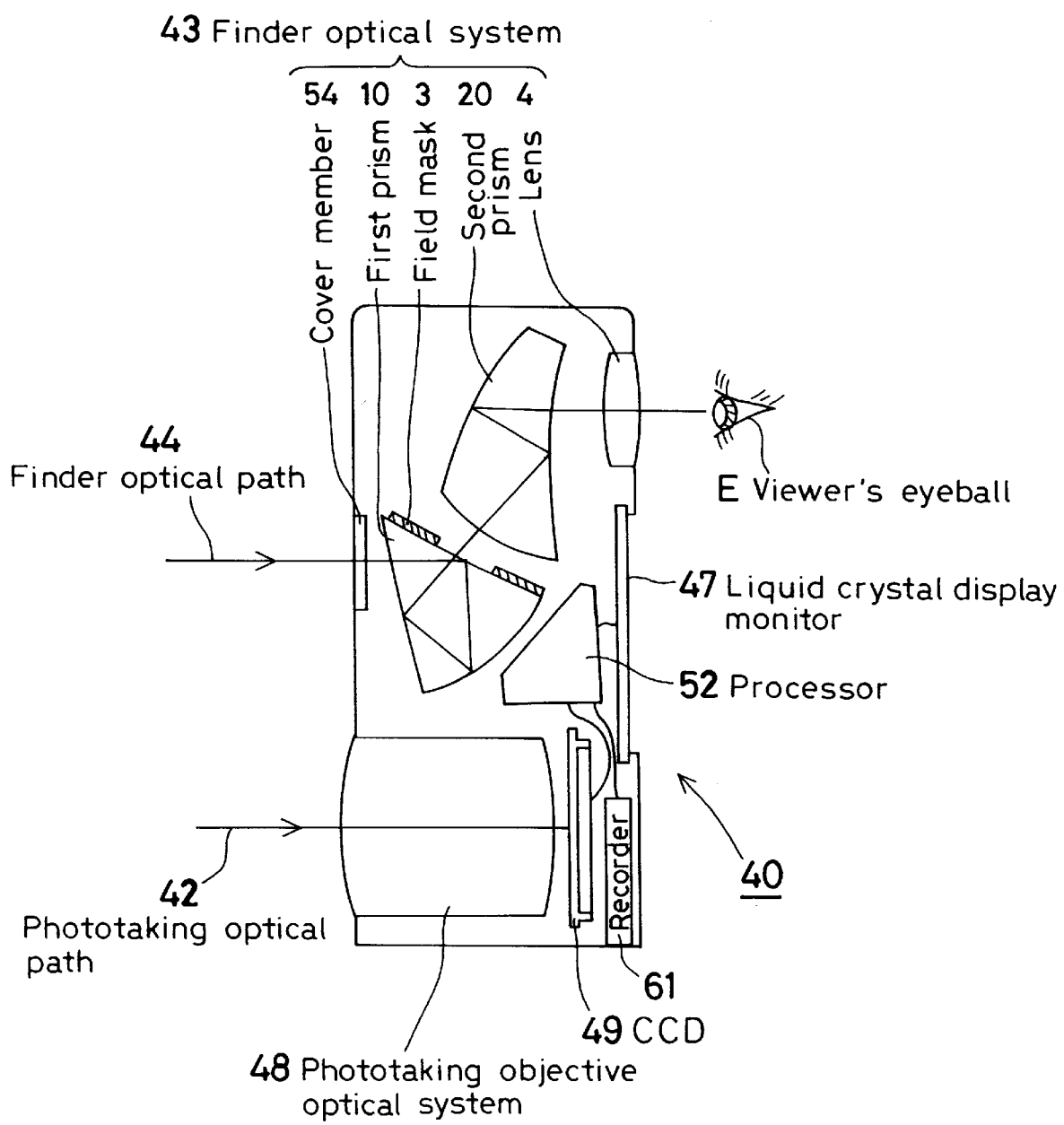
FIG. 26 is a sectional view showing one construction of the electronic camera of FIG. 24.
Figure 27:
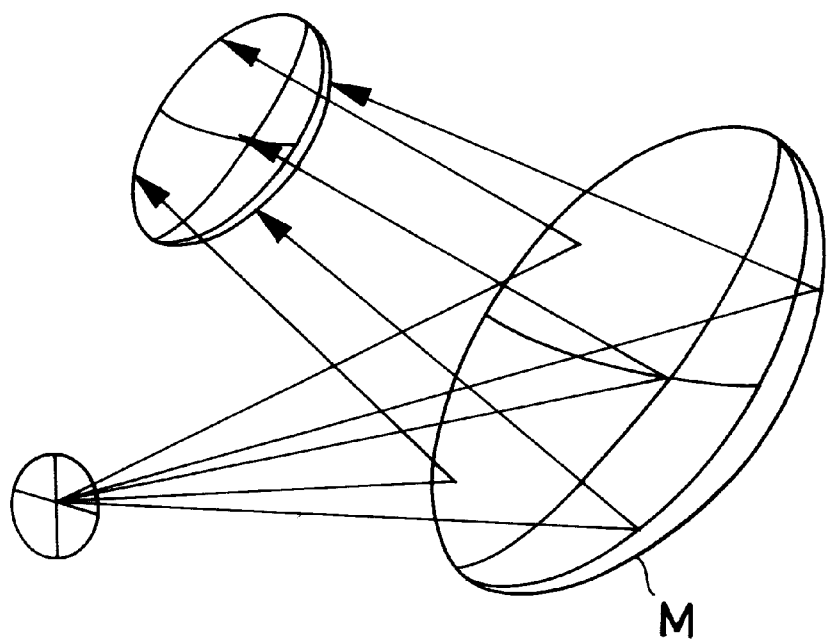
FIG. 27 is a conceptual view for illustrating field curvature produced by a decentered reflecting surface.
Figure 28:
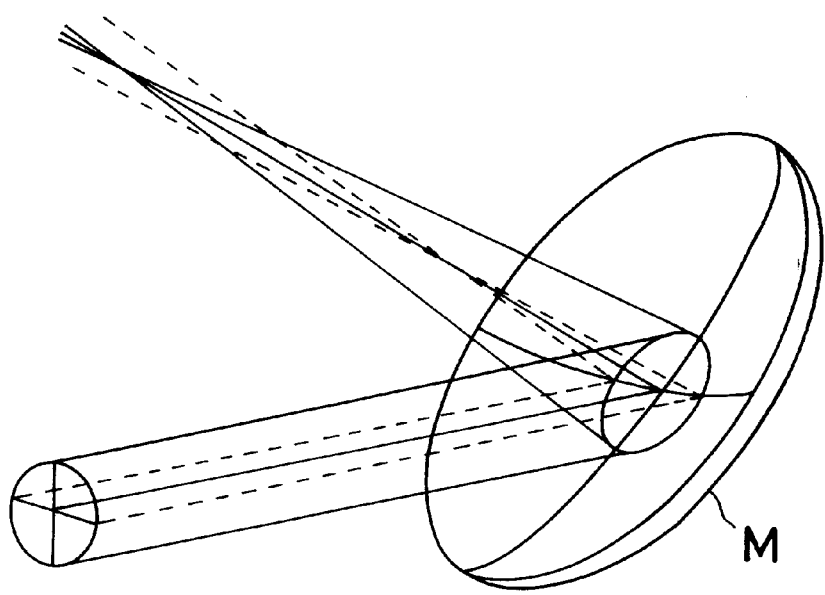
FIG. 28 is a conceptual view for illustrating astigmatism produced by a decentered reflecting surface.
Figure 29:
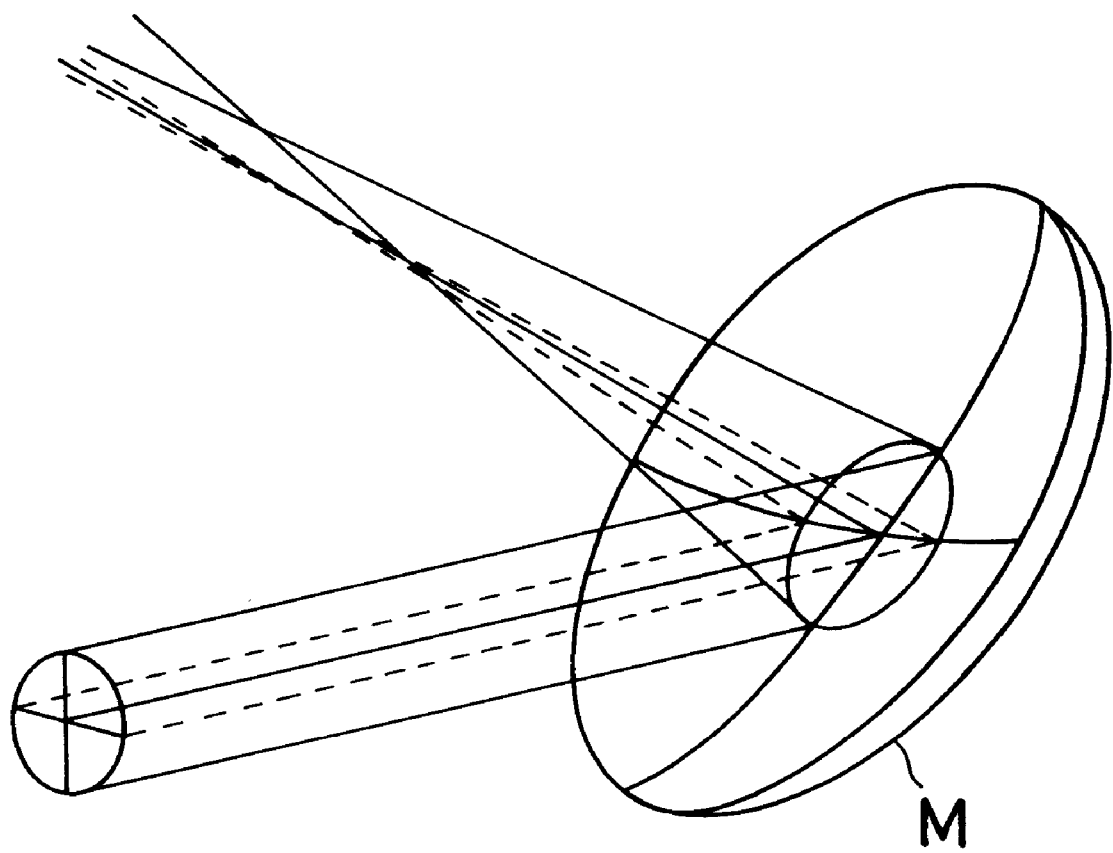
FIG. 29 is a conceptual view for illustrating coma produced by a decentered reflecting surface.

FIGS. 24 to 26 are conceptual schematics of one embodiment of the invention wherein the finder optical system of the invention is built in a finer portion of an electronic camera. FIG. 24 is a forward perspective view of one appearance of an electronic camera 49, FIG. 25 is a rearward perspective view of the same camera, and FIG. 26 is a sectional view of one construction of the electronic camera 40. In this case, the electronic camera 40 comprises a phototaking optical system 41 including a phototaking optical path 42, a finder optical system 43 including a finder optical path 44, a shutter 45, a flash 46, a liquid crystal display monitor 47, etc. Upon a push given to the shutter 45 built on the upper portion of the camera 40, a phototaking operation occurs correspondingly through a phototaking objective optical subsystem 48. An object image formed through the objective optical subsystem 48 is formed on an image pickup plane of a CCD 49. The object image received on the CCD 49 is processed through a processor 52 and displayed in the form of an electronic image on the liquid crystal display monitor 47 located on the back side of the camera. A recorder 61 may be connected to the processor 52 to record the electronic image therein. Instead of the CCD 49, a silver salt camera with silver salt film loaded therein may be used.

For instance, a similar finder optical system 43 as in Example 1 is located on the finder optical path 44, so that a subject image can be viewed by an observer's eyeball E. In this case, a plane-parallel plate is provided in the form of a cover member 54 to form a part of the finder optical system 43. In place of this, a concave lens may be used to enlarge the angle of view.

The finder optical system 43 in the thus constructed camera 40 can be made up of a reduced number of optical members, so that ever-higher performance can be achieved at ever-lower costs, and so the degree of freedom in camera design can be increased.

In FIG. 26, the construction of the phototaking objective optical subsystem 48 is not illustrated. However, it is to be understood that not only a refraction type coaxial optical system but also a decentration prism image optical system comprising two prisms as in the present invention may be used as the phototaking objective optical subsystem 48.

As can clearly be seen from the foregoing, the present invention can provide a slimmed-down yet high-performance finder optical system which is well corrected for decentration aberrations by proper location of rotationally asymmetric surfaces.

What we claim is:

1. A finder optical system comprising, in order from an object side thereof, an objective optical subsystem having a positive refracting power, an image-inversion means for erecting a real image formed by said objective optical subsystem having only one image-formation action to an erect image, and an ocular optical subsystem having a positive refracting power, with at least one of reflecting surfaces being defined by a roof surface, wherein:

said objective optical subsystem comprises at least two reflecting surfaces, each defined by a rotationally asymmetric surface having a power, and at least one of said reflecting surfaces is defined by a reflecting surface that is not the same surface as a transmitting surface, with said at least one reflecting surface satisfying the following condition (1):

$$5°<|\theta|<25° \quad (1)$$

where $\theta$ is an angle of reflection of an axial chief ray with respect to a normal to said reflecting surface that is not the same surface as the transmitting surface.

2. A finder optical system comprising, in order from an object side thereof, an objective optical subsystem having a positive refracting power, an image-inversion means for erecting a real image formed by said objective optical subsystem having only one image formation action to an erect image, and an ocular optical subsystem having a positive refracting power, with at least one of reflecting surfaces being defined by a roof surface, wherein:

said objective optical subsystem comprises at least a plurality of reflecting surfaces, each defined by a rotationally asymmetric surface having a power, and at least two of said reflecting surfaces are each defined by a reflecting surface that is not the same surface as a transmitting surface, with at least one of said at least two reflecting surfaces satisfying the following condition (1):

$$5° < |\theta| < 45° \tag{3}$$

where θ is an angle of reflection of an axial chief ray with respect to a normal to said reflecting surface that is not the same surface as the transmitting surface.

3. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, each of which is defined by a rotationally asymmetric surface, with a second reflecting surface being defined by the same surface as a first transmitting surface and a first reflecting surface satisfying the following condition (5):

$$5° < |\theta| < 25° \tag{5}$$

where θ is an angle of reflection of an axial chief ray with respect to a normal to the first reflecting surface.

4. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least two reflecting surfaces of which are each defined by a rotationally asymmetric surface, with a first reflecting surface being defined by the same surface as a second transmitting surface and a third reflecting surface being defined by the same surface as a first transmitting surface, and the second reflecting surface of said reflecting surfaces of said prism has a strongest power.

5. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least two reflecting surfaces of which are each defined by a rotationally asymmetric surface, with a second reflecting surface being defined by the same as a second transmitting surface or both a first transmitting surface and a second transmitting surface.

6. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising four reflecting surfaces, at least two reflecting surfaces of which are each defined by a rotationally asymmetric surface, with a second reflecting surface being defined by the same surface as a first transmitting surface and a third reflecting surface being defined by the same surface as a second transmitting surface.

7. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising reflecting surfaces, each of which is defined by a rotationally asymmetric surface, with first and second reflecting surfaces being independent of first and second transmitting surfaces, and having a power of the same sign.

8. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least two reflecting surfaces of which are each defined by a rotationally asymmetric surface, with all first to third reflecting surfaces being defined by surfaces independent of first and second transmitting surfaces.

9. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface and a first reflecting surface satisfying the following condition (7), and said ocular optical subsystem comprises a prism comprising three reflecting surfaces, with a first reflecting surface being defined by the same surface as a second transmitting surface and a third reflecting surface being defined by the same surface as a first transmitting surface:

$$5° < |\theta| < 25° \tag{7}$$

where θ is an angle of reflection of an axial chief ray with respect to a normal to the first reflecting surface of said prism in said objective optical subsystem.

10. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a first reflecting surface being defined by the same surface as a second transmitting surface and a third reflecting surface being defined by the same surface as a first transmitting surface, while the following condition (9) is satisfied:

$$0.1 < d/Ih < 2.5 \qquad (9)$$

where d is a distance along an axial chief ray from the first transmitting surface to an entrance pupil of said prism in said objective optical subsystem, and Ih is a maximum intermediate image-formation height.

11. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, in which an axial chief ray does not cross over itself, and all first, second and third reflecting surfaces are defined by surfaces independent of first and second transmitting surfaces.

12. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a first reflecting surface being defined by the same surface as a second transmitting surface, and all first, and a third reflecting surface being defined by a surface independent of first and second transmitting surfaces.

13. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a second reflecting surface being defined by the same surface as a second transmitting surface.

14. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a second reflecting surface being defined by the same surface as a first transmitting surface.

15. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a third reflecting surface being defined by the same surface as a first transmitting surface, and all first, and a first reflecting surface being defined by a surface independent of first and second transmitting surfaces.

16. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a first reflecting surface being defined by the same surface as a second transmitting surface and a second reflecting surface being defined by the same surface as the first transmitting surface.

17. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, with a second reflecting surface being defined by the same surface as a first transmitting surface, and said ocular optical subsystem comprises a prism comprising three reflecting surfaces, with a second reflecting surface being defined by the same surface as a second transmitting surface, and a third reflecting surface being defined by the same surface as a first transmitting surface.

18. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least one reflecting surface of which is defined by a rotationally asymmetric surface, with a first reflecting surface being defined by the same surface as a second transmitting surface and a third reflecting surface being defined by the same surface as a first transmitting surface, said second reflecting surface having a strongest power, and said ocular optical subsystem comprises a prism comprising two reflecting surfaces, with a second transmitting surface being defined by the same surface as a first reflecting surface.

19. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least one reflecting surface of which is defined by a rotationally asymmetric surface, with a first reflecting surface being defined by the same surface as a second transmitting surface and a third reflecting surface being defined by the same surface as a first transmitting surface, and said ocular optical subsystem comprises a prism which comprises four reflecting surfaces, and in which an axial chief ray does not cross over itself.

20. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least one reflecting surface of which is defined by a rotationally asymmetric surface, with a second reflecting surface being defined by the same surface as both a first transmitting surface and a second transmitting surface, and said ocular optical subsystem comprises a prism comprising two reflecting surfaces, which are all defined by surfaces independent of a first transmitting surface and a second transmitting surface.

21. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising four reflecting surfaces, at least two reflecting surfaces of which are each defined by a rotationally asymmetric surface, with a second reflecting surface being defined by the same surface as a first transmitting surface and a third reflecting surface being defined by the same surface as a second transmitting surface, and said ocular optical subsystem comprises a prism comprising three reflecting surfaces, which are all defined by surfaces independent of a first transmitting surface and a second transmitting surface, with an axial chief ray crossing over itself between a first reflecting surface and a second reflecting surface.

22. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising four reflecting surfaces, at least two reflecting surfaces of which are each defined by a rotationally asymmetric surface, with a second reflecting surface being defined by the same surface as a first transmitting surface and a third reflecting surface being defined by the same surface as a second transmitting surface, and said ocular optical subsystem comprises a prism comprising three reflecting surfaces, which are all defined by surfaces independent of said first transmitting surface and said second transmitting surface, with an axial chief ray crossing over itself between a second reflecting surface and a third reflecting surface.

23. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, and which are all defined by surfaces independent of a first transmitting surface and a second transmitting surface and have a power of the same sign, and said ocular optical subsystem comprises a prism comprising one reflecting surface.

24. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, which are all defined by surfaces independent of a first transmitting surface and a second transmitting surface, and either one of which satisfies the following condition (11), and said ocular optical subsystem comprises a prism comprising one reflecting surface:

$$5°<|\theta|<45° \quad (11)$$

where θ is an angle of reflection of an axial chief ray with respect to a normal to the first reflecting surface or the second reflecting surface.

25. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, and which are all defined by surfaces independent of a first transmitting surface and a second transmitting surface, and said ocular optical subsystem comprises a prism comprising one reflecting surface, while the following condition (13) is satisfied:

$$0.1<d/Ih<2.5 \quad (13)$$

where d is a distance along an axial chief ray from the first transmitting surface to an entrance pupil of said prism in said objective optical subsystem, and Ih is a maximum intermediate image-formation height.

26. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, and which are defined by surfaces independent of a first transmitting surface and a second transmitting surface, and said ocular optical subsystem comprises a prism comprising three reflecting surfaces which are all defined by surfaces independent of a first transmitting surface and a second transmitting surface, with an axial chief ray being reflected from a first reflecting surface to an object side.

27. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising two reflecting surfaces, at least one reflecting surface of which is defined by a rotationally asymmetric surface, and which are defined by surfaces independent of a first transmitting surface and a second transmitting surface, and said ocular optical subsystem comprises a prism comprising three reflecting surfaces which are all defined by surfaces independent of a first transmitting surface and a second transmitting surface, with an axial chief ray being reflected from a first reflecting surface to a pupil side.

28. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least two reflecting surfaces of which is each defined by a rotationally asymmetric surface, and which are all defined by surfaces independent of a first transmitting surface and a second transmitting surface, and said ocular optical subsystem comprises a prism comprising two reflecting surfaces, with a second transmitting surface being defined by the same surface as a first reflecting surface.

29. A real-image type finder optical system comprising, in order from an object side thereof, an objective optical subsystem having a positive refracting power, an image-inversion means for erecting a real image formed by said objective optical subsystem having only one image-formation action to an erect image and an ocular optical subsystem having a positive refracting power, with at least one of reflecting surfaces being defined by a roof surface, wherein:

said objective optical subsystem comprises a prism comprising three reflecting surfaces, at least two reflecting surfaces of which is each defined by a rotationally asymmetric surface, and which are all defined by surfaces independent of a first transmitting surface and a second transmitting surface, and said ocular optical subsystem comprises a prism comprising two reflecting surfaces which are all defined by surfaces independent of a first transmitting surface and a second transmitting surface.

30. The real-image type finder optical system according to claim 1, wherein said objective optical subsystem, and said ocular optical subsystem comprise at least one prism that is said image-inversion means.

31. The real-image type finder optical system according to claim 1, wherein said objective optical subsystem comprises one positive-power prism including said image-inversion means.

32. The real-image type finder optical system according to claim 1, wherein said ocular optical subsystem comprises at least one refracting lens free from any reflecting surface.

33. The real-image type finder optical system according to claim 1, wherein said roof surface is used for a reflecting surface included in said image-inversion means located on an pupil side with respect to an intermediate image-formation plane.

34. The real-image type finder optical system according to claim 7, wherein said image-inversion means located on a pupil side with respect to an intermediate image-formation plane comprises one reflecting surface.

35. The real-image type finder optical system according to any one of claims 4, 5 and 8, wherein said image-inversion means located on a pupil side with respect to an intermediate image-formation plane comprises two reflecting surfaces.

36. The real-image type finder optical system according to any one of claims 3, 6 and 7, wherein said image-inversion means located on a pupil side with respect to an intermediate image-formation plane comprises three reflecting surfaces.

37. The real-image type finder optical system according to claim 4, wherein said image-inversion means located on a pupil side with respect to an intermediate image-formation plane comprises four reflecting surfaces.

38. The real-image type finder optical system according to claim 4, wherein the reflecting surface that is not the same surface as a transmitting surface in said objective optical subsystem satisfies the following condition (15):

$$5°<|\theta|<25° \quad (15)$$

where θ is an angle of reflection of an axial chief ray with respect to a normal to the reflecting surface that is not the same as a transmitting surface.

39. The real-image type finder optical system according to claim 3, wherein the reflecting surface that is not the same surface as a transmitting surface in said objective optical subsystem satisfies the following condition (16):

$$5°<|\theta|<21.5° \quad (16)$$

where θ is an angle of reflection of an axial chief ray with respect to a normal to the reflecting surface that is not the same as a transmitting surface.

40. The real-image type finder optical system according to claim 5, wherein any one of the reflecting surfaces that are not the same surface as transmitting surfaces in said objective optical subsystem satisfies the following condition (17):

$$5°<|\theta|<45° \quad (17)$$

where θ is an angle of reflection of an axial chief ray with respect to a normal to the reflecting surfaces that are not the same as transmitting surfaces.

41. The real-image type finder optical system according to claim 5, wherein any one of the reflecting surfaces that are not the same surface as transmitting surfaces in said objective optical subsystem satisfies the following condition (18):

$$5°<|\theta|<37° \quad (18)$$

where θ is an angle of reflection of an axial chief ray with respect to a normal to the reflecting surfaces that are not the same as transmitting surfaces.

42. The real-image type finder optical system according to claim 1, wherein an entrance pupil position of said objective optical subsystem satisfies the following condition (19):

$$0.1<d/Ih<2.5 \quad (19)$$

where d is a distance along an axial chief ray of a first transmitting surface to an entrance pupil of a prism located in said objective optical subsystem.

43. The real-image type finder optical system according to claim 1, wherein an entrance pupil position of said objective optical subsystem satisfies the following condition (20):

$$0.2<d/Ih<1.2 \quad (20)$$

where d is a distance along an axial chief ray of a first transmitting surface to an entrance pupil of a prism located in said objective optical subsystem.

44. The finder optical system according to claim 1, wherein a ray passing through an center of an entrance pupil of said objective optical subsystem satisfies the following condition (21):

$$-5°<\alpha<15° \quad (21)$$

where α is a maximum exit angle of said objective optical subsystem on the base of an axial chief ray.

45. The finder optical system according to claim 1, wherein a ray passing through a center of an entrance pupil of said objective optical subsystem satisfies the following condition (22):

$$-1°<\alpha<7° \quad (22)$$

where α is a maximum exit angle of said objective optical subsystem on the base of an axial chief ray.

46. The finder optical system according to claim 5, wherein an angle between a ray incident on said objective optical subsystem and a ray incident on an intermediate image-formation plane satisfies the following condition (23):

$$0°\leq|\phi|<30° \quad (23)$$

where φ is an angle between a center chief ray incident on said objective optical subsystem and a center chief ray incident on an intermediate image-formation plane.

47. The finder optical system according to claim 5, wherein an angle between a ray incident on said objective optical subsystem and a ray incident on an intermediate image-formation plane satisfies the following condition (24):

$$0°\leq|\phi|<20° \quad (24)$$

where φ is an angle between a center chief ray incident on said objective optical subsystem and a center chief ray incident on an intermediate image-formation plane.

48. The finder optical system according to claim 3, wherein an angle between a ray incident on said objective optical subsystem and a ray incident on an intermediate image-formation plane satisfies the following condition (25):

$$30° < |\phi| < 80° \tag{25}$$

where $\phi$ is an angle between a center chief ray incident on said objective optical subsystem and a center chief ray incident on an intermediate image-formation plane.

49. The finder optical system according to claim 3, wherein an angle between a ray incident on said objective optical subsystem and a ray incident on an intermediate image-formation plane satisfies the following condition (26):

$$40° < |\phi| < 70° \tag{26}$$

where $\phi$ is an angle between a center chief ray incident on said objective optical subsystem and a center chief ray incident on an intermediate image-formation plane.

50. The finder optical system according to claim 7, wherein an angle between a ray incident on said objective optical subsystem and a ray incident on an intermediate image-formation plane satisfies the following condition (27):

$$60° < |\phi| \leq 90° \tag{27}$$

where $\phi$ is an angle between a center chief ray incident on said objective optical subsystem and a center chief ray incident on an intermediate image-formation plane.

51. The finder optical system according to claim 7, wherein an angle between a ray incident on said objective optical subsystem and a ray incident on an intermediate image-formation plane satisfies the following condition (28):

$$70° < |\phi| \leq 90° \tag{15}$$

where $\phi$ is an angle between a center chief ray incident on said objective optical subsystem and a center chief ray incident on an intermediate image-formation plane.

52. The finder optical system according to claim 1, which has a finder magnification satisfying the following condition (29):

$$0.05 < m < 10 \tag{29}$$

where m is a finder magnification defined by a focal length of said objective optical subsystem divided by a focal length of said ocular optical subsystem.

53. The finder optical system according to claim 1, which has a finder magnification satisfying the following condition (30):

$$0.1 < m < 2 \tag{30}$$

where m is a finder magnification defined by a focal length of said objective optical subsystem divided by a focal length of said ocular optical subsystem.

54. The finder optical system according to claim 1, wherein said objective optical subsystem has an entrance half angle of view satisfying the following condition (31):

$$1° < \alpha_{ob} < 45° \tag{31}$$

where $\alpha_{ob}$ is a maximum entrance half angle of view of said objective optical subsystem.

55. The finder optical system according to claim 1, wherein said objective optical subsystem has an entrance half angle of view satisfying the following condition (32):

$$5° < \alpha_{ob} < 45° \tag{32}$$

where $\alpha_{ob}$ is a maximum entrance half angle of view of said objective optical subsystem.

56. The finder optical system according to claim 1, wherein said ocular optical subsystem has an exit angle satisfying the following condition (33):

$$1° \alpha_{ob} < 30° \tag{33}$$

where $\alpha_{oc}$ is a maximum exit angle of said ocular optical subsystem.

57. The finder optical system according to claim 1, wherein said ocular optical subsystem has an entrance half angle of view satisfying the following condition (34):

$$3° < \alpha_{oc} < 20° \tag{34}$$

where $\alpha_{oc}$ is a maximum exit angle of said ocular optical subsystem.

58. The finder optical system according to claim 1, wherein said rotationally asymmetric surface is a free-form surface having only one plane of symmetry.

* * * * *